United States Patent [19]
Ohyama et al.

[11] Patent Number: 6,058,348
[45] Date of Patent: *May 2, 2000

[54] CONTROL APPARATUS FOR DRIVE SYSTEM COMPOSED OF ENGINE AND TRANSMISSION

[75] Inventors: Yoshishige Ohyama, Hitachinaka; Mamoru Fujieda, Ibaraki-ken, both of Japan; Toshiharu Nogi, Novi, Mich.; Takuya Shiraishi; Minoru Ohsuga, both of Hitachinaka, Japan

[73] Assignee: Hitachi, Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/431,028

[22] Filed: Apr. 28, 1995

[30] Foreign Application Priority Data

Apr. 28, 1994 [JP] Japan .................................. 6-091768
Jul. 28, 1994 [JP] Japan .................................. 6-176435
Dec. 26, 1994 [JP] Japan .................................. 6-323103

[51] Int. Cl.$^7$ .................................................. F02D 17/02
[52] U.S. Cl. ........................ 701/103; 701/104; 701/105; 123/294; 123/478
[58] Field of Search .................... 364/431.03, 431.05, 364/431.06; 701/101–109; 123/184.53, 429, 472, 292, 275, 478, 294, 305

[56] References Cited

U.S. PATENT DOCUMENTS

| | | | |
|---|---|---|---|
| 4,480,620 | 11/1984 | Tange et al. | 123/478 |
| 4,562,817 | 1/1986 | Ito | 123/478 |
| 4,723,516 | 2/1988 | Slagley et al. | 123/90.16 |
| 4,724,809 | 2/1988 | Burandt | 123/430 |
| 4,800,860 | 1/1989 | Nanyoshi et al. | 123/492 |
| 5,050,378 | 9/1991 | Clemmens | 60/313 |
| 5,054,444 | 10/1991 | Morikawa | 123/295 |
| 5,086,737 | 2/1992 | Watanabe et al. | 123/295 |
| 5,241,939 | 9/1993 | Nonaka | 123/492 |
| 5,259,344 | 11/1993 | Huang et al. | 123/73 C |
| 5,313,792 | 5/1994 | Katoh et al. | 60/301 |
| 5,427,078 | 6/1995 | Hitomi et al. | 123/559.1 |
| 5,501,074 | 3/1996 | Suetsugu et al. | 60/285 |
| 5,522,357 | 6/1996 | Nogi et al. | 123/261 |

FOREIGN PATENT DOCUMENTS

| | | |
|---|---|---|
| 36 34 627 A1 | 4/1987 | Germany . |
| 40 02 035 A1 | 8/1990 | Germany . |
| 40 17 891 C1 | 9/1991 | Germany . |
| 43 14 830 A1 | 11/1994 | Germany . |
| 43 17 030 A1 | 11/1994 | Germany . |
| 60-30420 | 2/1985 | Japan . |
| 63-45976 | 9/1988 | Japan . |
| 63-45977 | 9/1988 | Japan . |

OTHER PUBLICATIONS

Development of Automotive Miller Cycle Gasoline Engine; K. Hatamura, T. Goto, M. Hitomi, H. Ohe; Mazda Motor Corp.; Oct. 1994; pp. 71–77.

Primary Examiner—Tan Nguyen
Attorney, Agent, or Firm—Evenson McKeown Edwards & Lenahan P.L.L.C.

[57] ABSTRACT

A drive system composed of an engine and a transmission is controlled in accordance with a desired wheel toque corresponding to a position of an accelerator, and a present vehicle speed in such a way that a speed ratio of the transmission is determined in consideration with torque factors such as an air-fuel ratio on the engine side, thereby it possible to optimize the control in order to reduce the emission of exhaust substance such as NOx and to enhance the acceleration performance and the fuel economy.

1 Claim, 37 Drawing Sheets

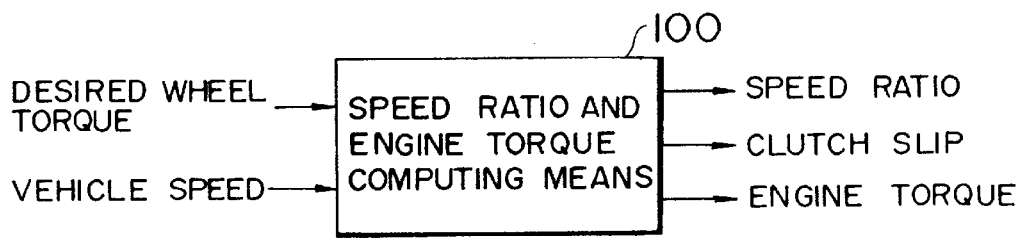
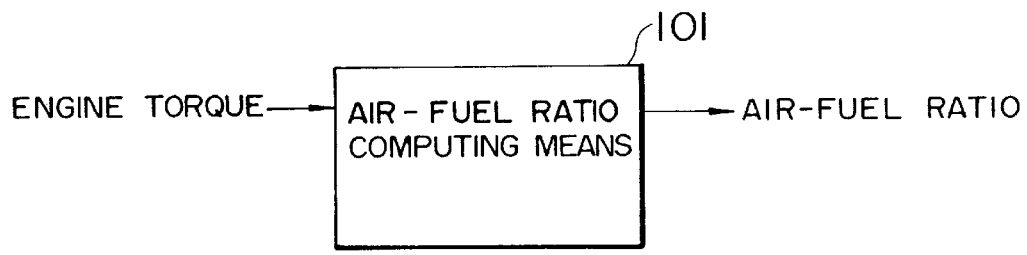
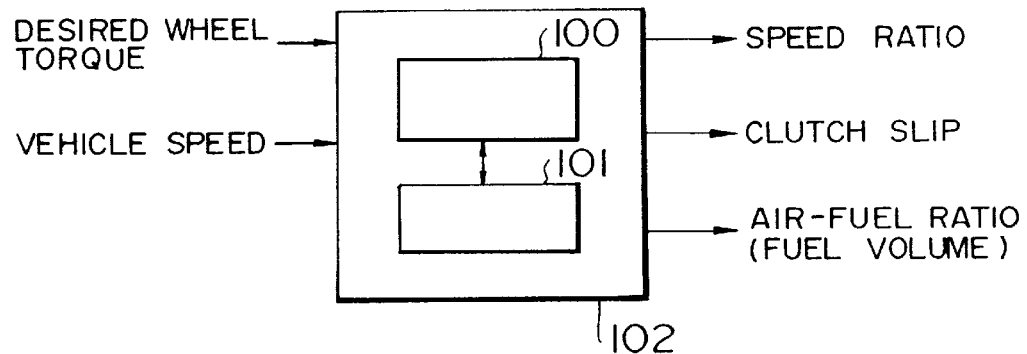

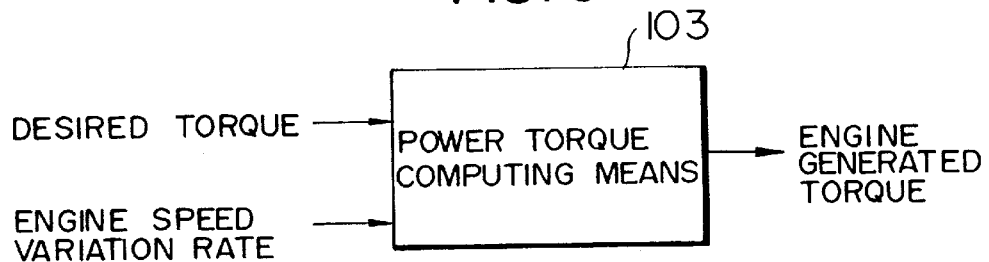
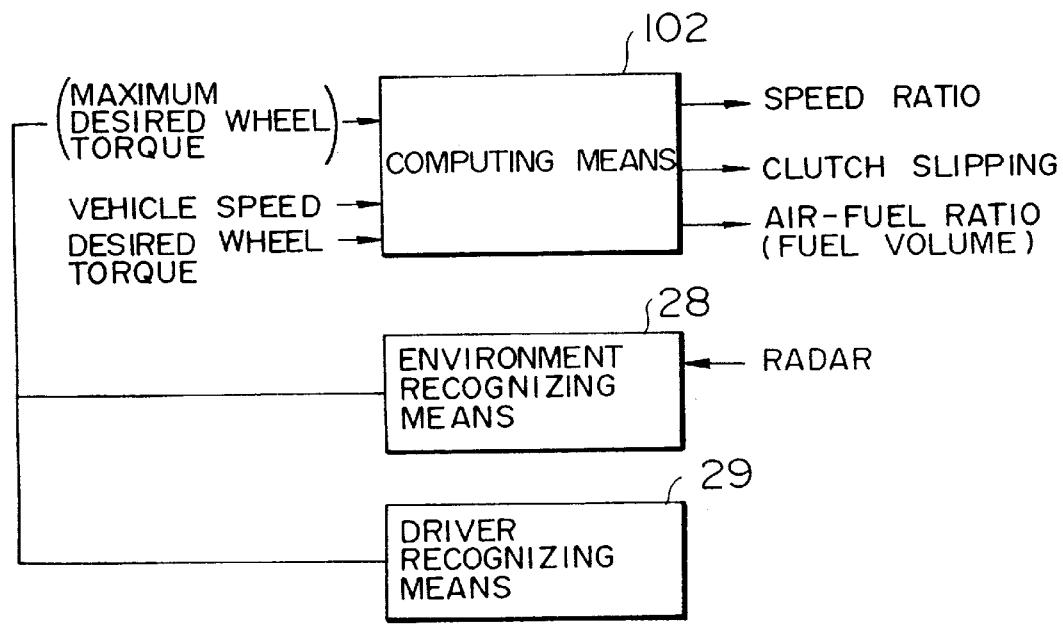

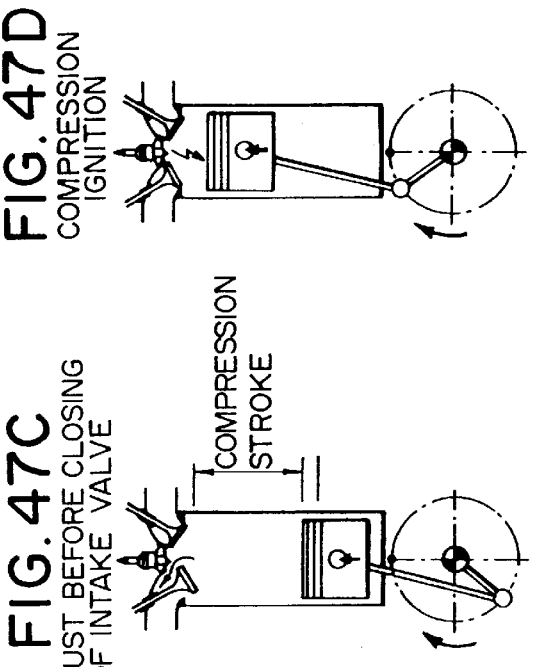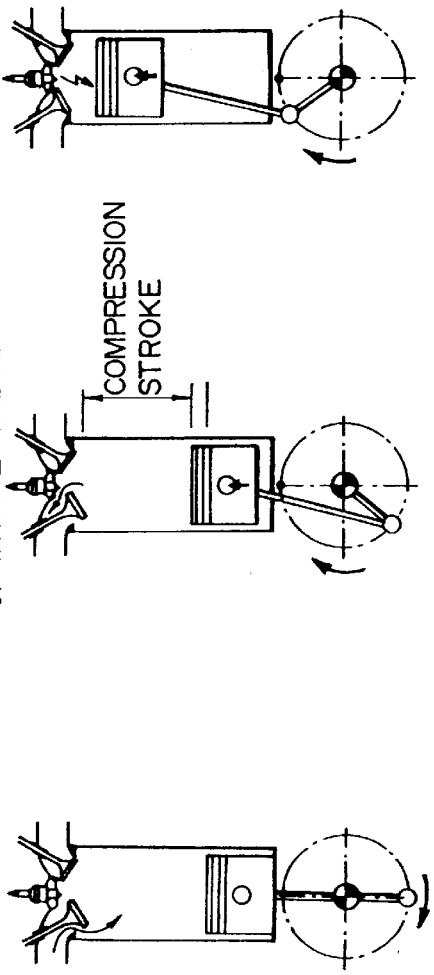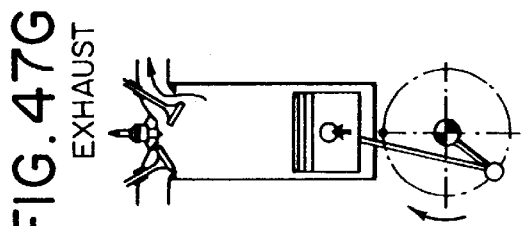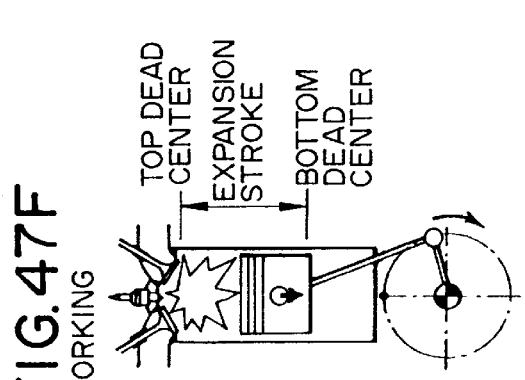

TO FUEL INJECTION VALVE

CONTROL APPARATUS FOR DRIVE SYSTEM COMPOSED OF ENGINE AND TRANSMISSION

BACKGROUND OF THE INVENTION

The present invention relates to a control apparatus for a drive system composed of an engine and a transmission, and in particular to a control apparatus for a drive system composed of an engine such as a gasoline engine or a Diesel-engine and a transmission such as an automatic transmission in combination of a torque converter and a gear train, or a belt-and-pulley type continuous variable transmission.

RELATED ART

For example, Japanese Patent Publication No. 63-45977 and Japanese Patent Publication No. 63-45976 disclose therein a control apparatus which sets a desired wheel torque (which corresponds to a torque that can obtained at the final speed change gear such as differential gear or a speed ratio between the engine speed and the wheel speed since the engine torque is substantially constant, irrespective of an engine speed, over an operating speed range) in accordance with an opening degree of the throttle valve of an engine which is manipulated by a driver. Further, it has been well-known that a control apparatus which sets the speed ratio in accordance with a torque of an engine.

In a conventional control apparatus for a drive system composed of an engine and a transmission, a desired wheel torque has been set in accordance with only an engine torque, irrespective of an air-fuel ratio (a fuel quantity in an engine cylinder), an intake valve closing angle, a supercharging pressure and a ratio between working and compression strokes, which are parameters for the engine torque. That is, since the desired torque has been directly set in relation to an engine torque and a vehicle speed, the consistence between the fuel economy and the acceleration performance has been difficult. Accordingly, in the case of the speed-up of a vehicle by changing the torque of an engine or that of a transmission, depending upon a taste of a driver (that is, whether he is fond of high acceleration or not) or a recognition of environment around the vehicle, the following problems have been raised, that is, should the acceleration performance be heighten while the torque of the transmission is maintained to be low with respect to an engine torque, the fuel economy would deteriorate. On the contrary, should the fuel economy be enhanced by increasing the torque of the transmission with respect to an engine torque, the acceleration performance would deteriorate.

Further, an in-cylinder fuel injection engine has been preferably used as an engine constituting the drive system in order to preform precise and complicated control. However, a conventional control apparatus has been adapted to control the timing of fuel injection and the timing of ignition under such a condition that the air volume is set to be constant. Accordingly, should an in-cylinder fuel injection engine having a ratio between working and compression strokes of less than 1 be controlled, the mixture would be locally overrich, causing generation of soot in the case of a large fuel injection volume, or the mixture would be excessively lean around a spark plug so as to cause the combustion unstable in the case of a small fuel volume. Further, if the fuel volume increases under such a condition that the air volume is constant, the air-fuel ratio decreases, causing increasing of nitrogen oxide (NOx) emission.

For example, an in-cylinder fuel injection engine disclosed in Japanese Laid-Open Patent No. 60-30420, incorporates a fuel injection valve directed to a spark plug, and an air injection value adapted to inject air which interferes with fuel injected from the injection valve, and accordingly, in the case of a less fuel induction volume during low load operation, air is injected into fuel jetted from the fuel injection valve to the spark plug so as to concentrate the fuel around the spark plug. In this arrangement, lean-burn operation and reduction of pumping loss can be carried out. However, since such an in-cylinder injection engine additionally requires the above-mentioned air-injection valve, not only the manufacturing cost of the engine is increased, but also unburnt hydrocarbon emission cannot be sufficiently reduced even with the provision of the above-mentioned arrangement.

SUMMARY OF THE INVENTION

The present invention is devised in view of the above-mentioned problems inherent to a conventional control apparatus for a drive system composed of an engine and a transmission, and accordingly, a first object of the present invention is to provide a control apparatus for a drive system composed of an engine and a transmission, which can perform flexible control so as to enhance both fuel economy and acceleration performance.

To the end, according to a first aspect of the present invention, a control apparatus for a drive system composed of an engine and a transmission is provided with a computing means for controlling the torque of the transmission and the air-fuel ratio of the engine in accordance with a desired wheel torque and a vehicle speed.

According to a specific form of the present invention, a control apparatus for a drive system is provided with a computing means for controlling the torque of a transmission and the closing angle of an intake valve in relation to each other in accordance with a desired torque and a vehicle speed. According to another specific form of the present invention, a control apparatus for a drive system is provided with a computing means for controlling the torque of a transmission and a supercharging pressure in relation to each other in accordance with a desired wheel torque and a vehicle speed, or a computing means for controlling the torque of a transmission and a ratio between working and compression strokes in relation to each other in accordance with a desired wheel torque and a vehicle speed.

The above-mentioned computing means carries out control operation in such a way that the fuel consumption and the acceleration performance are optimized with the use of a performance chart in accordance with a driver's taste or an operating environment of a vehicle.

Further, a second object of the present invention is to provide a control apparatus for controlling an engine used in a drive system of a vehicle, preferably for controlling an in-cylinder fuel injection engine whose ratio between working and compression strokes can be set to be less than 1, which can prevent generation of soot, unstable combustion, and increasing of NOx emission.

To the end, according to the present invention, the control apparatus for an internal combustion engine comprises a fuel injection timing control means for controlling the volume of fuel injected from a jet port of a fuel injection device which is located in a combustion chamber of the engine, and the fuel injection timing, and an intake valve opening and closing control means for controlling the opening and closing timing of an intake valve of the engine, the fuel injection timing control means controlling the volume of the fuel and the fuel injection timing in accordance with a variation in air volume to be burnt in the combustion chamber.

Further, a third object of the present invention is to provide a preferable fuel injection valve for the above-mentioned engine, which can reduce the manufacturing cost of the engine, which can reduce the emission of unburnt hydrocarbon as far as possible, and which can exhibit stable combustion over a wide operating range of the engine.

To the end, according to the present invention, the fuel injection valve comprises a means for injecting fuel in a decreased injection splay angle, and a means for injecting fuel in an increased injection splay angle.

Specific explanation will be hereinbelow made of specific embodiment forms of the present invention with reference to the accompanying drawings in which:

BRIEF DESCRIPTION OF THE INVENTION

FIG. 2 is a control block diagram illustrating a computing apparatus for controlling a speed ratio and an engine torque, incorporated in a drive system shown in FIG. 1;

FIG. 3 is a control block diagram illustrating an air-fuel ratio computing means incorporated in the control apparatus shown in FIG. 1, FIG. 4 is a control block chart illustrating a first concept of the control apparatus shown in FIG. 1;

FIG. 5 is a control block diagram illustrating a drive torque computing means incorporated in the control apparatus shown in FIG. 1;

FIG. 6 is a control block diagram illustrating a first variant form of the computing apparatus;

FIGS. 47A to 47G are views for explaining operation of the Miller cycle engine shown in FIG. 31;

DETAILED DESCRIPTION OF THE PREFERRED EMBODIMENTS

A continuous variable transmission 3 is used as an example of a transmission of a drive system in which a control apparatus according to the present invention is applied, in the explanation which will be hereinbelow made. However, it should be noted that the continuous variable transmission 3 is not an indispensable matter of the present invention, but any other transmission such as a torque converter or a speed change gear can be similarly used, instead of the continuous variable transmission, in the present invention. Further, a gasoline type in-cylinder fuel injection engine is used in an example of an engine in the drive system according to the present invention, but it should be noted that a gasoline type intake port fuel injection engine or a Diesel-engine can be also used, instead of the gasoline type in-cylinder fuel injection engine, in the present invention.

Figure 1:
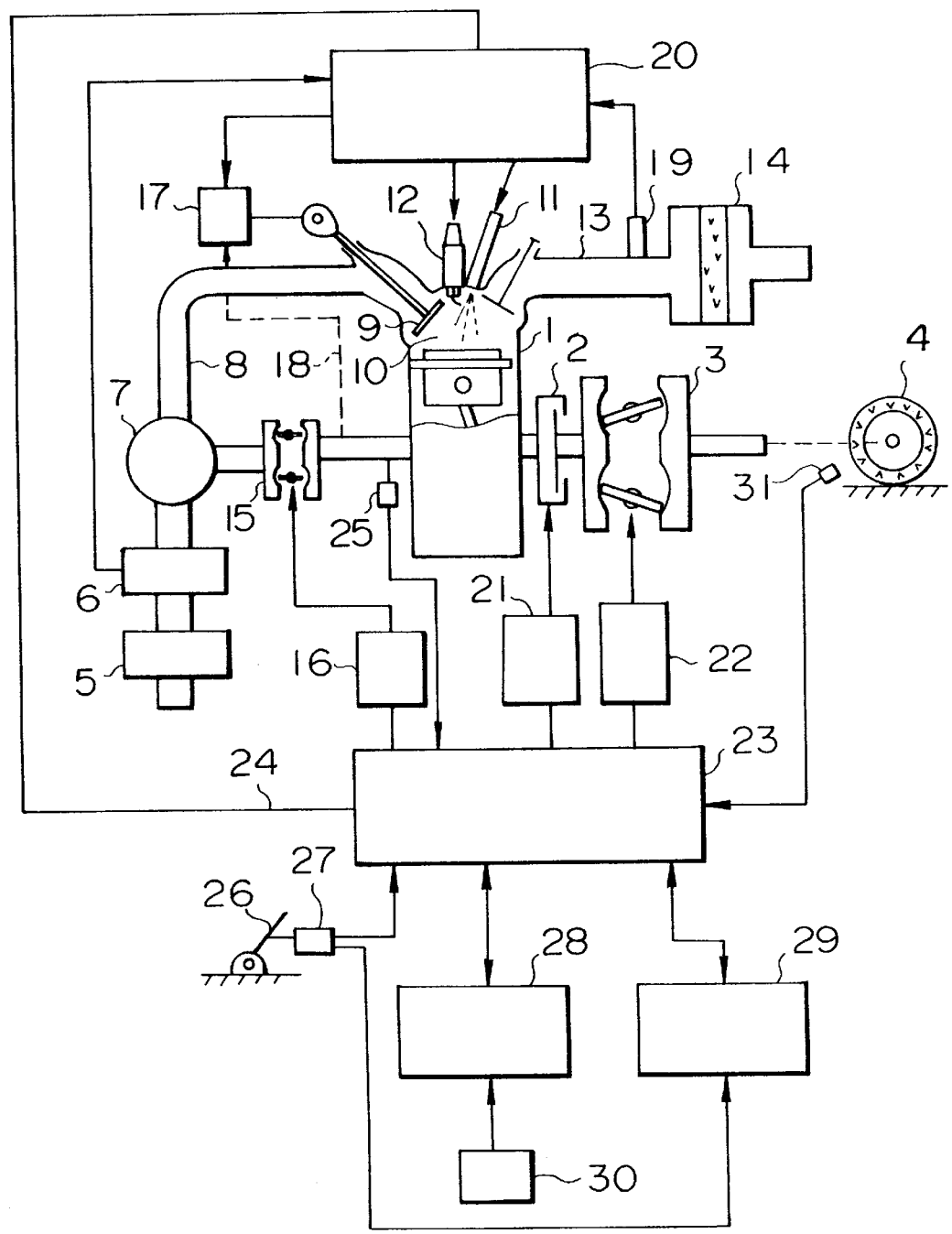
FIG. 1 is a schematic view illustrating a drive system applied therein with a control apparatus according to the present invention.

A drive system shown in FIG. 1 is composed of an engine 1 and a transmission 3 which is coupled to the engine 1 through the intermediary of a clutch 2, and accordingly, an output is transmitted to a wheel 4 from the engine 1 through the clutch 2 and the transmission 3. Further, the speed ratio of the transmission 3 is controlled by a transmission control means 22 while the clutch 2 is controlled by a clutch control means 2, and the speed ratio of a transmission 15 for a compressor 7 is controlled by a speed ratio control device 16.

An air filter 5, an air-flow sensor 6, the compressor 7, an intake pipe 8 and an intake valve 9 are provided on the intake side of the engine 1, and accordingly, intake-air is fed into an engine cylinder 10 therethrough, successively. The compressor 7 is driven by the engine 1 through the intermediary of the transmission 5. The opening and closing timing of the intake valve 9 is controlled by a valve opening and closing timing control device 17 which is driven by a cam shaft 18.

Further, fuel is injected into the engine cylinder 10 by a fuel injection valve 11, and a mixture of an air and fuel in the engine cylinder 10 is ignited and burnt by a spark plug 12. Exhaust gas is emitted into the atmosphere from the cylinder 10 through an exhaust pipe 13 and a catalytic converter 14. An air-fuel ratio sensor 19 is attached to the exhaust pipe 13, and delivers its output to a control unit 20.

The speed ratio control valve 16, the clutch control means 21 and the transmission control means 22 are controlled by the control unit 23 which is connected to a control unit 20 through the intermediary of a local area network (LAN) 24. An engine speed is detected by an engine speed sensor 25 which delivers an output signal 23. A position of an accelerator pedal 26 is detected by a potentiometer 27 and is delivered to the control unit 23 which is connected thereto with a vehicle environment recognition means 28 and a driver recognition means 29.

A vehicle front monitor radar 30 delvers signal to the environment recognition means 28 which therefore recognizes a running environment, that is, whether an obstacle to running, such as a vehicle, is present in front of the instant vehicle or not is determined. The potentiometer 27 delivers its output to the recognition means 29 which therefore recognizes whether the driver is in favor of a sporty drive pattern or not in view of a time-variation in the output of the potentiometer 27. If the time-variation is large, it does means that the position of the accelerator pedal 26 is abruptly changed, and accordingly it is recognized that the driver is in favor of a sporty drive pattern. Further, the control unit 23 obtains a desired wheel torque from a position of the accelerator pedal 26, delivered from the potentiometer 26. A vehicle speed sensor 31 delivers its output signal to the control unit 23.

The control unit 23 incorporates a speed ratio and engine torque computing means 100 for computing a speed ratio of the transmission 3, an engine torque and a slip of the clutch 2 from the desired wheel torque and the vehicle speed. Meanwhile the control unit 20 incorporates an air-fuel ratio computing means 101 as shown in FIG. 3 for computing a mixture air-fuel ratio from the engine torque. If the desired wheel torque is large, the air-fuel ratio is decreased so as to enrich the mixture in order to increase the output torque of the engine. That is, the speed ratio and engine torque computing means 100 and the air-fuel ratio computing means 101 are associated with each other. Accordingly, as the speed ratio between wheel speed and engine speed is large, the desired torque is set to become less, and accordingly, the air-fuel ratio decreases. Meanwhile, if the speed ratio is set to be small, the desired wheel torque decreases, but the air-fuel ratio increases. In view of this point, it is noted that the relationship between the speed ratio and the torque has been manually changed over by means of a power/economy selection lever in prior art, and has not be associated with the air-fuel ratio computing means 101, and accordingly, the prior art device is inferior in flexibility.

Referring to FIG. 4 which is a block diagram for facilitating the understanding of the concept of the present invention, a speed ratio, a slip of the clutch and an air-fuel ratio are computed from a desired torque and a vehicle speed. Since the in-cylinder fuel injection engine 1 is used, the charged air volume is constant, and accordingly, the air-fuel ratio is controlled by adjusting the volume of fuel injected from the fuel injection valve 11. Further, the clutch slip control means 21 controls the slipping of the clutch, and further, the transmission control means 22 controls the speed ratio. As mentioned above, the computing means 102 is in the combination of the speed ratio and engine torque computing means 100 and the air-fuel ratio computing means 101.

The control unit 20 incorporates a power torque computing means 102 which computes a torque generated at the engine from a desired wheel torque and a rate of variation in engine speed, and computes the volume of fuel injected from the fuel injection valve 11 so as to obtain the generated torque as shown in FIG. 5. Accordingly, a decrease in torque used for increasing the engine speed can be compensated. Conventionally, the relationship between the air-fuel ratio and the fuel volume has been fixed so that the above-mentioned compensation has been impossible. Further, it is noted that the position (degree of depression) of the accelerator pedal can be alternatively used, instead of the rate of variation in engine speed.

By the way, as already well-known, if the engine speed is increased before acceleration, the acceleration performance can be enhanced. However, this causes an increase in fuel consumption. As shown in FIG. 6, an output from the radar is delivered to the environment recognition means 28 which therefore computes a maximum desired wheel torque and delivers the same to the computing means 102. If no obstacle is present in front of the vehicle so that the maximum desired torque is large, the speed ratio is set to a small value. Meanwhile, if an obstacle is present in front of the vehicle, or a traffic jam occurs, the speed ratio is increased so as to save fuel consumption. Further, if the driver recognition means 29 determines that the driver is in favor of a sporty operating pattern, the maximum desired wheel toque becomes large, and accordingly, the speed ratio is set to be small.

Figure 7:
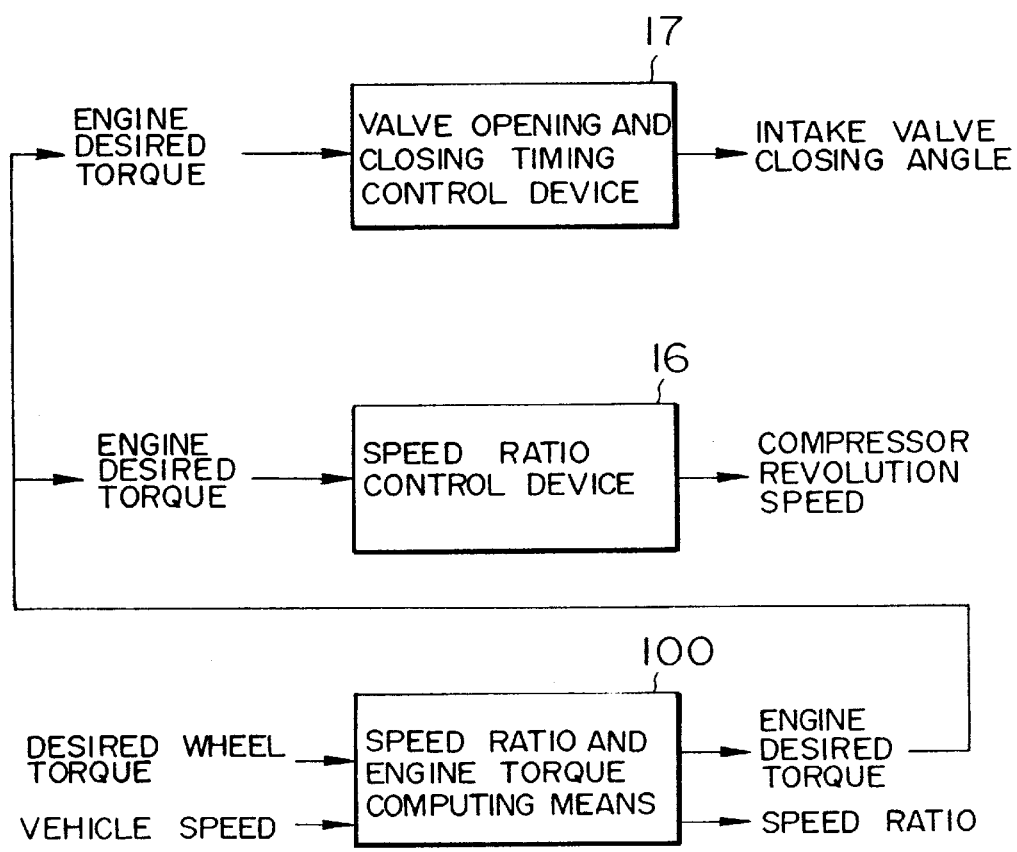
FIG. 7 is a control block diagram illustrating a second variant form of the computing means.

As shown in FIG. 7, if the desired torque of the engine is small, the valve opening and closing timing control device 17 retards the closing timing of the intake valve so as to reduce the compression work, and accordingly, the fuel economy can be enhanced. At this time, if the air-fuel ratio is controlled to a stoichiometric ratio, three-way catalyst can be used for the catalytic converter 14. Further, if the desired torque of the engine is small, the speed ratio control device 16 lowers the revolution speed of the compressor 7 so as to reduce the supercharging pressure down to a value nearly equal to the atmospheric pressure. Accordingly, the compression work of the compressor 7 is decreased so as to enhance the fuel economy. If the desired torque is large, the revolution speed of the compressor 7 is increased so as to increase the supercharging pressure while the air-fuel ratio is maintained to be stoichiometric. Alternatively, the closing timing of the intake valve is advanced to increase the charged air volume of the cylinder 1.

Referring to FIG. 7, the speed ratio and engine torque computing means 100 obtains an engine desired torque and a speed ratio, and delivers the engine desired torque to the speed ratio control device 16 and the valve opening and closing timing control device 17 so as to optimumly control the revolution speed of the compressor 7 and the closing angle of the intake valve 9.

Next, explanation will be made hereinbelow made of the operation of this embodiment of the invention.

Figure 8:
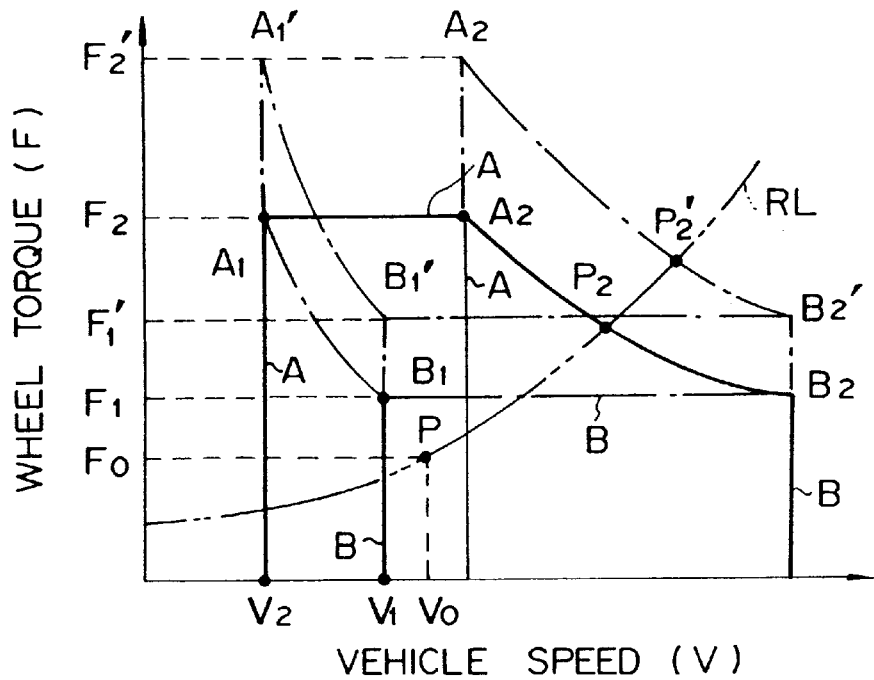
FIG. 8 is a performance chart.

Referring to FIG. 8, denoting that the ratio between wheel and engine speeds as a speed ratio x, if x is large, the wheel torque falls inside of a curve A while if x is small, the wheel torque falls inside of a curve B. If a desired value Fo is given to the wheel torque F with respect to the vehicle speed, x in the curve B is selected if $F_1 > F_0$ and $V_1 < V_0$. If the continuously variable transmission is used, the point $B_2$ continuously varies to a point $A_1$. At this time, the speed of the engine is highest. Further, the point $B_1$ continuously varies to the point $A_1$. At this time the engine speed is lowest.

In view of the fuel economy, the engine is preferably driven at a speed and a load which are as low and high as possible, respectively. Accordingly, it is driven along a curve $A_1$-$B_1$. If $F=F_2$, it is driven along a curve $A_1$-$A_2$. If $F=F_1$, it is driven along a curve $B_1$-$B_2$. If $V>V_1$ and $F<F_1$, the output power of the engine is controlled at a speed ratio B. If $F \leq F_1$ and $V=V_1$, it is driven along a curve $V_1$-$B_1$ while if $V=V_2$, it is driven along a curve $V_2$-$A_1$. If $V<V_2$, the speed of the engine is lowered if no slip occurs, and accordingly, the clutch is slipped in order to maintain the speed of the engine. A curve RL shown in this figure indicates a desired torque F during a horizontal road surface, with which the engine cannot be drive above a point $P_2$ with a lean mixture.

Figure 9:
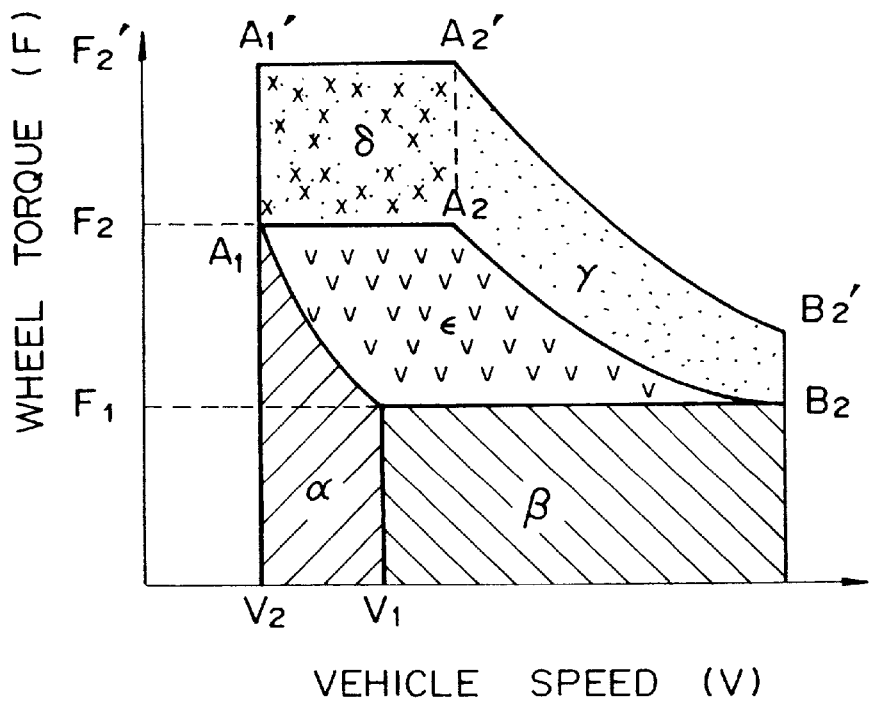
FIG. 9 is a sectioned performance chart.

In order to enlarge the vehicle speed range and the wheel torque range, the mixture is enriched. Accordingly, the torque $F_2$ is increased up to a value $F_2'$ with which the vehicle can ascend a slope. Further, the torque F, is increased up to a value $F_1$ so that the driveable point is increased to a value $P_2'$. Referring to FIG. 9, in a range $\alpha$, it is driven at a lowest engine speed with a partial load and a lean mixture. In a range $\beta$ where the speed ration is lowest, it is driven at a highest engine speed with a rich mixture. In a range $\gamma$, it is driven at a highest speed ratio x with a rich mixture. In a range $\in$ where the speed ratio x is highest, it is driven with a rich mixture. In a range $\epsilon$, it is driven with a lean mixture while the throttle valve is fully opened. The speed ratio x varies, depending upon the speed V.

Figure 10:
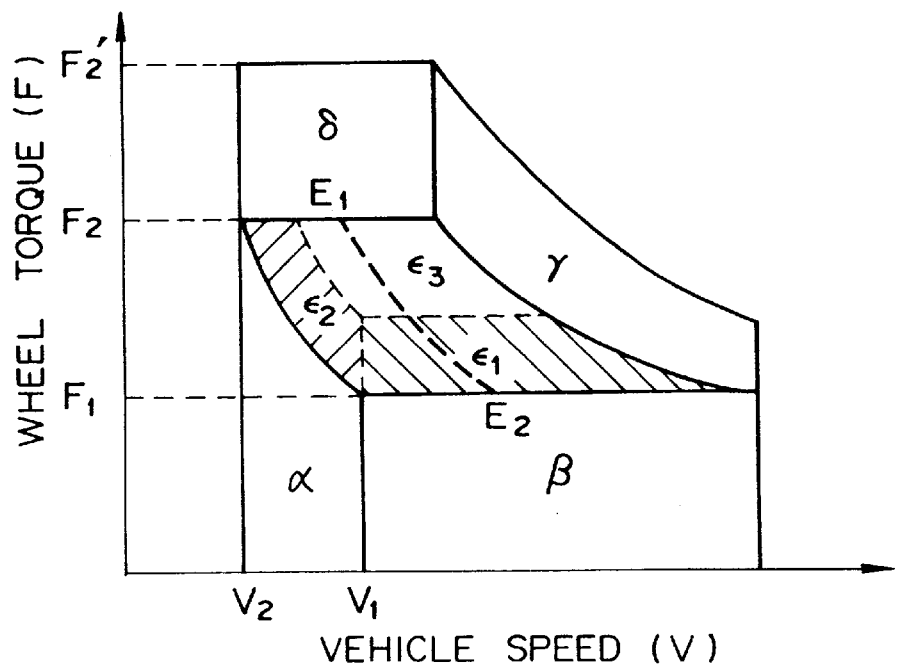
FIG. 10 is a detailed view of the performance chart shown in FIG. 9.

The range $\epsilon$ can be subdivided as shown in FIG. 10. In the range $\epsilon_1$, it can also be driven at a highest ratio x with a rich mixture. However, at this time, since the fuel consumption is high in this condition in comparison with the condition in which the engine is driven with a lean mixture while the throttle valve is fully opened, it is driven in the latter condition.

In the range $\epsilon_2$, it can be driven at a low engine speed with a rich mixture. Accordingly, on the left side of a curve $E_1$-$E_2$, it is driven with a rich mixture while the throttle valve is fully opened in order to restrain the engine speed from increasing. In the range $\epsilon_3$, it is driven with a rich mixture and a fully opened throttle valve. On the left side of the curve $E_1$-$E_2$, it is driven with a rich mixture and a fully opened throttle valve. That is, though it can be driven with a lean mixture and a fully opened throttle valve in the range $\epsilon_2$, the mixture is set to be rich in a range where the engine speed exceeds, for example, 3,000 rpm so as to lower the engine speed since the fuel consumption is increased due to mechanical friction as the engine speed is increased.

Figure 11:
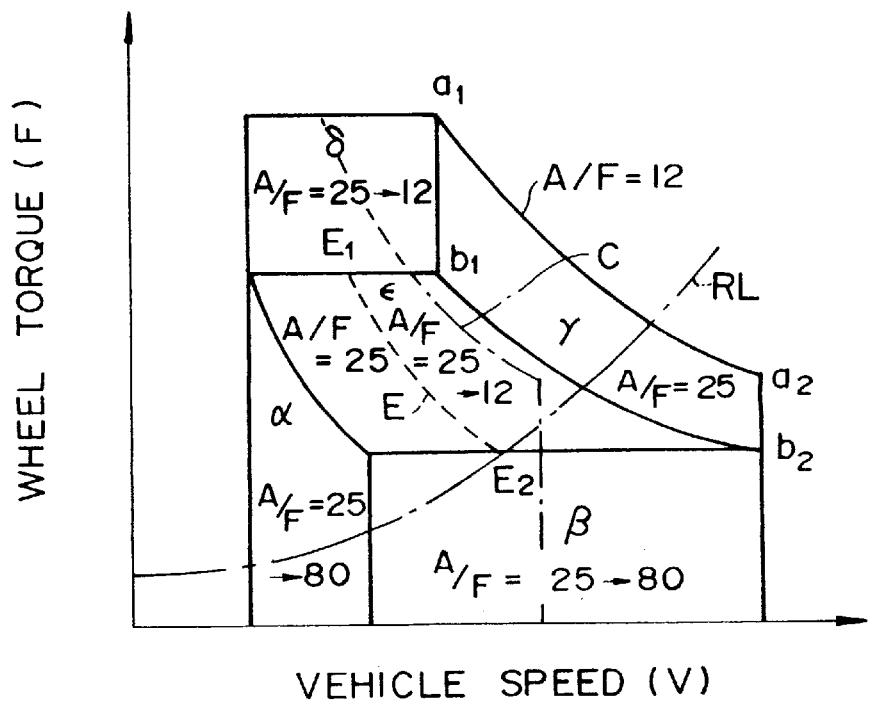
FIG. 11 is a detailed view of the performance chart shown in FIG. 10.

As shown in FIG. 11, in the ranges $\alpha$, $\beta$, the air-fuel ratio is controlled in the range from 25 to 80, that is, the higher the air-fuel ratio, the larger the fuel volume. In a range $\delta$, the air-fuel ratio is controlled in a range from 25 to 12. In the range $\epsilon$, on the left side of the curve $E_1$-$E_2$, the engine is driven at an air-fuel ratio of 25 while the wheel torque F is adjusted, depending upon a speed ratio x. In the range $\gamma$, the air-fuel ratio is set to 12 along a curve $a_1$-$a_2$ while it is set to 25 along a curve $b_1$-$b_2$. In this condition, the engine speed is highest, that is, 6,000 rpm.

Along a curve C shown in FIG. 11, the air-fuel ratio is set to 12 so as to restrain the engine speed below 3,000 rpm. Accordingly, the air-fuel ratio is set to be low in order to lower the engine speed, rather than the air-fuel ratio is set to 25 so as to increase the engine speed. In a range between the curves E, C, the air-fuel ratio is changed from 25 to 12 so as to maintain the engine speed at 3,000 rpm.

Figure 12:
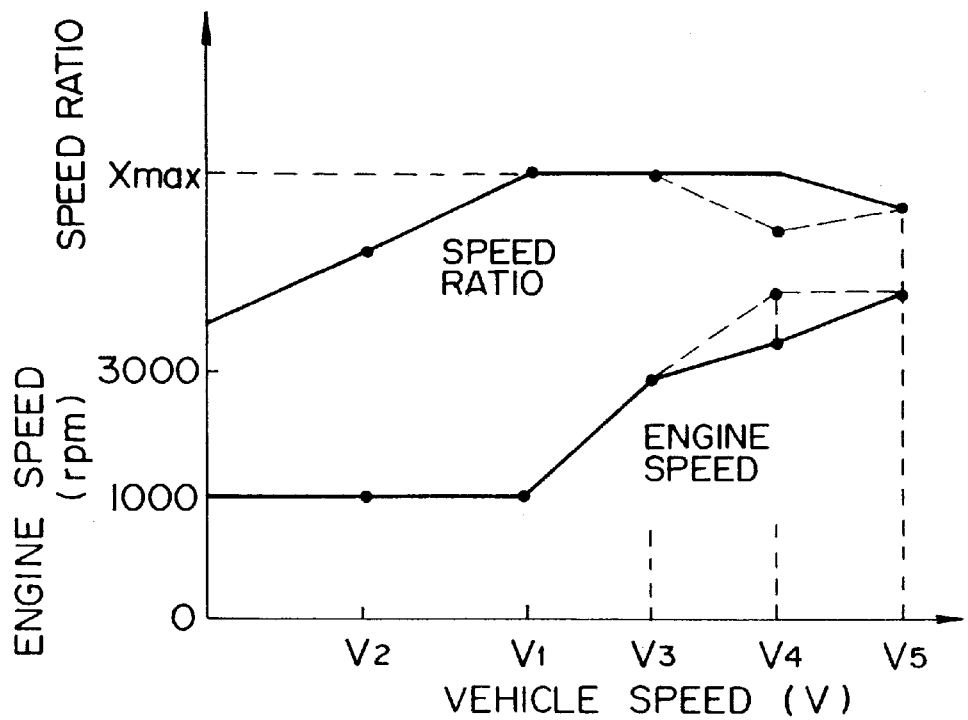
FIG. 12 is a performance chart relating to vehicle speed v.s. engine speed (speed ratio)

Referring to FIG. 12, under the load RL during running on a horizontal road, at first, the engine speed is low, that is, 1,000 rpm, and the vehicle speed is increased by increasing the speed ratio. When the speed ratio x reaches its maximum value $X_{max}$, the vehicle speed is increased by increasing the engine speed. When the vehicle speed exceeds a value $V_3$ at which the engine speed reaches 3,000 rpm, the speed ratio is decreased while the torque F is increased, and further, the engine speed is increased so as to increase the vehicle speed up to a value $V_4$ as shown by the broken line in FIG. 12. At $V_4$, the engine speed reaches 6,000 rpm. At this time, the vehicle speed reaches at a value $V_5$ by increasing the speed ratio. If the air-fuel ratio is decreased at the point $V_3$, the vehicle speed is increased as shown by the solid line in FIG. 12 without decreasing the speed ratio x.

Figure 13:
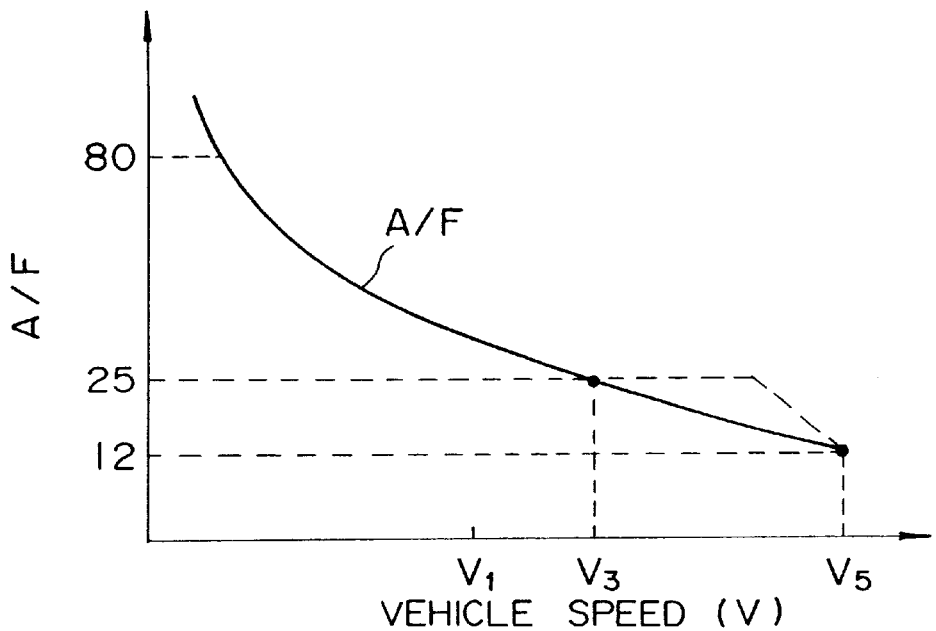
FIG. 13 is a performance chart for explaining variation in the air-ratio with respect to vehicle speed.

Referring to FIG. 13 which shows variation in the air-fuel ratio with respect to the vehicle speed, the nitrogen oxide emission increases around an air-fuel ratio of 16. This point can be shifted to a high speed side as shown by the broken line.

If the vehicle speed is increased from the point P on the curve RL, when the degree of depression of the accelerator pedal is large, that is, the position thereof is deep, the air-fuel ratio is set from 25 to 12 in the range $\delta$ or in the range $\gamma$. If the degree of depression of the accelerator pedal is small, the air-fuel ratio is set from 25 to 80. Upon shifting into the range $\delta$, the speed ration x is decreased, and accordingly, the engine speed should be increased so that a part of the torque generated by the engine is consumed to increase the engine speed, and accordingly, the acceleration performance correspondingly lowers. For the compensation therefor, an extra torque is generated. That is, the wheel torque F is exhibited by the following expression:

$$F=k(n_e/V)T=k_1(T/x) \quad \text{EX1}$$

where k, $k_1$ are constants, T is an input torque to the transmission, $n_e$ is an engine speed and V is a vehicle speed. If the engine generated toque is denoted as $T_e$ which is given as follows:

$$T_e=T+I*dn_e/dt \quad \text{EX2}$$

where I is an inertia term of a movable part.

By substituting EX1 into EX2 while setting as $F=F_0$, the following expression can be obtained;

$$T_e=F_0*x/k_1+I*dn_e/dt \quad \text{EX3}$$

Accordingly, if the engine torque is increased from the steady-state engine torque $T_e$ by a value given by the second term on the right side of the expression.

Figure 14:
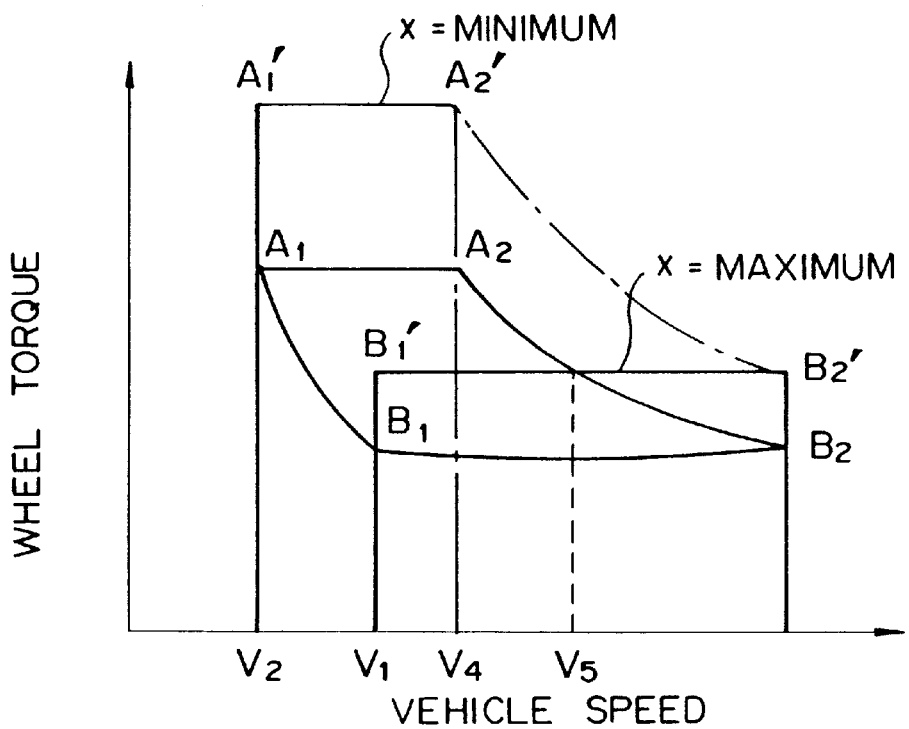
FIG. 14 is a performance chart.

In FIG. 14, in a range of $A_1$-$A_1'$-$B_1'$-$B_1$, if the engine is driven by shifting the air-fuel ratio from 25 to 12, the vehicle can be accelerated without changing the speed ratio x. Further, in the range $\alpha$, if the minimum value of the engine speed has been increased beforehand, the accelerating performance can be enhanced. However, an increase in fuel consumption is inevitable. At a vehicle speed $V_1$, the speed ratio x can be set to be either maximum or minimum. If the speed ratio x is set to be minimum, the wheel torque can be increased along the curve $A_1$-$A_2'$ without increasing the engine speed. On the contrary, if the speed ratio x is set to be maximum, the wheel torque along the curve $B_1$-$B_2$ can only be obtained if the engine speed is maintained to be constant. In order to obtain a higher torque than that, it is required that the speed ratio x is decreased and the engine speed is increased. At this time, a part of the engine generated torque is consumed for accelerating the engine itself.

In the above-mentioned arrangement, estimating that the desired wheel torque for acceleration is known before acceleration, the speed ratio is set to be small beforehand if the desired wheel torque is large, and accordingly, it is possible to prevent the acceleration performance from lowering. However, the fuel consumption is slightly increased during steady-state operation. The desired wheel torque becomes large when no vehicle as an obstacle is present in front, or when acceleration for passing, ascent of a steep slope or the like is carried out. Such a condition can be known by detecting an environment surrounding the vehicle. It has been well-known that the presence of an obstacle in front can be detected by using a radar, a laser or an image process. Further it has been well-known to detect a slope by using an inclination sensor or in accordance with a variation in running resistance. Further, one driver is in favor of abrupt acceleration but another driver in favor of fuel economy. It has been also well-known that this can be known by processing an accelerator pedal depressing pattern. If the driver in favor of a sport drive pattern, the speed ratio x is set to be small during steady-state operation.

If the vehicle speed exceed the value $V_4$, the speed ratio x cannot be set to a minimum value, and accordingly, the wheel torque cannot exceeds a curve $A_2'$-$B_2'$. Also at this time, if the engine speed during steady-state operation is set to be low, the torque during acceleration is once lowered. The torque along $A_1$-$A_2$-$B_2$ can be attained even with a lean mixture. When the curve is exceeded, the mixture is enriched. At a vehicle speed $V_5$, the speed ration x is maximum, and accordingly, the torque level is limited below the curve $B_1$-$B_2$. In order to obtain the torque larger than that, it is required that the speed ratio x is decreased while the engine speed is increased, or the speed ratio x is set to be maximum while the mixture is enriched. In view of the acceleration performance, the latter is advantageous, but in view of the fuel economy, the former is advantageous. Accordingly, whether the mixture is enriched so as to increase the torque or the speed ratio x is decreased so as to increase the torque, is depend upon a driver's taste or an environment around the vehicle.

Figure 15:
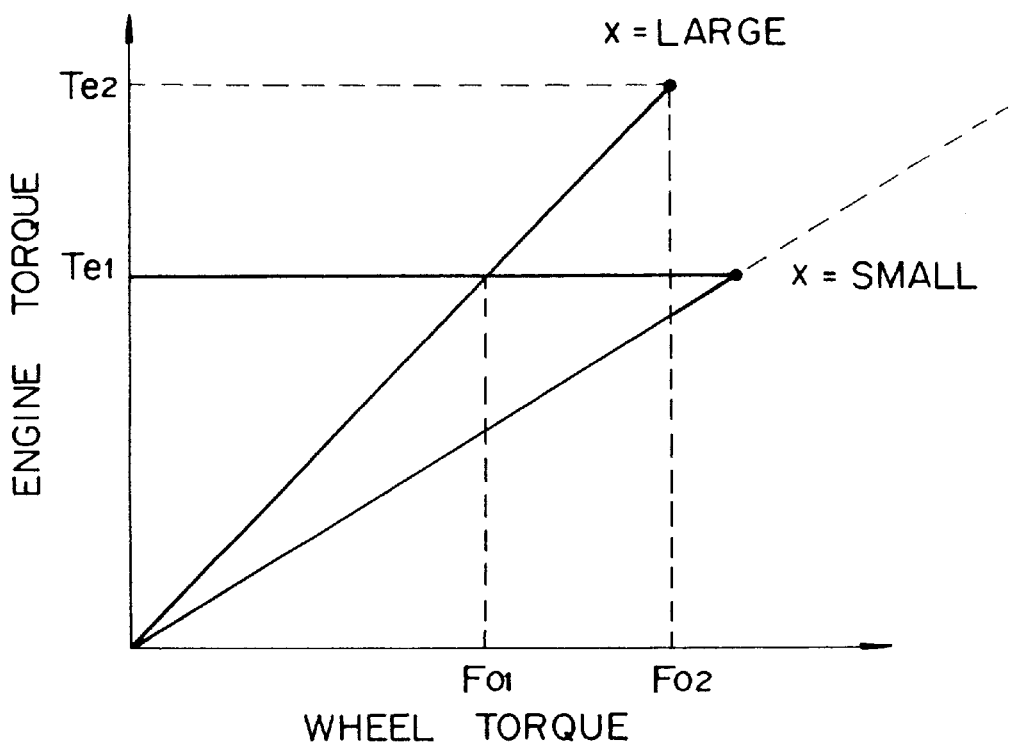
FIG. 15 is a wheel torque v.s. engine torque performance chart.

In a Miller cycle engine in which the ratio between working and compression strokes is equal to or less than 1, that is, working/compression stroke ratio $\geq 1$, the closing angle of an intake valve is adjusted so as to control the engine generated torque. Alternatively, the pressure of a supercharger is controlled so as to control the generated torque. If the closing angle is retarded, the compression stroke is decreased so as to increase the above-mentioned stroke ratio, and accordingly, the expansion energy can be effectively used so as to enhance the fuel economy. In order to increase the engine generated torque, it is required to increase the compression stroke. However, the fuel economy is accordingly lowered. Whether the speed ratio x is decreased so as to increase the wheel torque or the compression stroke is increased so as to increase the torque, depends upon the driver's taste or an environment around the vehicle at that time. Referring to FIG. 15, when the vehicle speed is constant, if the speed ratio x is large, the engine torque is large, but if the speed ratio x is small, the engine torque is small. Up to a value $T_{e1}$, the engine can be driven, maintaining the stroke ratio constant, but it is required that the compression stroke is decreased upon shifting from $T_{e1}$ to $T_{e2}$. If the speed ration x is decreased, the engine can be driven, maintaining the stroke ratio constant in a range from $F_{01}$ to $F_{02}$ since the engine torque is less than the value $T_{e1}$. However, if the speed ration x is excessively decreased, the engine speed is increased so as increase the fuel consumption. If the engine speed exceeds 3,000 rpm, the speed ratio is set to be large. If acceleration is desired, the speed ratio x is decreased, and if the fuel economy is essential, the value $T_{e1}$ is set be as small as possible at an engine speed of 3,000 rpm.

In the Miller cycle engine, in order to increase the engine torque while maintaining the working and compression stroke ratio large, it is required to increase the supercharge pressure. Even though the compression stroke is small, a large volume is charged into the engine cylinder so as to increase the engine torque. However, since the compression work is increased. the speed ratio x is increased so as to decrease the desired engine torque until the engine speed becomes 3,000 rpm.

Setting $T=T_e$ in EX1, the following expression can be obtained:

$$F=k(n_e/V)*T_e \qquad \text{EX4}$$

Figure 16:
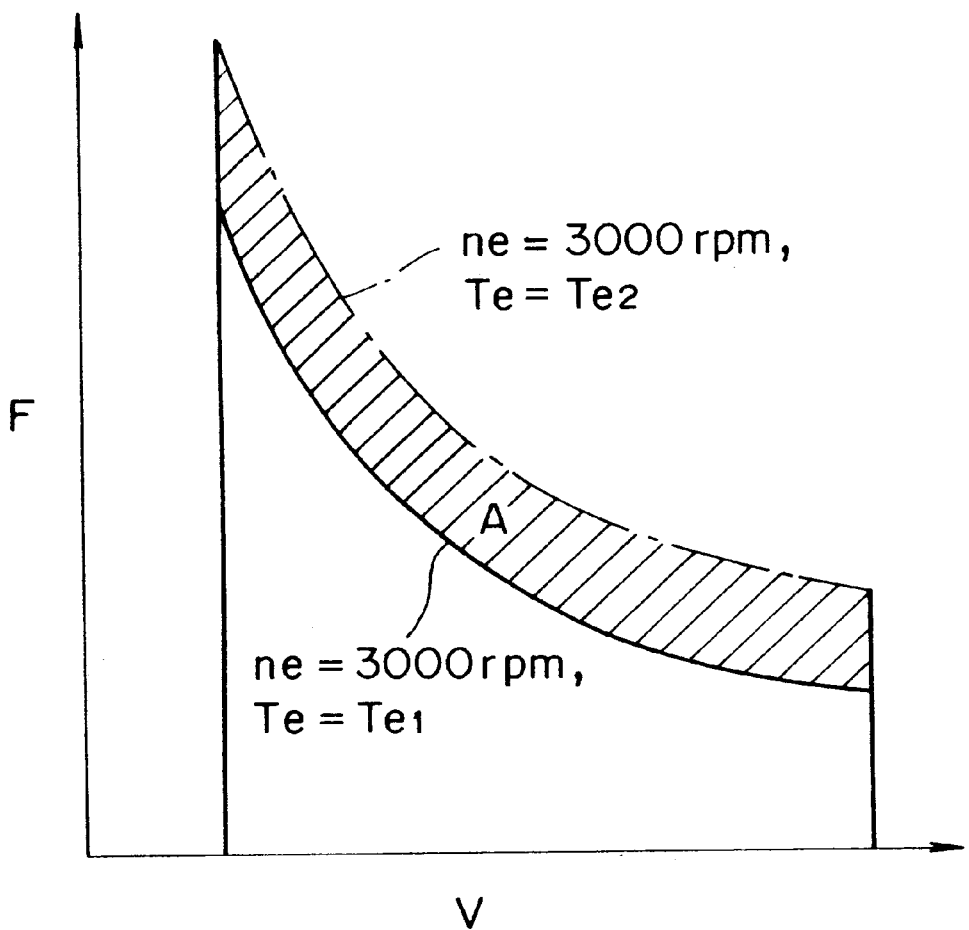
FIG. 16 is an F-V performance chart.

In a range A in FIG. 16, if it is operated with $T_e=T_{e1}$, it is required to set the engine speed at a value higher than 3,000 rpm. In this phase, the engine torque $T_e$ is increased up to $T_{e2}$ so as to restrain the engine speed from increasing.

As understood from the above-mentioned explanation, according to the present invention, not only the fuel economy but also he acceleration performance can be enhanced. Further, it is possible to provide a highly flexible control apparatus for a drive system composed of an engine and a transmission.

Figure 17:
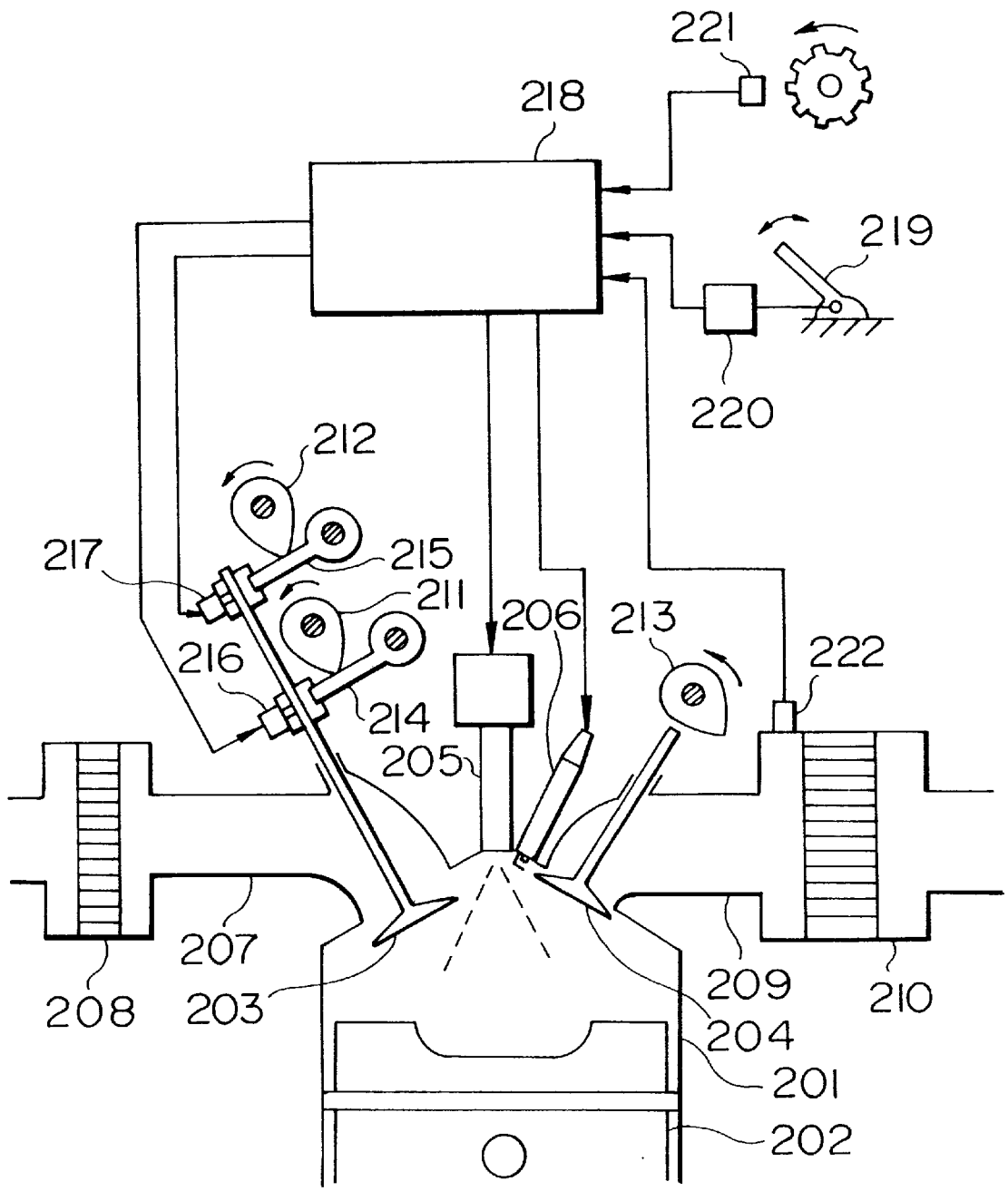
FIG. 17 is a view illustrating a first embodiment of an engine used in the drive system shown FIG. 1.

Explanation will be made hereinbelow a first embodiment of an engine which is used in the abovementioned drive system. Referring to FIG. 17, the engine 201 incorporates a piston 202 having a concave combustion chamber, an intake valve 203, an exhaust valve 204, a fuel injection valve 205, a spark plug 206, an intake pipe 207 in which an air cleaner 208 is located, and an exhaust pipe 209 in which a catalytic converter 210 for purifying nitrogen oxide is incorporated. The intake valve 203 is driven by a low load cam 211 and a high load cam 212. The exhaust valve 204 is driven by a cam 213. The cam 211 presses a rocker arm 214 while the cam 212 presses a rocker arm 215. In this arrangement, under a low load, a solenoid 216 is energized so as to connect the rocker arm 215 with the intake valve 203. The spark plug 206, the fuel injection valve 205 and solenoids 216, 217 are operated under the control of a control apparatus 218, a position (degree of depression) of an accelerator pedal 219 detected by a potentiometer 220, a speed of the engine detected by a speed sensor 221 and an air-fuel ratio of exhaust gas detected by an air-fuel ratio sensor 222 are delivered to the control apparatus 218.

Figure 18:
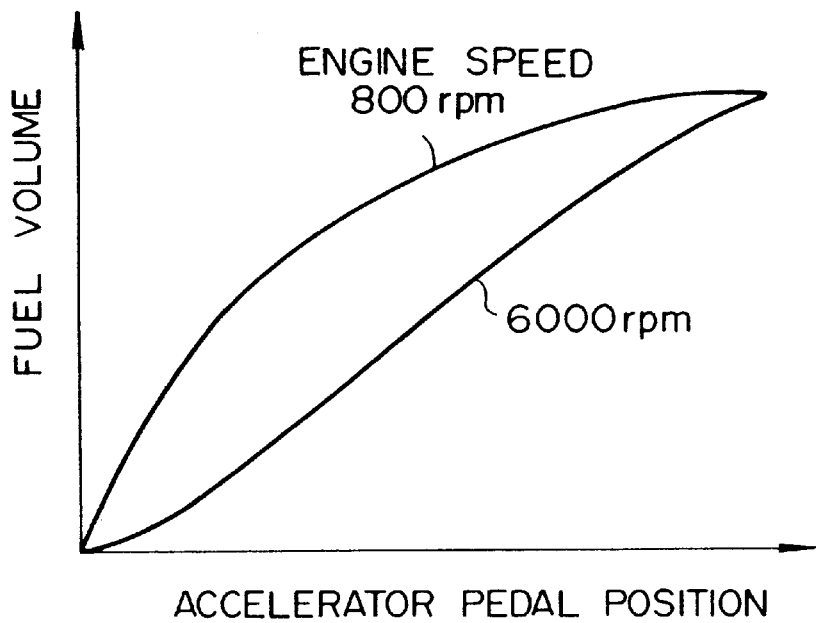
FIG. 18 is a view for explaining relationship between position of an acceleration pedal and fuel volume.
Figure 19:
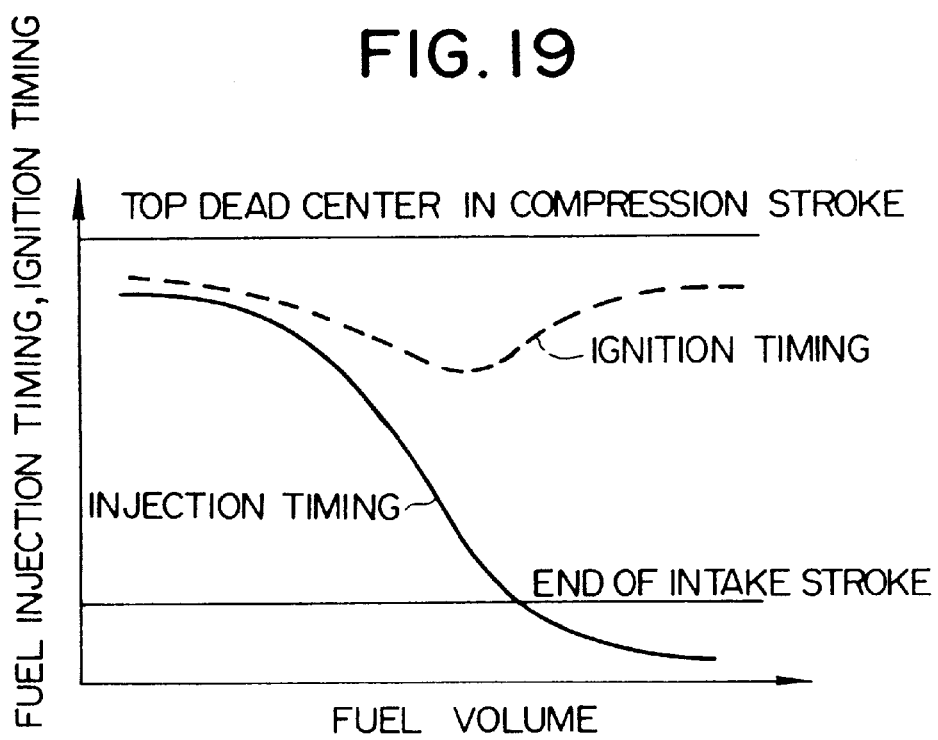
FIG. 19 is a view for explaining relationship among the fuel volume, injection timing and ignition timing.

The fuel injection volume injected from the fuel injection valve 205 is controlled in accordance with a position of the accelerator pedal 219 as shown in FIG. 18. The reason why the fuel injection volume is decreased when the engine speed is high, is such as to prevent the engine from overrunning as is well-known. Since the ratio between air volume and fuel volume becomes large so that the mixture is lean when the fuel volume is small, the injection timing is retarded up to a position near to the compression dead-center, as shown in FIG. 19, and accordingly, fuel is concentrated around the spark plug 206 in order to stabilize the ignition. It is well-known that the injection timing is set to be earlier than the end of an intake stroke so as to promote the mixing of fuel and air when the fuel volume is large. It is also well-known that the ignition timing is set to be later than the injection timing, as shown in FIG. 19, and when the fuel volume is larger, it is retarded. The fuel volume, the injection timing and the ignition timing shown in FIGS. 18, 19 are controlled by the control apparatus 218 as mentioned before.

Figure 20:
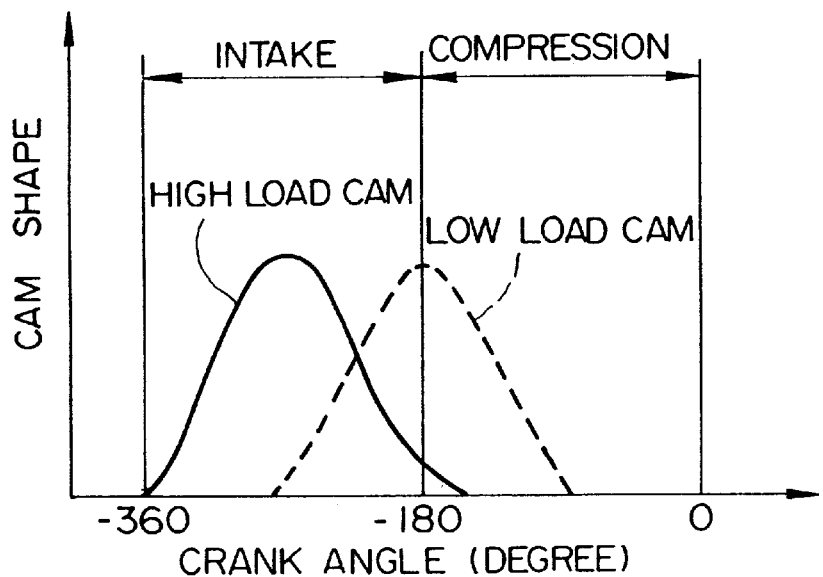
FIG. 20 is a view for explaining relationship between operation of an opening and closing cam for an intake valve and crank angle.
Figure 21:
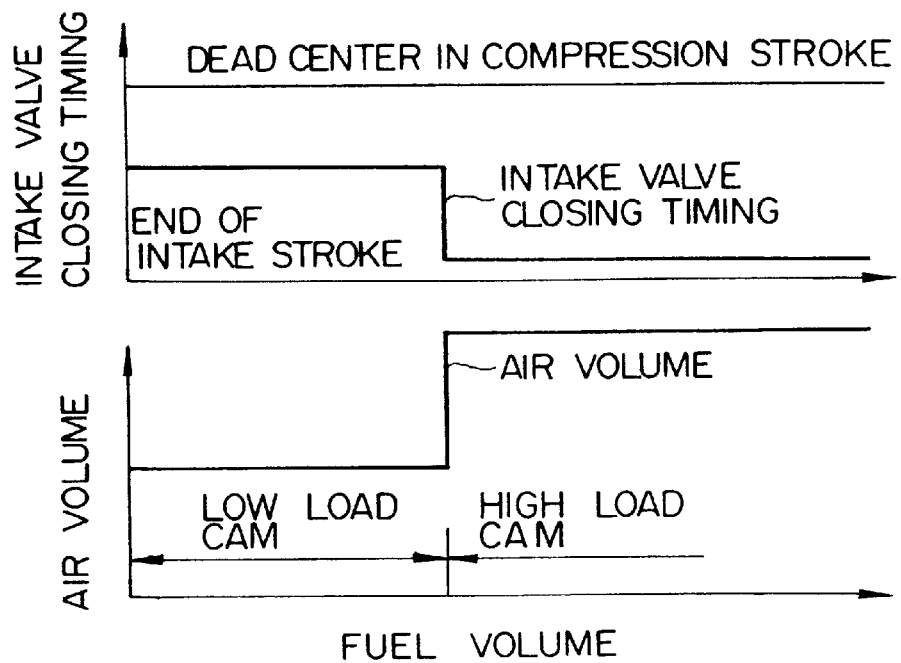
FIG. 21 is a view for explaining relationship among fuel volume, air volume and intake valve closing timing.
Figure 22:
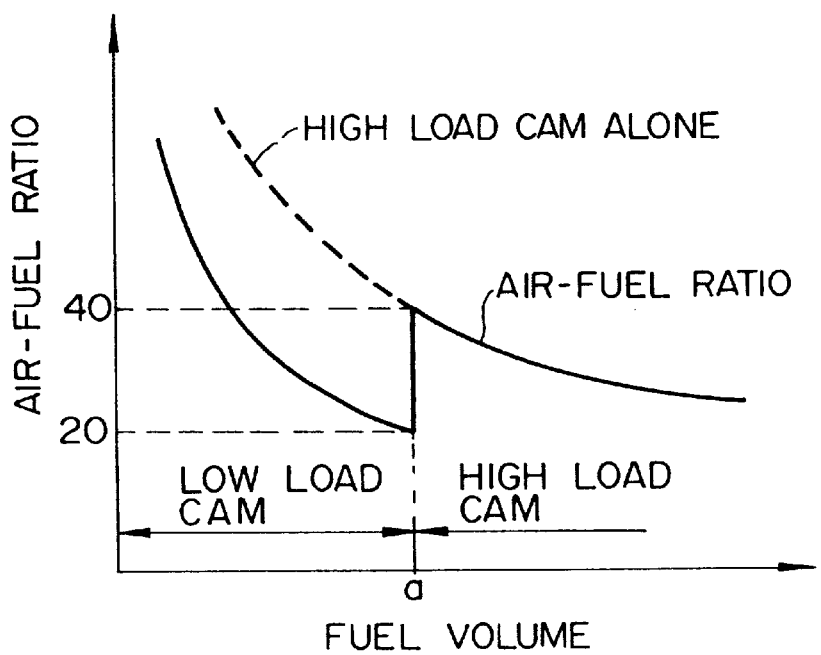
FIG. 22 is a view for explaining relationship between fuel volume and air-fuel ratio.
Figure 23:
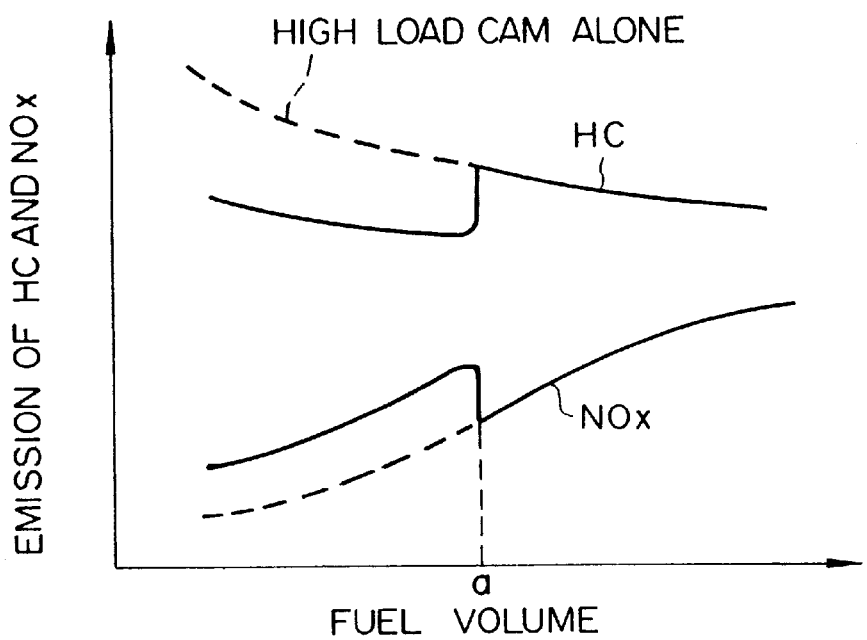
FIG. 23 is a view for explaining relationship between fuel volume and emission of nitrogen oxide and hydrocarbon.

The shapes of the high load cam 212 and the low load cam 211 are shown in FIG. 20. The low load cam 211 opens the intake valve 203 until a middle point of a compression stroke. On the contrary, the high load cam 212 which has the same shape as that of a conventional one, closes the intake valve 203 at the initiation of a compression stroke. Accordingly, the solenoids are switched so that the high load cam 212 is coupled to the intake valve 203 when the fuel volume is large but the low load cam 211 is coupled to the intake valve 203 when the fuel volume is less. Accordingly, the characteristic of air volume can be obtained as shown in FIG. 21. The exhaust valve 213 is closed at the end of an exhaust stroke, similar to a conventional one. Thus, the air volume is small as the fuel volume is small, and accordingly, it is possible to prevent the air-fuel ratio from increasing in a range where the fuel volume is small, as shown in FIG. 22 so as to stabilize the combustion even though the fuel volume is small. At this time, if the fuel volume is set to a value (a) as shown in FIG. 22, the air volume is set so as to prevent the air-fuel ratio from being lower than 16 since the nitrogen oxide emission becomes locally maximum around an air-fuel ratio of 16. Accordingly, the closing timing of the intake valve shown in FIG. 21 is set so as to allow the air-fuel ratio to satisfy the above-mentioned condition. Accordingly, as shown in FIG. 22, the increment of hydrocarbon emission in a range where the fuel volume is small, can be restrained, and as well, the increment of nitrogen oxide emission can be restrained, as shown in FIG. 22. The air-fuel ratio shown in FIG. 22 is detected by the air-fuel ratio sensor 222, and accordingly, if air-fuel. ratio approaches to a value 16 at the point a, the fuel volume is decreased or the closing timing of the intake valve is advanced so as to correct to the air-fuel ratio. Accordingly, the nitrogen oxide emission is prevented from increasing.

Figure 24:
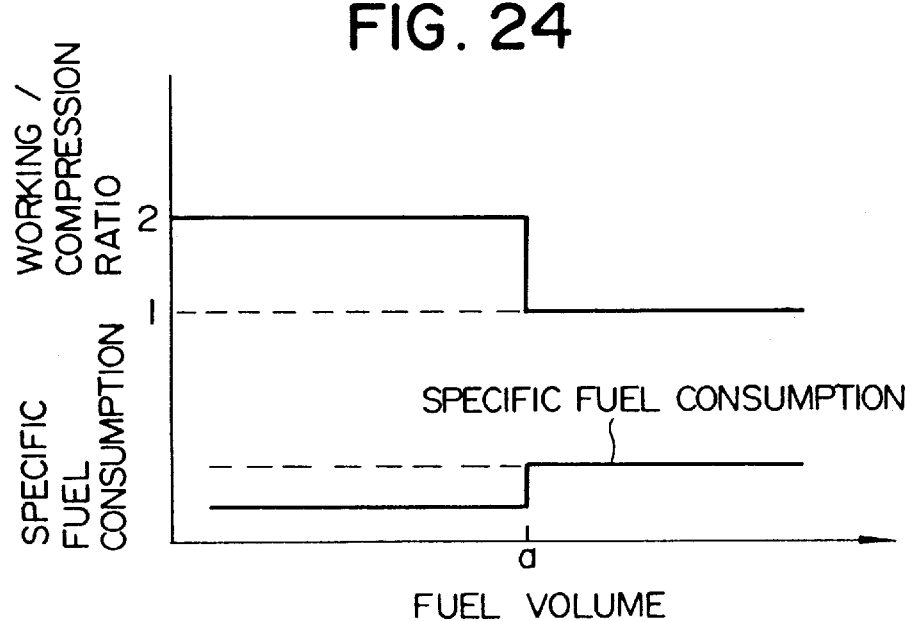
FIG. 24 is a view for explaining relationship among fuel volume, fuel consumption rate and ratio between working and compression strokes.

As shown in FIG. 24, since the closing timing of the intake valve is retarded, the compression stroke is decreased, but the working stroke is not changed. Accordingly, the ratio between expansion and compression becomes 2 so that the expansion work is effectively transmitted to the piston, and as a result, the fuel consumption rate is reduced by 10%. The retardation of the closing timing of the intake-air valve is well-known in view of a Miller cycle engine. However, it is novel in the combination of the in-cylinder fuel injection. That is, multiplier technical effects and advantage can be obtained in the combination between the effect given by a Miller cycle engine which effectively uses an expansion work and the effect of stabilization of fuel due to a decrease in air volume in the engine cylinder.

In the first embodiment shown in FIG. 17, the closing timing of the intake valve 203 is controlled so as to increase the air volume in a range where the fuel volume is large. Alternatively, the supercharge pressure may be increased while the closing timing is unchanged in order to increase the air-volume. In this case, the ratio between expansion and compression becomes 2 even in a range where the fuel volume is large, and accordingly, the specific fuel consumption can be decreased as a whole.

As mentioned above, stable operation can be made at a high excess air factor (high air-fuel ratio) by in-cylinder fuel injection, and further, the expansion work can be effectively used by retardation of the closing timing of the intake valve. As a result, the fuel consumption can be greatly reduced while the emission of hydrocarbon and nitrogen oxide is reduced.

An increase in air volume in the case of the retardation of the closing timing of the intake valve 203 can be carried out by adjusting the supercharging pressure or by adjusting the closing timing the intake valve 203. In the this first embodiment as shown in FIG. 17, it has been explained that the closing timing is changed stepwise. However, the closing timing may also be changed continuously in an easy manner even with the use of conventional technology.

In a conventional in-cylinder fuel injection engine, the injection timing and the ignition timing have been set under such a condition that the air-volume in an engine cylinder is constant. However, as in this embodiment, it is difficult to sufficiently cope with an increase in the air volume in a range where the fuel volume is large. If the air volume increases, the concentration of fuel around the spark plug 206 becomes less if the injection timing is unchanged, and accordingly, the combustion is unstable. In order to avoid this phenomenon, it is required to control the injection timing and the ignition timing, depending upon a variation in the air volume.

That is, the engine in the first embodiment is essential with the provision of either one of the following matters.

(1) the air volume is precisely controlled in accordance with a variation in load (for fuel mass), and the injection timing and the ignition timing are precisely controlled in accordance with a variation in load, that is, an air-fuel ratio of exhaust gas is detected by the air-fuel ratio sensor 222 so as to know an error in the air-volume under control, and accordingly, operation for correction is made; and (2) the injection timing and the ignition timing are precisely controlled in accordance with a variation in load, and further, the injection timing and the ignition timing are controlled in synchronization with an air-volume control signal such as a control signal for the solenoid 216 or 217.

Figure 25:
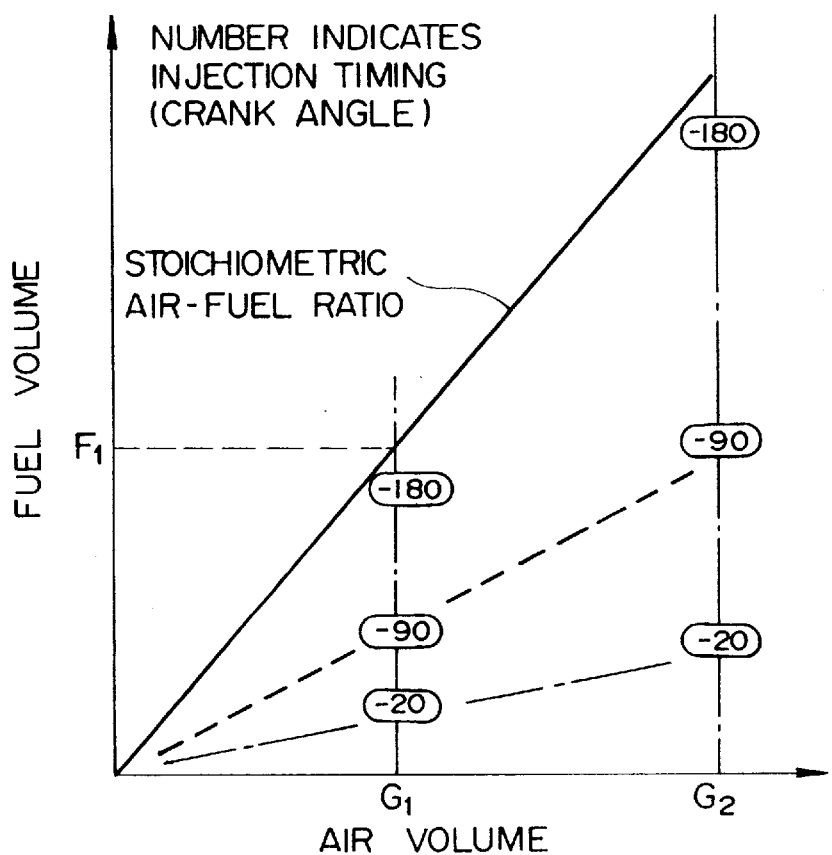
FIG. 25 is a view for explaining relationship between fuel volume and fuel consumption rate.

Referring to FIG. 25, if the air volume has a value $G_2$, the injection timing becomes more and more negative as the fuel volume is increased. That is, since the compression dead center is set to zero, the injection timing is advanced up to a crank angle of −180 deg. that is, up to the initiation of a compression stroke.

In a Miller cycle engine, the air volume is lowered to, for example, a value $G_1$ if the supercharge pressure is decreased. At this time, should the fuel injection timing be fixed with respect to the fuel volume, as a conventional one, the induction timing near a stoichiometric air-fuel ratio would be −90 deg. so that the mixing of air and fuel could not be promoted. On the contrary, according to the present invention, the injection timing is advanced to −180 deg. so as to promote the mixing of air and fuel, thereby it is possible to stabilize the combustion.

Figure 26:
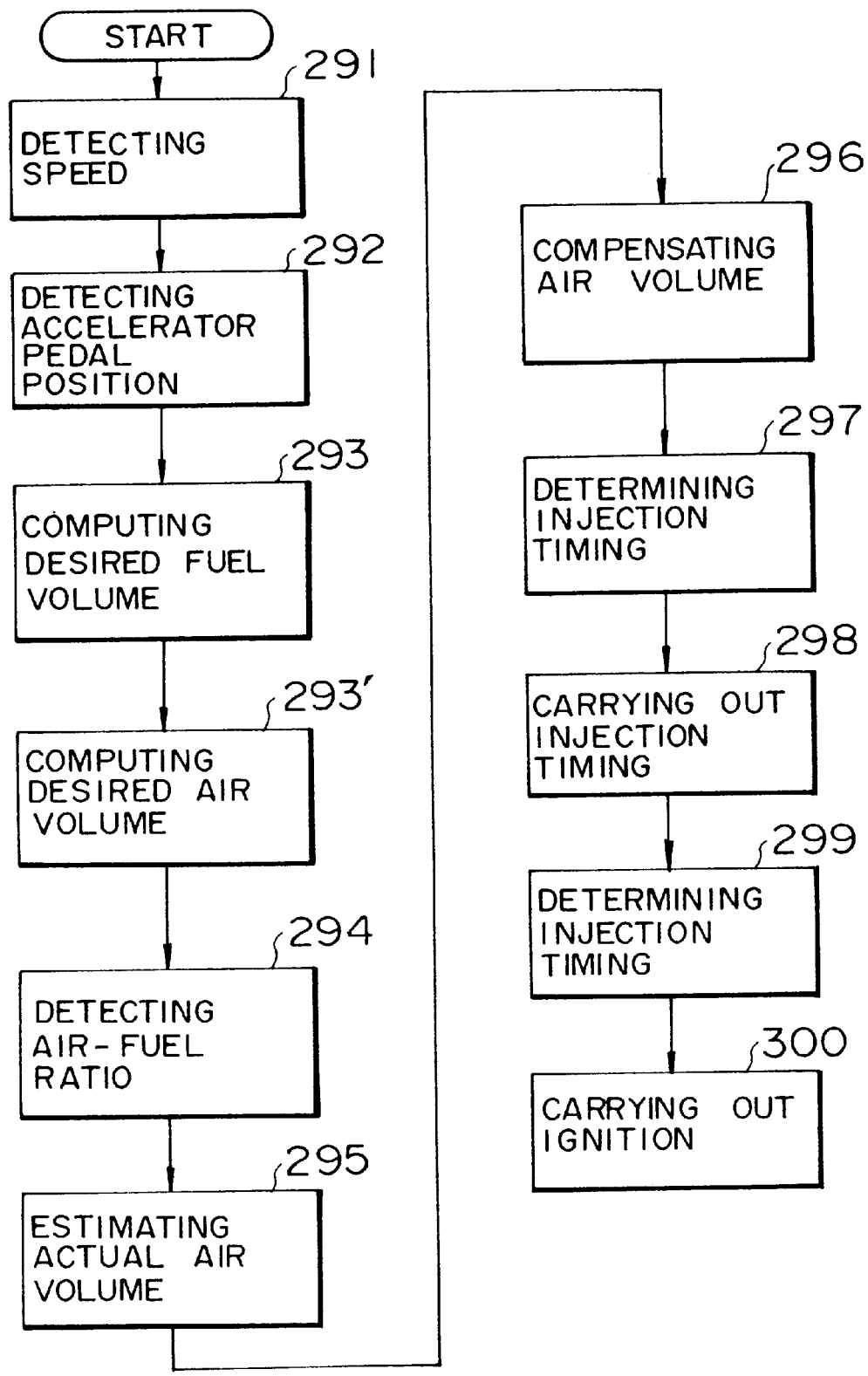
FIG. 26 is a flow chart for explaining control of the first embodiment of the present invention.

Referring to FIG. 26 which is a control flow chart for the present embodiment, at step 291, the engine speed is detected, and at step 292, a position of the accelerator pedal is detected. At step 293, a desired fuel volume is computed from both detected values. That is, the desired fuel is read from a table on which data obtained from a chart shown in FIG. 18 is mapped. Referring to FIG. 24, when the air volume is larger than a value $F_1$, the air volume is set to a value $G_2$, but when if it is less than the value $F_1$, the air volume is set to a value $G_1$. At step 293', the air volume may be set continuously with respect to the fuel volume. At step 294, an air-fuel ratio is detected by the air-fuel ratio sensor 222, and at step 295, an actual air volume is estimated from the detected value. As step 296, the air volume is corrected in accordance with the estimated air volume by adjusting the supercharge pressure, by adjusting the intake pipe pressure with the use of a throttle valve incorporated in the intake pipe 7, or by adjusting the closing timing of the intake valve. At step 297, with the use of a table as shown in FIG. 25, which gives an injection timing with respect a fuel volume, an air volume and an engine speed, the fuel timing is determined, and at step 298, an actual fuel injection is carried out. At step 299, similar to the determination of the injection timing at step 298, the ignition timing is determined with the use of a table which gives an ignition timing with respect to a fuel volume, an air volume and an engine speed, and at step 300, an actual ignition is carried out.

In the case of a four-stroke engine, the steps in the flow chart shown in FIG. 26 are carried out once in every two revolutions. Meanwhile in the case of a two-cycle engine it is carried out once in every one revolution.

Figure 27:
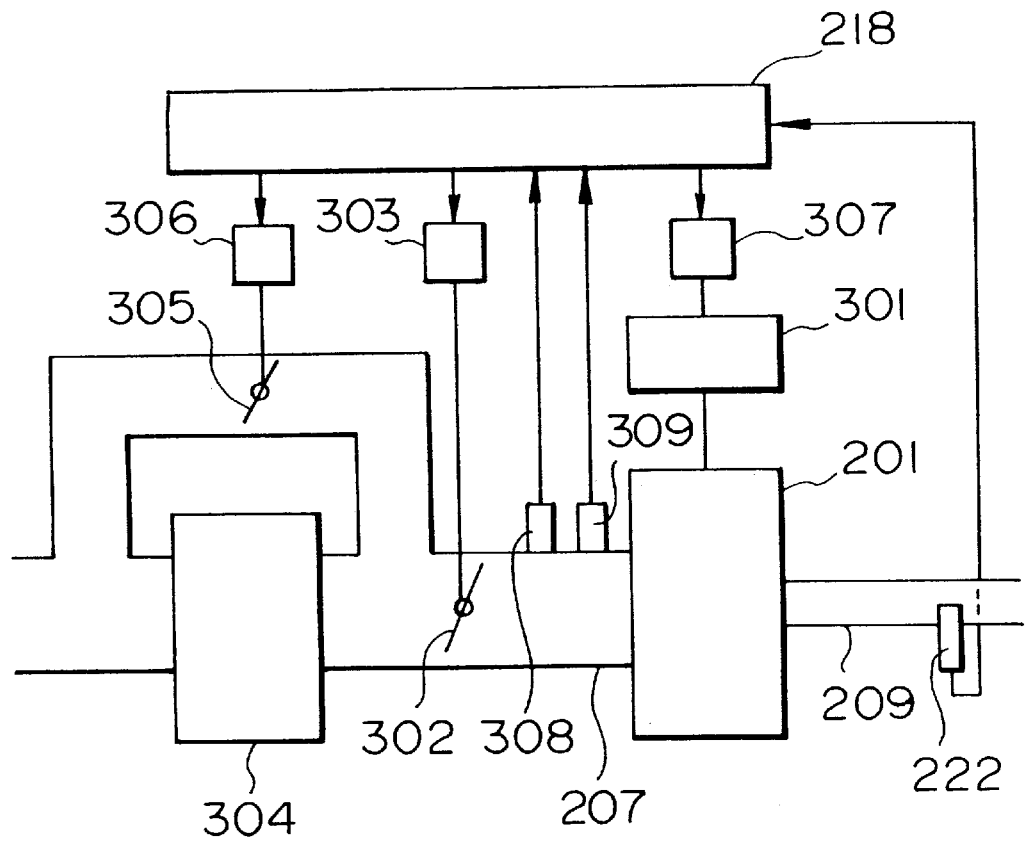
FIG. 27 is a schematic view illustrating a control apparatus for air volume.

Referring to FIG. 27 which shows an air volume control apparatus, a closing timing control device 301 for the intake valve 203 shown in FIG. 17, is controlled by a solenoid actuator 307. If the closing timing is retarded, the air volume is decreased. If the closing timing is advanced to the end of an intake stroke, the air volume is increased. Second, a throttle valve 302 is incorporated in the intake pipe 207, and is controlled by a motor actuator 303. If the valve 302 is opened, the air volume is increased, but if it is closed, the air volume is decreased. Third, a compressor 304 is incorporated, and is driven by a motor or the engine 201 so as to increase the pressure of air in order to increase the air volume. A bypass valve 305 is actuated by a motor 306 so as to be opened, the air volume is decreased. Since the air volume is changed, depending upon a variation in the atmospheric pressure or the air temperature, output signals from a temperature sensor 308 and a pressure sensor 309 are delivered to the control apparatus 218, and accordingly, at step 295 shown in FIG. 26, the air volume is estimated in accordance with the output signals.

Figure 28:
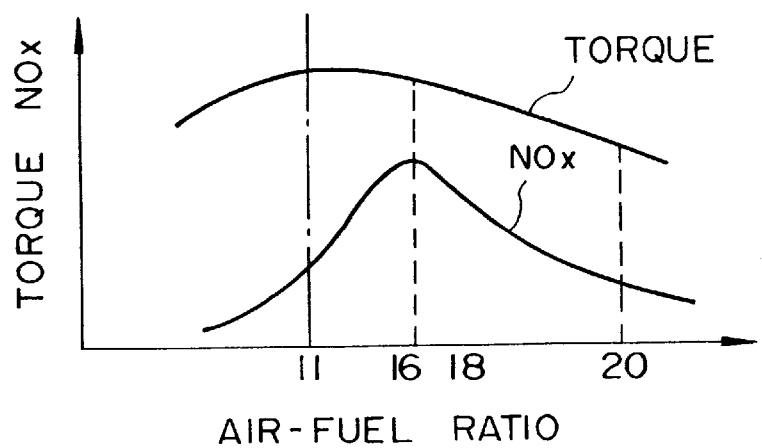
FIG. 28 is a view for explaining relationship among air-fuel ratio, torque and emission of nitrogen oxide.
Figure 29:
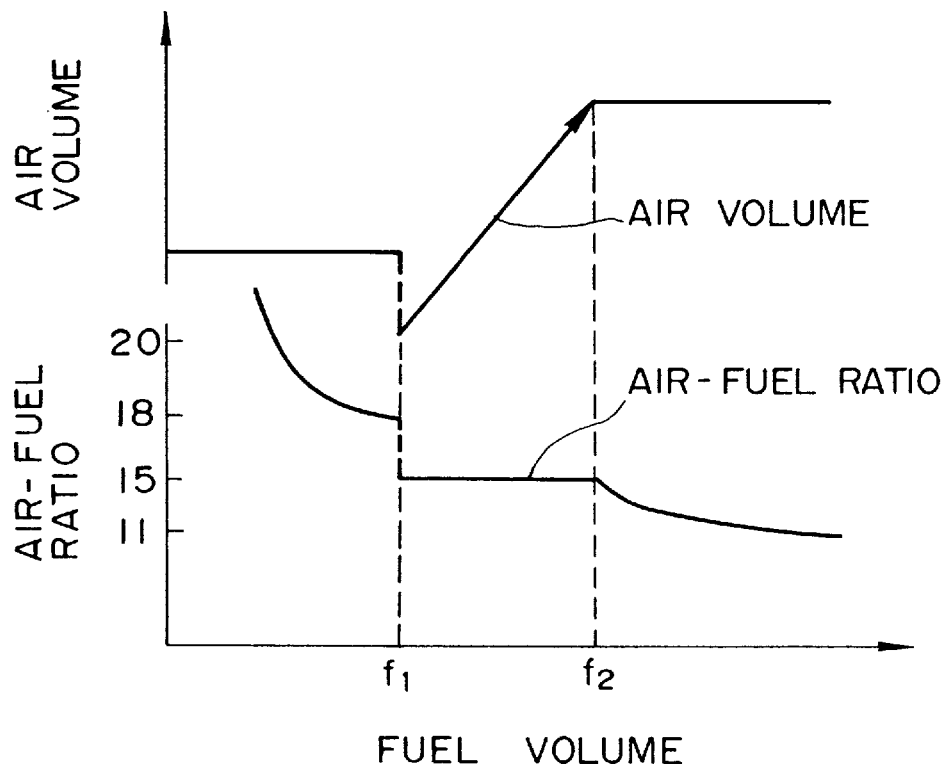
FIG. 29 is a view for explaining relationship among fuel volume, air-fuel ratio and air volume.

The maximum air volume is restrained by the stroke volume of the engine 201 and the capacity of the compressor. It is required for increasing the power or torque of the engine 201 to increase the fuel volume up to a value at which the air-fuel ratio becomes 11, as shown in FIG. 28, similar to a conventional engine, the density of nitrogen oxide (NOx) exhibits a local maximum value in an air-fuel ratio range from 16 to 18, and accordingly, the engine 1 is driven, keeping away from this range. As shown in FIG. 29, if the fuel volume is less than a value $f_1$, the air volume is set to be small so as to set the air-fuel ratio to a value larger than 18. Meanwhile if the fuel volume is larger than a value $f_2$, the air volume is set to be large so as to set the air-fuel ratio to a value less than 14.7 (stoichiometric air-fuel ratio). If the fuel volume is between values $f_1$, $f_2$, the air volume is continuously changed in order to control the air-fuel ratio at a stoichiometric air-fuel ratio. In this range, the nitrogen oxide is purified with the use of three-way catalyst.

Figure 30:
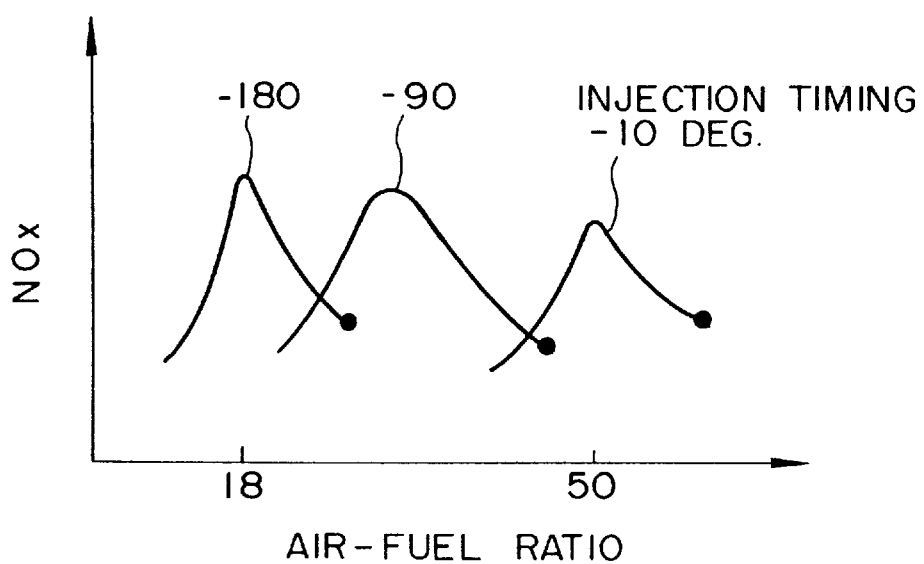
FIG. 30 is a view for explaining relationship among air-fuel ratio, quantity of nitrogen oxide and air-volume.

Referring to FIG. 30 which shows the NOx emission with respect to the air-fuel ratio, the later the injection timing, the larger the air-fuel ratio which exhibit a peak value of NOx. With the air-fuel ratio higher than a mark ● on the curve, the combustion of the engine becomes unstable. Accordingly, the engine is operated on the right side of the mark ●. However, if the air-fuel ratio becomes small, the emission of NOx increases, and accordingly, the engine is driven adjacent to the mark ●. That is, the setting of the air-fuel ratio with respect to the injection timing, the setting of the injection timing with respect to the air-fuel ratio, or the setting of air-fuel ratio with respect to the fuel volume (refer to FIG. 19) is determined in accordance with empirical data as shown in FIG. 30. If the injection timing is delayed while the air-fuel ratio is unchanged, the emission of NOx increases. When the air-fuel ratio is decreased with respect to the fuel volume, if the advance control of the injection timing is delayed, the emission of NOx is delayed. However, in this embodiment, since the fuel injection valve 5 is electrically controlled, the injection timing is not delayed, and accordingly, it is possible to prevent the emission of NOx from increasing.

As mentioned above, although explanation has been made of the first embodiment of the in-cylinder fuel injection engine in which the mixture is ignited and burnt by the spark plug, it goes without saying that present invention can be applied for a self-ignition engine such as a Diesel-engine. Further, in the first embodiment, although the Miller cycle engine having a ratio between compression and working strokes of less than 1, in which the closing timing of the intake valve is retarded, has been explained as an example, the Miller cycle engine can also be realized by such an arrangement that the closing timing of the intake valve is advanced, that is, the intake valve is closed intermediate of an intake stroke.

In this embodiment, the fuel injection timing can be controlled in accordance with the air volume in the engine cylinder in this embodiment, it is possible to prevent generation of soot, occurrence of unstable combustion and increasing of NOx.

Further, since the ratio between compression and working strokes is set to be less than 1 and the sable combustion is attained, the compression work can be reduced, thereby it is possible to enhance the fuel economy.

Explanation will be hereinbelow made of a second embodiment of an engine used in the drive system according to the present invention.

Figure 31:
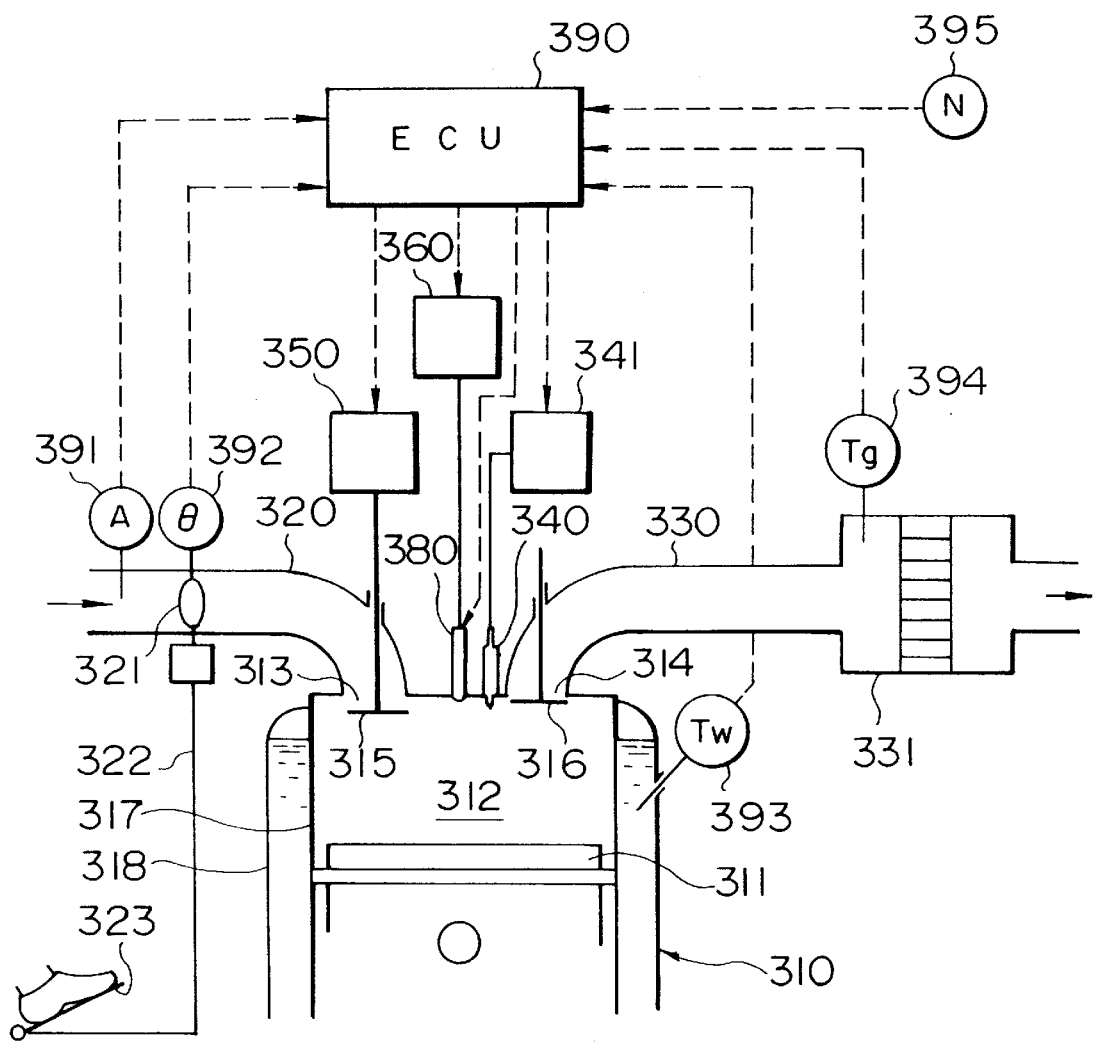
FIG. 31 is a schematic view illustrating a second embodiment of an engine used in the drive system shown in FIG. 1.

Referring to FIG. 31 which shows an arrangement of an engine and components therearound in the second embodiment, the engine in this embodiment is a gasoline type four cylinder MiIller cycle engine 310 having a cylinder head formed therein with an intake port 313 and an exhaust port 314 which are connected respectively to an intake pipe 320 and an exhaust pipe 330. Further, a fuel injection valve 380 and a spark plug 340 are provided in the cylinder head. Further, an intake valve 315 is provided in the intake port 313, and an exhaust valve 316 is provided in the exhaust port 316. The intake pipe 310 is provided therein with a throttle valve 321 for adjusting the flow rate of air flowing therethrough. Meanwhile, the exhaust pipe 330 is provided therein with a catalytic converter 331 for removing detrimental components from exhaust gas flowing therethrough. A water jacket 318 reserving therein cooling water is provided around the outer periphery of an engine cylinder 317. The water jacket 318 is connected with a radiator (which is not shown) through the intermediary of a pipe so that the cooling water is circulated between the water jacket and the radiator.

An intake and exhaust valve drive mechanism 350 is coupled to the intake valve 315 and the exhaust valve 316. Further, the fuel injection valve 380 in each engine cylinder 380 is connected with a fuel distributor (injection timing adjusting means) 360. The throttle valve 321 is coupled to an accelerator pedal 323 through the intermediary of a wire 322 so as to be operated in association with a degree of manipulation of the accelerator pedal 323. The spark plug 340 is connected to a spark plug drive circuit 341. The intake and exhaust valve drive mechanism 350, the fuel distributor 360, the fuel injection valve 380 and the ignition plug drive circuit 341 are connected to a control unit (ECU) 390 which delivers control signals thereto.

The intake pipe 320 incorporates an air-flowmeter 319 for detecting a mass flow rate A of air flowing therethrough. Meanwhile, the exhaust pipe 330 incorporates an exhaust gas thermometer 394 for detecting a temperature Tg of exhaust gas flowing therethrough. Further, the water jacket 318 incorporates a cooling water thermometer 393 for detecting a temperature Tw of cooling water flowing therethrough. The throttle valve 321 is provided thereto with a throttle opening degree meter 392 for detecting a degree thereof. The engine has a crankshaft (which is not shown) is provided thereto with a engine speed meter 395 for detecting a speed of the engine.

The air flowmeter 391, the throttle opening degree meter 392, the cooling water thermometer 393 and the exhaust gas thermometer 391 are connected to the control unit 390 which therefore receives detection signals from these meters.

The control unit 390 is the so-called microcomputer, and incorporates an A/D converter (which is not shown) for converting analog signals from these meters 391, 392. 393, into digital signals, a ROM (which is also not shown) in which several programs and the like are stored, a CPU (which is not shown) for carrying out several kinds of computation in accordance with the programs stored in the ROM, a RAM (which is not shown) in which detection results from the meters and computation results from the CPU are temporarily stored, and the like. This control unit 390 serves as a control means for delivering control signals to a fuel injection volume computing means for computing a fuel injection volume, the distributor 360 as a fuel injection timing adjusting means, the fuel injection valve 380 and the like.

Figure 32:
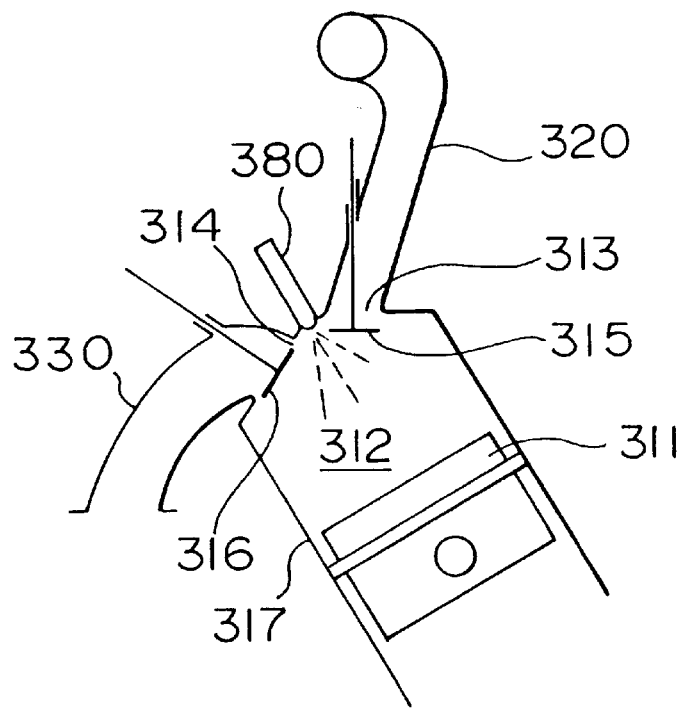
FIG. 32 is a schematic view showing a part around the cylinder head of the engine shown in FIG. 31.
Figure 33:
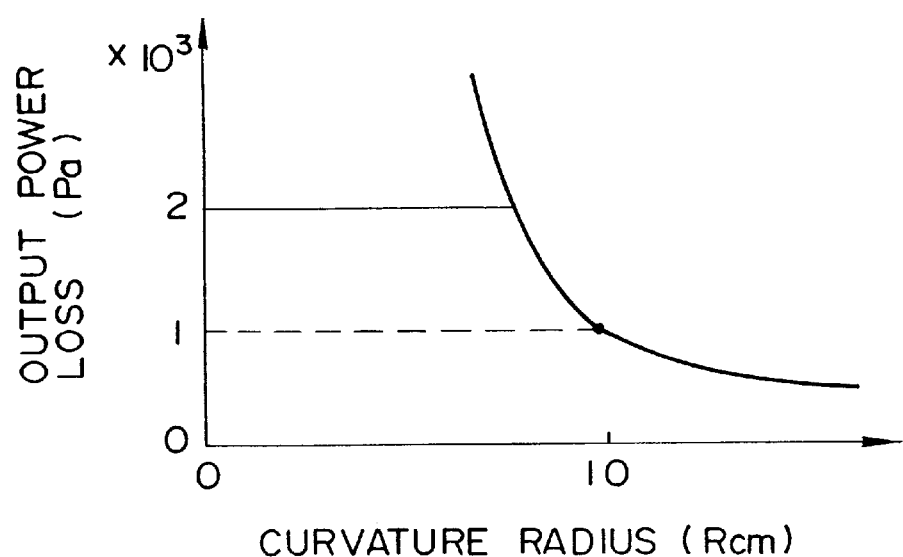
FIG. 33 is a graph for explaining relationship between radius of curvature of an intake pipe and pressure loss.

Referring to FIG. 32, the intake pipe 320 has a straight part in the vicinity of the intake port 313 of the engine 310. In this arrangement, the relationship between the radius R of curvature of the intake pipe 320 in the vicinity of the intake port 313 and the pressure loss is shown in FIG. 33. That is, if the radius R of curvature of the intake pipe 320 is 10 cm, the pressure loss of the intake pipe 320 is $1\times10^3$ Pa which is a substantially minimum value. Accordingly, even though the radius R of curvature is further increased, the pressure loss cannot be further decreased substantially. The value $1\times10^3$ Pa given by setting the radius R of curvature to 10 cm, does not affect the output power of the engine 310, substantially. Accordingly, in this embodiment, the radius R of curvature of the intake pipe 320 in the vicinity of the intake port 313 is set to be slightly larger than 10 cm so as to prevent air stream from breaking away, in order to reduce the pressure loss as far as possible. As a result, the air volume charged into the engine 310 is increased, and accordingly, the output power of the engine 310 is enhanced.

Figure 34:
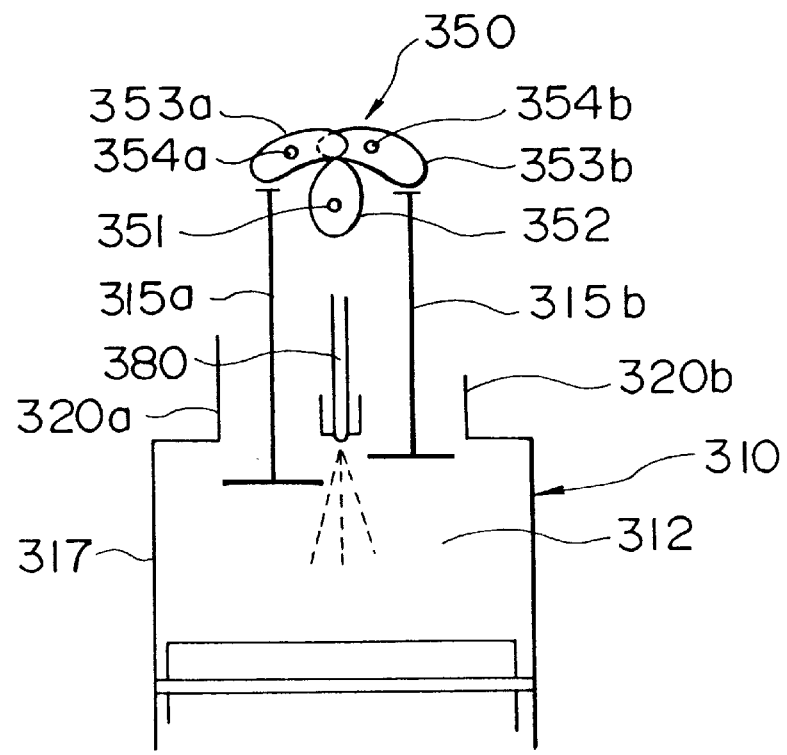
FIG. 34 is a schematic view for illustrating an intake and exhaust valve drive system show in FIG. 1.

In this embodiment, referring to FIG. 34, two intake valves 315 and two exhaust valves 316 (only one intake valve 315a and one exhaust valve 316 are depicted in the figure) are provided for each engine cylinder. The intake and exhaust valve drive mechanism 350 is adapted to operate these valves 315, 316 with appropriate timing. The intake and exhaust valve drive mechanism 350 has a cam shaft 351 coupled to the crankshaft (which is not shown) of the engine 310 through the intermediary of a timing chain, a cam 352 adapted to be rotated in association with the rotation of the cam shaft 351, rocker arms 353a, 353b making contact at one end thereof wit the peripheral surface of the cam 352 and at the other end thereof with the stem heads of the valves 315a, 316a, and rocker shafts 354a, 354b for swingably supporting the rocker arms 353a, 353b. The rocker arms 353a, 353b swing at one end thereof along the peripheral surface of the cam, and accordingly, press, at the other end thereof, the stems of the valves 315a 316a which are therefore operated. The lifts and the operation timing of the valves 315a, 316a can be adjusted by changing the profile of the cam 352. The operation timing of the valves will be described hereinbelow. Although a drive mechanism for the exhaust valves 316 is not shown in FIGS. 31 and 34, the basic structure thereof is similar to the drive mechanism for the intake valves 315 which is shown in FIG. 34.

Figure 35:
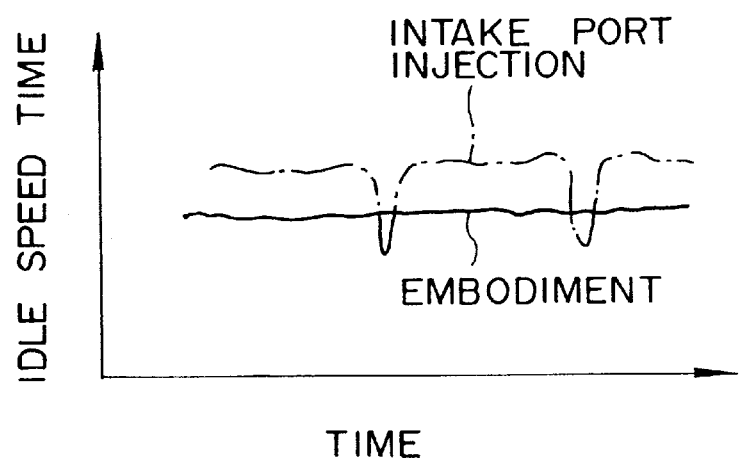
FIG. 35 is a graph for explaining stability of engine speed caused by intake air port injection and in-cylinder fuel injection during idling operation.

In this embodiment, as shown in FIG. 34, the fuel injection valve 380 is arranged so as to inject fuel direct into the cylinder chamber 312 of the engine 310. In an intake port fuel injection system as is seen in a general gasoline type engine, fuel sticks to the inner surface of the intake pipe 320 and the upper surface of the intake valve 315, and as a result, fuel cannot be fed into the cylinder chamber by a desired volume at a desired time, and accordingly, the combustion in the cylinder chamber possibly becomes unstable. In particular, if the lift of the intake valve 315 is small (that is, less than 1.98 mm), fuel stagnating on the upper surface of the intake valve 315 discretely enters into the cylinder chamber, causing the combustion to be unstable, and accordingly, the tendency of unstable revolution of the engine is high. In view of the foregoing, in this embodiment, the fuel is injected direct into the engine cylinder so as to prevent the fuel from sticking to the inner surface of the intake pipe 320 and the upper surface of the intake valve 315. Further, in this embodiment, during an intake stroke in a low engine speed range, of two intake valves 315a, 315b, the one 315b is temporarily stopped, while the other 315a is opened so as to create a swirl flow in the cylinder chamber 312 in order to promote the combustion. As a result, as shown in FIG. 35, according to this embodiment, the engine speed during idle operation is remarkably stable.

Figure 36:
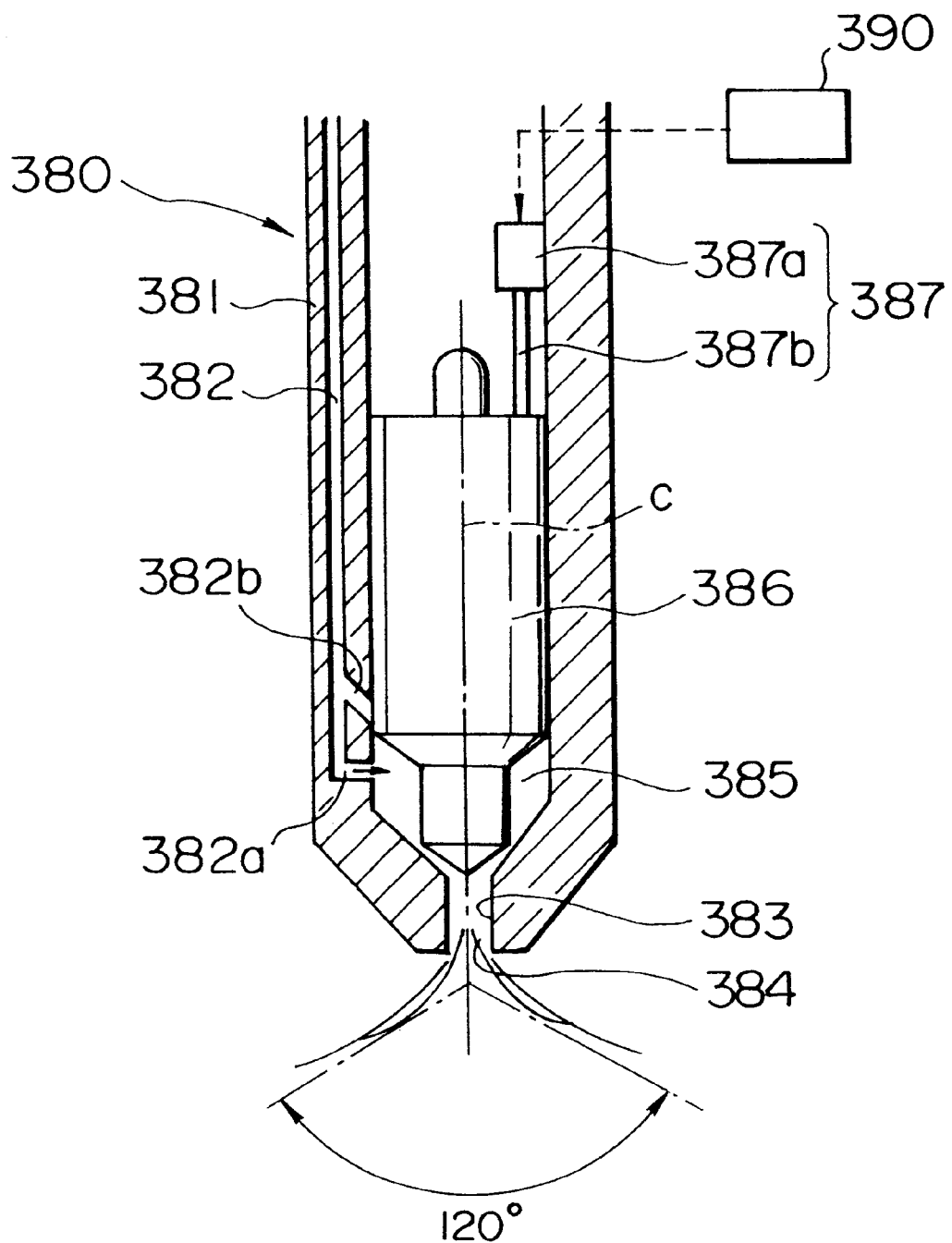
FIG. 36 is a sectional view illustrating a first embodiment of a fuel injection valve (in a condition of wide angle atomization)
Figure 37:
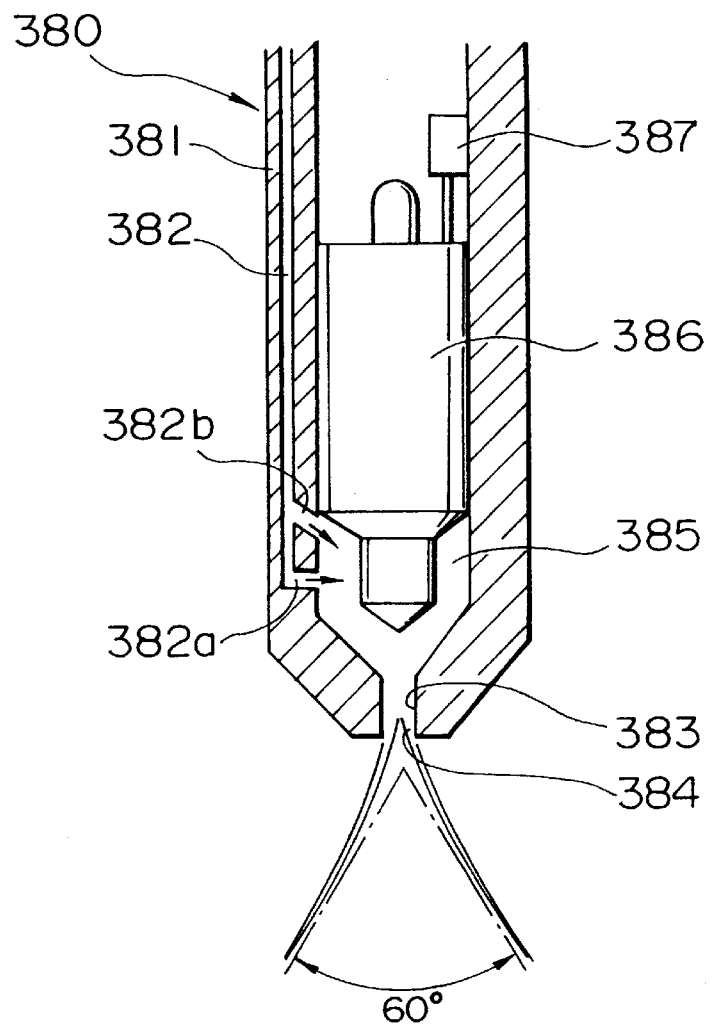
FIG. 37 is a sectional view illustrating the fuel injection valve shown in FIG. 36 (in a condition of narrow angle atomization)

The fuel injection valve 380 is composed of, as shown in FIG. 36, a valve element 386, a position adjuster 387, fuel passages 382, 383, a valve displacement space 385, and a valve casing 381 for housing the above-mentioned components. The fuel passages 382, 383 have one ene part formed therein with a fuel inlet port (which is not shown) and the other end part formed therein a fuel jet port 384. The valve displacement space 385 is formed intermediate of the fuel passages 382, 383, and fuel flows into the valve displacement space 385. That is, a part of the valve displacement space 385 serves a fuel passage. The passage (which will be hereinbelow denoted "valve space outlet side passage") 383 between the valve displacement space 385 and the fuel jet port 384 is formed in a cylindrical shape. The passage (which will be hereinbelow denoted "valve space inlet port side passage") 382 is bifurcated into two passages 382a 382b. One of these passages 382a, 382b, which will be hereinbelow denoted "wide angle atomization passage, is extended, perpendicular to the center axis C of the cylindrical outlet port side passage 383, and the other one of them, (which will be hereinbelow denoted "narrow angle atomization passage") 382b is extended in a direction having an obtuse angle to the center axis C of the outlet port side passage 383. The valve element 386 is located in the valve displacement space 385 so as to be movable among a valve closing position where the valve element 386 blocks the valve displacement space side port of the valve space outlet side passage 383, a wide angle atomization position (as shown in FIG. 36) where it opens the valve displacement space side port of the wide angle atomization passage 382a, but it blocks the valve displacement space side port of the narrow angle atomization passage 382b and a narrow angle atomization position (as shown in FIG. 37) where it opens the valve displacement space side port of the wide angle atomization passage 382a and the valve displacement space side port of the narrow angle atomization passage 382b. The position adjuster 387 has a small-sized stepping motor 387a which receives a control signal from the ECU 390, and a stopper 387b adapted to be driven by the stepping. motor 387a. The position adjuster 387 locates the valve element 386 at a desired position since the stopper 389b makes contact with the valve element 385. Specifically, the position adjuster 387 locates the valve element 386 at one of the above-mentioned valve closing position, wide angle atomization position and narrow angle atomization position in accordance with a signal from the ECU 390.

When the valve element 386 is located at the valve closing position, fuel cannot flow from the valve displacement space 385 to the outlet port side passage 383, and accordingly, no fuel is injected from the fuel injection valve 380. When the valve element 386 is located at the wide angle atomization position, only the wide angle atomization passage 382a which is extended in a direction perpendicular to the outlet port of the passage 383 is opened. Accordingly, when the fuel comes out from the wide angle atomization passage 382, the fuel is turned into a swirl flow in the valve displacement space 385, and is jetted from the fuel injection port 384 in a conical shape through the outlet port side passage 383. Further, when the valve element 386 is located at the narrow angle atomization position, both wide angle atomization passage 382a and narrow angle atomization passage 382b are opened. Since the narrow angle atomization passage 382b is extended in a direction having an obtuse angle to the outlet port side passage 383, the swirling power of the fuel having come out from the wide angle atomization passage 382a is decreased. Accordingly, the divergent atomization angle of the fuel jetted from the fuel injection port 384 is narrower when the valve element 386 is located at the narrow angle atomization position, than when it is located at the wide angle atomization position. Specifically, as shown in FIG. 36, when the valve element 386 is located at the wide angle atomization position, the divergent atomization angle of the fuel is 120 deg. while when it is located at the narrow angle atomization position, the divergent atomization angle is 60 deg.

Since the engine 310 in this embodiment is a four cylinder engine as mentioned above, the fuel injection valve 380 is provided for each of the engine cylinders, that is, four fuel injection valves 380 are in total provided in the engine 310. The distributor 360 for distributing fuel fed from a fuel tank (which is not shown) by a fuel pump (which is also not shown) into the fuel injection valves 380, is provided upstream of the latter, as shown in FIG. 31.

The distributor 360 comprises a distributor casing 361, a plunger 366 located in the casing 361 and adapted to be rotated while being reciprocated therein, a plunger drive mechanism 370 for moving the plunger 366 while rotating the same, a fuel flow rate adjusting mechanism 368 for adjusting the volume of fuel fed into each of the fuel injection valves 360 and a fuel injection timing adjusting mechanism 376 for adjusting the timing of feeding fuel into each of the fuel injection valves 360.

The distributor casing 361 is formed therein with a plunger moving space 365, a fuel inlet port 362 communicated with the plunger moving space 365, and four fuel outlet ports 363a, . . . 363d (refer to FIG. 43) respectively communicated with the fuel injection valves 380a, . . . 380d. The casing fuel inlet port 262 is connected with a fuel pump which is not shown. The plunger 366 is cylindrical, and a main fuel passage 362 is formed at a position corresponding to the center axis of the plunger 366. One end part of the main fuel passage 367 is formed therein with a fuel inlet port 367 for leading fuel having flown into the plunger moving space 365 from the fuel inlet port 362 of the distributor casing 361, into the main fuel passage 367 of the plunger 366, and the other end part of the main fuel passage 367 is formed therein with a fuel discharge port 367b for returning fuel having flown into the main fuel passage 367 into a fuel tank (which is not shown). In an intermediate part of the main fuel passage 37, plunger fuel outlet ports 367c, 367d communicated with the casing fuel outlet ports 363a, . . . 363d are formed. As these fuel outlet ports 367c, 367d, a first fuel outlet ports 367c and a second fuel outlet ports 367d are present, and both ports 367c, 367d are symmetric with each other about the center axis of the plunger 366, and are slightly shifted from each other in the direction in which the center axis of the plunger 366 extends.

The plunger drive mechanism 370 is composed of a cam disc 371 fixed to one end part of the plunger 366, a roller 372 making contact with the outer surface of the cam disc 371 near to the outer periphery thereof, a roller support plate 373 for rotatably supporting the roller 372, a cam shaft 374 coupled to the crankshaft of the engine 319 through the intermediary of a timing belt of the like, and a connecting rod 375 having one end part which is coupled to cam shaft 374 so as to be movable in the direction of the center axis of the plunger 366, and the other end part fixed to the cam disc 371. The crankshaft of the engine 310 and the cam shaft 374 are connected together so that the cam shaft 374 is rotated by one revolution as the crankshaft of the engine 310 rotates by one revolution. Thus, when the crankshaft of the engine 310 rotates by one revolution, the plunger 366 is rotated by two revolutions about the center axis thereof by means of the cam shaft 374, the connecting rod 375 and the cam disc 371. Four convex parts 371a, 371b . . . are formed on the outer surface of the cam disc 371 near the outer periphery thereof. The roller 372 is arranged to make contact with these convex parts 371a, 371b . . . Accordingly, when the cam shaft 374 is rotated by one revolution, the cam disc 371 and the plunger 366 fixed to thereto are rotated by one revolution which reciprocates them by four times.

The fuel flow rate adjusting mechanism 368 is composed of a flow rate adjusting ring 368a which is annular so as to make contact with the outer periphery of the cylindrical plunger 366 and which is reciprocatable between a position where it blocks the plunger fuel discharge port 367b and a position where it opens the fuel discharge port 367b, a solenoid 368b for reciprocating the ring 368a and a connecting rod 368c connecting between the solenoid 368b and the flow rate adjusting ring 368a.

Figure 43:
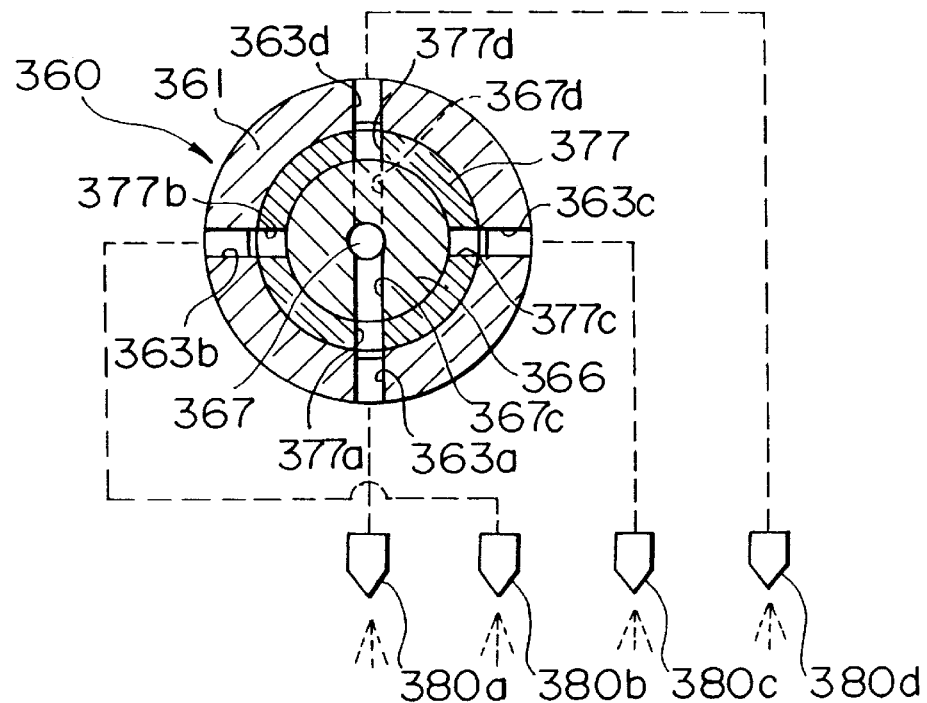
FIG. 43 is a sectional view along line XIII—XIII shown in FIG. 41.

The fuel injection timing adjusting mechanism 376 is composed of an injection timing adjusting ring 377 which is annular so as to make contact with the outer periphery of the cylindrical plunger 366, and which is reciprocatable between a plunger first injection position where it opens the plunger first fuel outlet port 367c while it blocks the plunger second fuel outlet port 367d, and a plunger second injection position where it blocks the plunger first fuel outlet port 367c while it opens the plunger second fuel outlet port 367d, and a solenoid 378 for reciprocating the ring 377, and a connecting rod 379 connecting between the solenoid 378 and the injection timing adjusting ring 377. The injection timing adjusting ring 377 is formed therein with communication holes 377a . . . 377d which are communicated with the fuel outlet ports 363a . . . 363d at the first injection position, as shown in FIG. 43.

The fuel distributor 360 leads fuel from the casing fuel inlet port 362 into the plunger moving space 362 due to the reciprocation of the plunger 366 caused by the rotation of the cam shaft 374 while discharges fuel having flown into the plunger moving space 365, from the plurality of casing fuel outlet ports 363a . . . 363d by way of the main fuel passage 367 of the plunger 366, and the communication holes 377a . . . 377d in the fuel injection timing ring 377. Which one of these casing fuel outlet ports 363a . . . 363d discharges fuel is determined by a rotating angle of the plunger 366, relative to the casing 361. The fuel distributor 360 distributes fuel from the fuel tank into the #1 cylinder fuel injection valve 380a, the #3 cylinder fuel injection valve 380c, the #4 cylinder fuel injection valve 380d and the #2 cylinder fuel injection valve 380b, successively in the mentioned order.

The volumes of fuel discharged from the casing fuel outlet ports 363a, . . . 363d, are adjusted by the fuel flow rate adjusting mechanism 368. Fuel having flown into the plunger main fuel passage 367 from the plunger fuel inlet port 367a can flow out from the plunger fuel discharge port 367b, in addition to the plunger fuel outlet ports 367c, . . . 367d. Accordingly, the fuel discharged from the plunger fuel discharge port 367b is adjusted by suitably moving the flow rate adjusting ring 368a of the fuel flow rate adjusting mechanism 366, and accordingly, the flow rate of fuel discharged, outside of the casing 361, from the plunger fuel outlet ports 367c, 367d through the casing fuel outlet ports 363a, . . . 363d is indirectly adjusted. It is noted that the fuel discharged from the plunger fuel discharge port 376b, is returned into the fuel tank.

Figure 44:
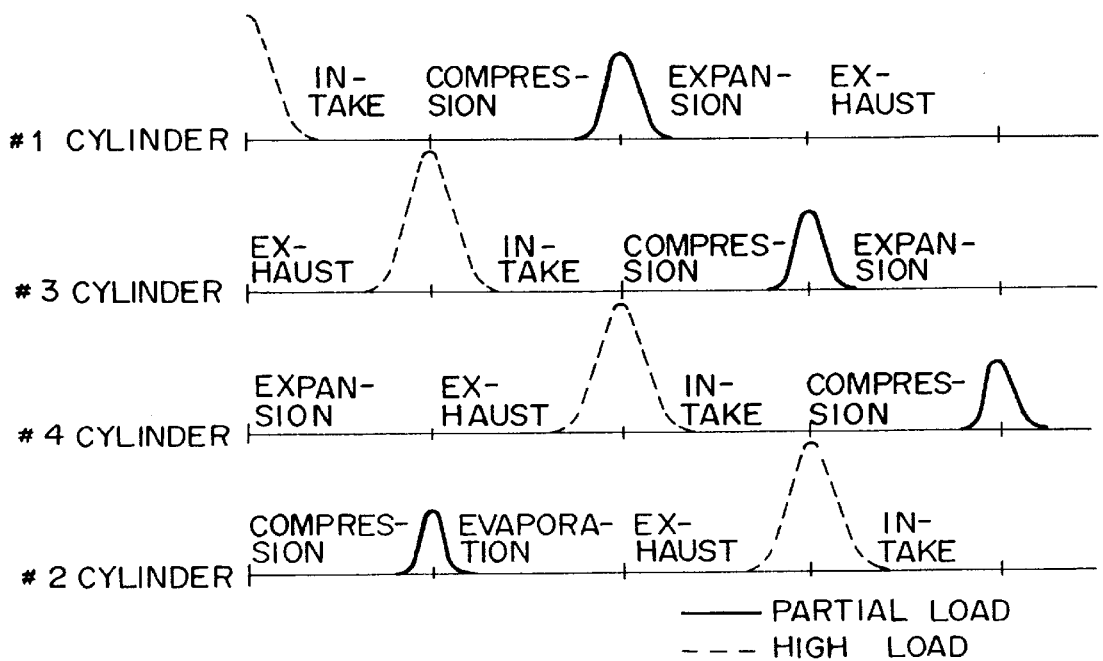
FIG. 44 is a timing chart for explaining the timing of fuel supply into an engine cylinder by the fuel distributor shown in FIG. 41.
Figure 45:
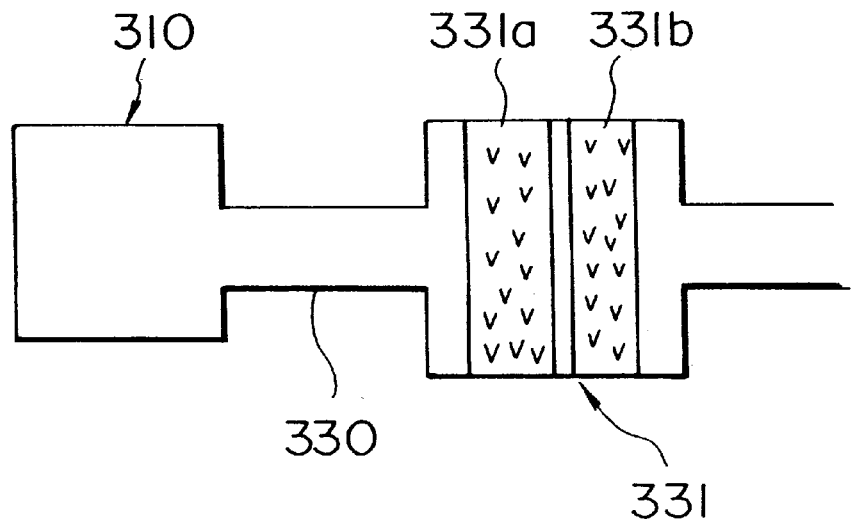
FIG. 45 is a view for explaining the structure of a catalyst converter shown in FIG. 31.
Figure 46:
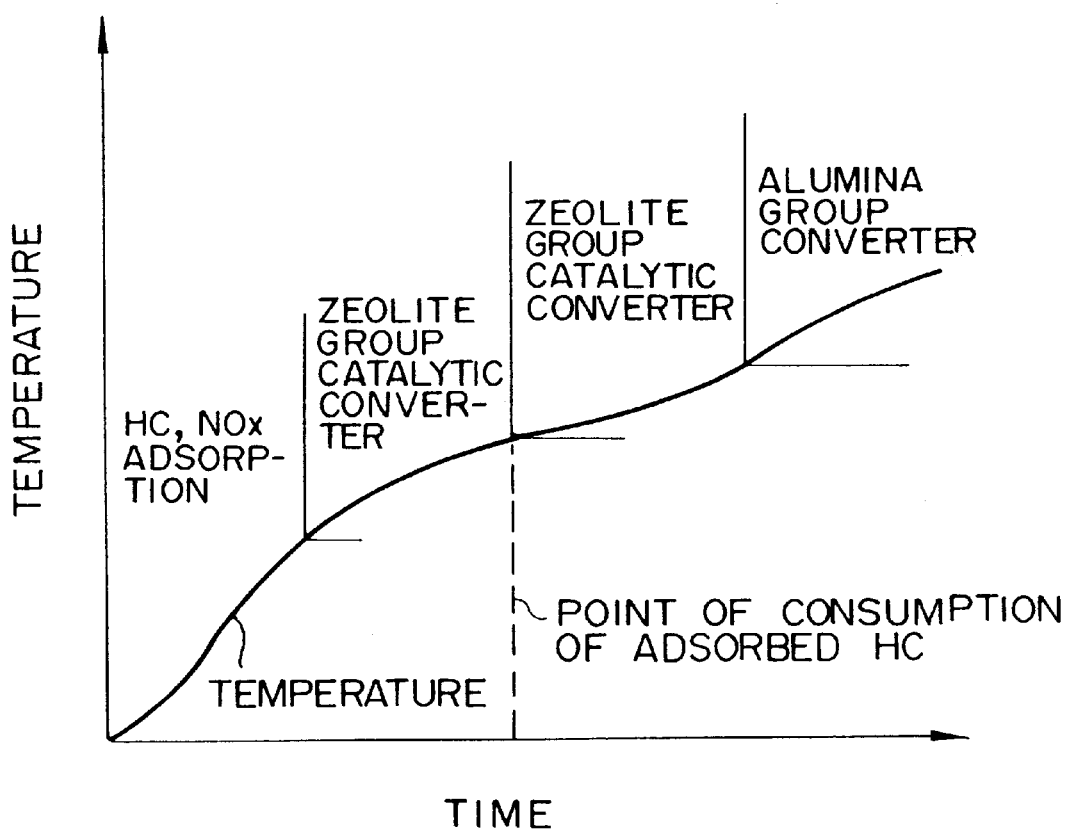
FIG. 46 is a graph showing variation in the function, caused by variation in temperature, of the catalyst converter shown in FIG. 45.

The feed timing of fuel into each of the fuel injection valves 380 from the fuel distributor 360 is adjusted by the fuel injection timing adjusting mechanism 376. For example, as shown in FIGS. 41 to 44, when the plunger first fuel outlet port 367c is aligned with the #1 cylinder casing fuel outlet port 363a, and when the fuel injection timing adjusting ring 377 is aligned with the first injection position, the plunger first injection port 367c is communicated with the #1 cylinder casing fuel outlet port 363a through the communication hole 377a in the fuel injection timing adjusting ring 377. Accordingly, the fuel in the main fuel passage 367 of the plunger 366 is fed into the #1 cylinder fuel injection valve 380a through the plunger first fuel outlet port 367c, the communication hole 377a in the ring 377, and the #1 cylinder casing fuel outlet port 363a. Further, even though the plunger first fuel outlet port 367c is aligned with the #1 cylinder casing fuel outlet port 363a, if the fuel injection timing adjusting ring 377 is located at the second injection position, as shown in FIG. 34, the plunger first fuel outlet port 367c is blocked by the injection timing adjusting ring 377 while the plunger second fuel outlet port 367d is opened so that the plunger second fuel outlet port 367d is communicated with the #4 casing fuel outlet port 363d. Accordingly, the fuel in the main fuel passage 367 of the plunger 366 is fed into the #4 cylinder fuel injection valve 380d by way of the plunger second fuel outlet port 367d and the #4 cylinder casing fuel outlet port 363d. Thus, the fuel is not fed into the #1 cylinder fuel injection valve 380a but into the #4 cylinder fuel injection valve 380d at the timing of feeding fuel into the #1 cylinder fuel injection valve 380a by moving the injection timing adjusting ring 377. In other words, the phase of the fuel injection can be changed by 180 deg., as shown in FIG. 44 by actuating the fuel injection timing adjusting mechanism 376.

Next, brief explanation will be hereinbelow made of a Miller cycle engine used as the engine 310 in this embodiment.

A usual four cycle engine has equal compression and working strokes. However, the Miller cycle engine 310 has its working stroke which is longer than its compression stroke, that is, it has a ratio between working stroke and compression stroke, which is equal to or less than 1, that is, working/compression stroke ratio≧1, in order to increase the effective work of the engine.

In this embodiment, the working stroke is set to be longer than the compression stroke by controlling the opening and closing timing of the intake valve 315. Specifically, at first the intake valve 315 is opened while the piston 311 descends so that air is introduced into the cylinder chamber 312 (refer to FIG. 47a), and then, the piston 311 comes to the bottom dead center (refer to FIG. 47b). Thereafter, the intake valve 315 is closed slightly after piston 311 slightly ascends (refer to FIG. 47c). The compression stroke extends during the period from the time when the intake valve 315 is closed, to the time when the piston comes to the top dead center. The ignition of fuel is carried out just before the time when the piston comes to the top dead center (refer to FIG. 47d). When the piston 311 comes up to the top dead center, it is depressed by explosion of the fuel (refer to FIG. 47e). The working stroke extends during the period in which the piston 311 moves from the top dead center to the bottom dead center (refer to 47f). The exhaust valve 316 is opened just before the time when the piston 311 comes to the bottom dead center. The piston 311 again initiates its ascent so that exhaust gas is discharged into the exhaust pipe 330 from the cylinder chamber 312 (FIG. 47g).

Thus, in this embodiment, the piston 311 initiates its ascent upon transition between the intake stroke and the compression stroke, but the intake valve is 315 is still opened although the volume of the cylinder chamber is started to be decreased, that is, the intake valve 315 is closed, later than that in a conventional engine, and accordingly, the compression stroke can be set to be shorter than the working stroke. In other words, the working stroke is set to be longer than the compression stroke. The control of the opening and closing timing of the intake valve 315, can be made by changing the profile of the cam 52 in the valve drive mechanism 350.

During the Miller cycle, the compression temperature usually tends to be lowered so that the evaporation rate of the fuel is lowered since the compression stroke is short so that the compression ratio is small. Accordingly, it gives such a disadvantage that the fuel cannot be burnt at a desire air-fuel ratio. Meanwhile, since the compression temperature is low, it gives such an advantage that knocking can hardly occur.

Accordingly, in this embodiment, in order to solve the above-mentioned embodiment, the fuel is injected direct into the cylinder chamber 312, that is, the in-cylinder fuel injection is carried out. Usually, in the case of fuel injection into the intake port, evaporation of fuel in the intake port part is promoted, and specifically, the temperature of the intake valve 315 or the cylinder head is increased in order to evaporate fuel sticking to the inner peripheral surface of the intake pipe, the rear surface of the intake valve 315 (the surface remote from the surface facing the cylinder chamber) and the like. Accordingly, the intake port injection causes lowering of the charged air volume or lowering of the output power due to increasing of the temperature. On the contrary, according to the present invention, since the fuel is injected direct into the cylinder chamber 312, no fuel sticks to the intake port part, and accordingly, it is not necessary to raise the compression temperature in order to increase the evaporation rate of fuel. Since no increasing of the compression temperature is required, a disadvantage inherent to the intake port injection, such as lowering of the output power due to the decreasing of the charged air volume or possible occurrence of knocking can be eliminated. That is, in this embodiment, it is possible to enhance the anti-knocking function, and as well to enhance the output power of the engine 310 since the charged air volume can be increased.

Further, since the compression temperature decreases if the closing of the intake valve 315 is retarded by an angle of greater than 30 deg. from the bottom dead center during an intake stroke, the evaporation rate of fuel is lowered so that the combustion in the engine 310 becomes unstable. On the contrary, in the this embodiment, even though the closing of the vale 315 is retarded by an angle of greater than 30 deg. from the bottom dead center during an intake stroke, the stable combustion can be maintained due to the fact as mentioned above since the in-cylinder fuel injection is carried out. Accordingly, the reduction of the compression work which is the purpose of the Miller cycle engine, can be greatly made. It is noted that the closing of the intake valve 315 with a delay of a crank angle of greater than 30 deg. from the bottom dead-center of an intake stroke, is such that the intake valve 315 is closed at an angle smaller than an crank angle of 250 deg. from the top dead-center in a compression stroke.

Figure 39:
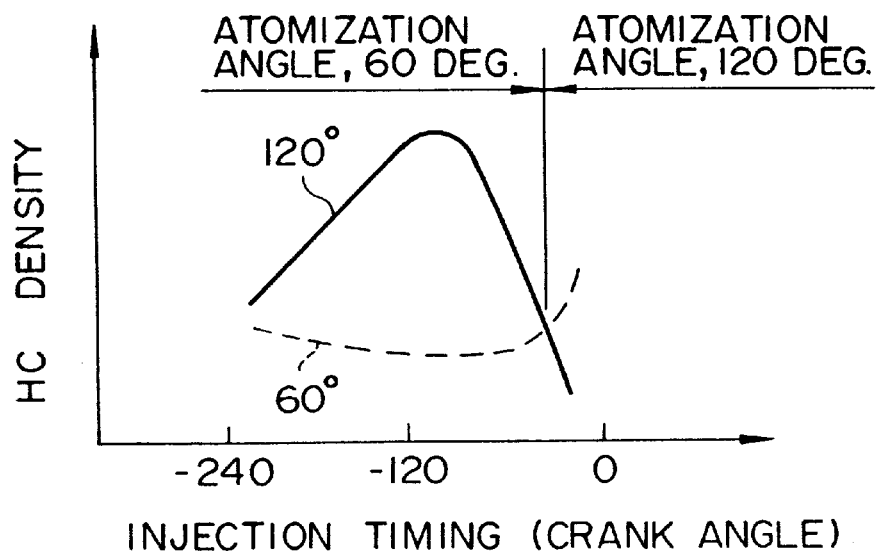
FIG. 39 is a graph for explaining relationship between injection timing and density of hydrocarbon for different divergent atomization angles in the case of using the fuel injection valve shown in FIG. 36.

FIG. 39 shows the relationship between the injection timing and the density of hydrocarbon in exhaust gas for each fuel divergent atomization angle, which is exhibited by the fuel injection valve 380 in this embodiment, and which has been explained hereinabove. In this figure, the injection timing at zero deg. on the abscissa corresponds to the dead center in a compression stroke.

As shown in this figure, if the fuel divergent atomization angle is set to 120 deg., the density of hydrocarbon in exhaust gas increases as the injection timing is retarded (that is, the injection timing is changed in the direction approaching the top dead center (0 deg.)), and accordingly, the density of hydrocarbon becomes greatest when the injection timing is set to a crank angle of about −100 deg. from the top dead center (0 deg.). If the injection timing is retarded further, the density of hydrocarbon is contrarily decreased. Further, if the fuel divergent atomization angle is set to 60 deg., the density of hydrocarbon is lower than that obtained by setting the fuel divergent atomization angle to 120 deg., and is not substantially changed even though the injection timing is retarded up to a crankangle of about −40 deg. from the top dead center (0 deg.). As mentioned above, the reason why the density of hydrocarbon is higher at 120 deg. of fuel divergent atomization angle than at 60 deg. of fuel divergent atomization angle, is such that the volume of fuel sticking to the wall surface of the cylinder 17 is greater at 120 deg. of fuel divergent atomization angle than at 60 deg. of fuel divergent atomization angle. Further, after the -injection timing is retarded to about −40 deg. from the dead center (0 deg.) in compression stroke, the reason why the density of hydrocarbon is higher at 60 deg. of fuel divergent atomization angle than at 120 deg. of fuel divergent atomization angle, is such that the piston 311 comes near to the fuel injection valve 380 by retarding the injection timing near to the top dead center in compression stroke, and accordingly the quantity of fuel sticking to the top surface of the piston 311 is greater at 60 deg. of fuel divergent atomization angle than at 120 deg. of fuel divergent atomization angle.

Thus, if the injection timing is advanced, and specifically if the fuel is injected into the cylinder before a crankangle of about −40 deg. from the top dead center (0 deg.) in compression stroke, the fuel divergent atomization angle is set to 60 deg. Meanwhile, if the injection timing is retarded, and specifically, if the fuel is injected into the cylinder after an crankangle of about −40 deg. from the top-dead center (0 deg.) in compression stroke, the fuel divergent atomization angle is set to 120 deg. so as to decrease the density of hydrocarbon in exhaust gas as far as possible.

Figure 38:
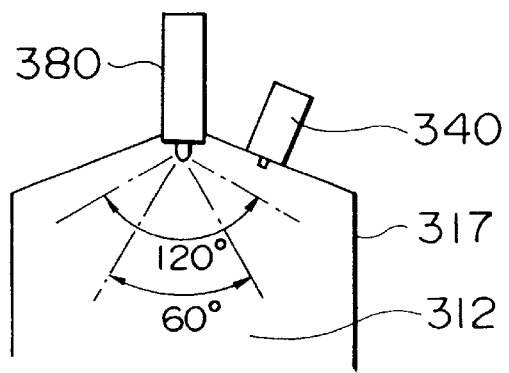
FIG. 38 is a view for explaining positional relationship between the fuel injection valve shown in FIG. 36 and a spark plug.

By the way, during partial load operation where the fuel injection volume is less, the mixture around the spark plug 340 is lean, and accordingly, the combustion possibly becomes unstable. Accordingly, the fuel divergent atomization angle is set to 120 deg., as sown in FIG. 38, so as to inject a larger volume of fuel toward the spark plug 340 during partial load operation. Thus, the concentration of fuel around the spark plug 340 can be maintained to be uniform, and accordingly, stable combustion can be ensured.

In summary, as shown FIG. 44, during partial load operation, the injection timing is retarded while the atomization angle is set to 120 deg. Meanwhile during high load operation, the injection timing is advanced while the atomization angle is set to 60 deg. Accordingly, the density of hydrocarbon in exhaust gas can be lowered, and stable combustion can be ensured. In this embodiment, in order to carry out the abovementioned control, the ECU 390 instructs the fuel injection timing adjusting mechanism 376 in the fuel distributor 360 to retard the fuel injection timing and instructs the valve position adjuster 357 in the fuel injection valve 380 to set the atomization angle to 120 deg. when the fuel injection volume which is determined in accordance with an air flow rate detected by the air flowmeter 391 and an opening degree of the throttle valve 321 detected by the throttle opening degree meter 392 and the like, is less than a predetermined value. Further, the ECU 390 instructs the fuel injection timing adjusting mechanism in the fuel distributor 360 to advance the fuel injection timing by a crankangle of about 180 deg. and instructs the valve position adjuster 357 in the fuel injection valve 380 to set the atomization angle to 60 deg. when the fuel injection volume determined by the CPU 390 itself exceeds a predetermined value.

It has been found from experiments made by the applicants, that the atomization angle is satisfactorily set to a value larger 100 deg. during partial load operation, and to a value smaller than 90 deg. during high load operation. Further, in this embodiment, when the valve element is located at the narrow angle atomization position, the valve displacement space side port of the wide angle atomization passage 382a and the valve displacement space side port of the narrow angle atomization passage 382b are opened. However, it is possible to close the valve displacement side port of the wide angle atomization passage 382a when the valve displacement space side port of the narrow angle atomization passage is opened.

By the way, the density of hydrocarbon in exhaust gas is correlated to the conversion efficiency of the catalytic converter 331 for purifying nitrogen oxide, which will be described later, that is, the conversion efficiency of the catalytic converter 331 for converting nitrogen oxide into nitrogen is increased as the density of nitrogen oxide increases. In general, rules and regulations given to the density of nitrogen oxide should be satisfied. Thus, if the density of hydrocarbon is decreased excessively, the conversion efficiency of the catalytic converter 331 is lowered so that density of the nitrogen oxide density becomes higher, and accordingly, the rules and regulations cannot be sometimes satisfied. Accordingly, in view of the conversion efficiency of the catalytic converter 331, it is required to carry out such control that the density of hydrocarbon is lowered in a range where the density of nitrogen oxide does not exceed a regulated value.

Figure 40:
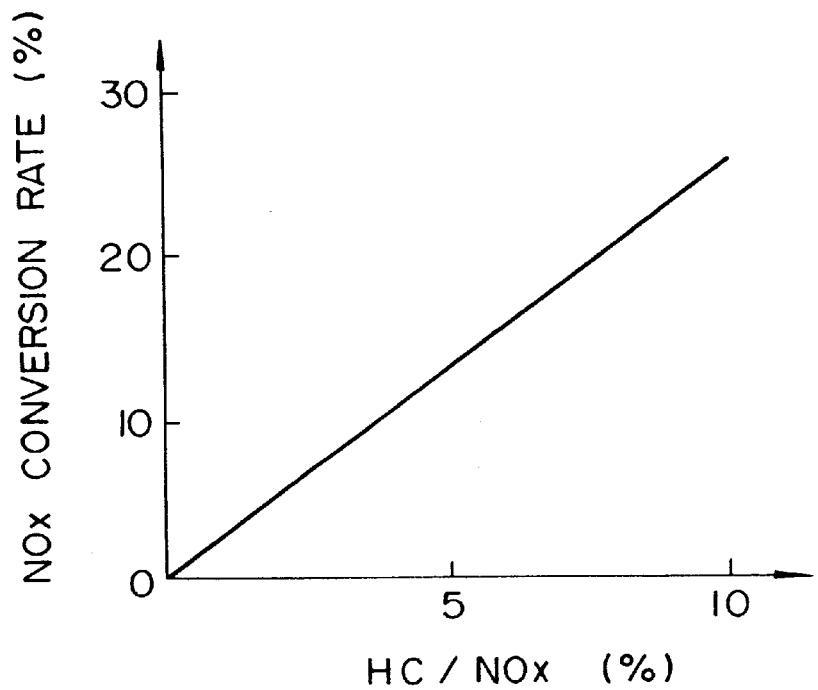
FIG. 40 is a graph for explaining relationship between density of hydrocarbon and rate of catalyst conversion from nitrogen oxide into nitrogen by catalyst.
Figure 41:
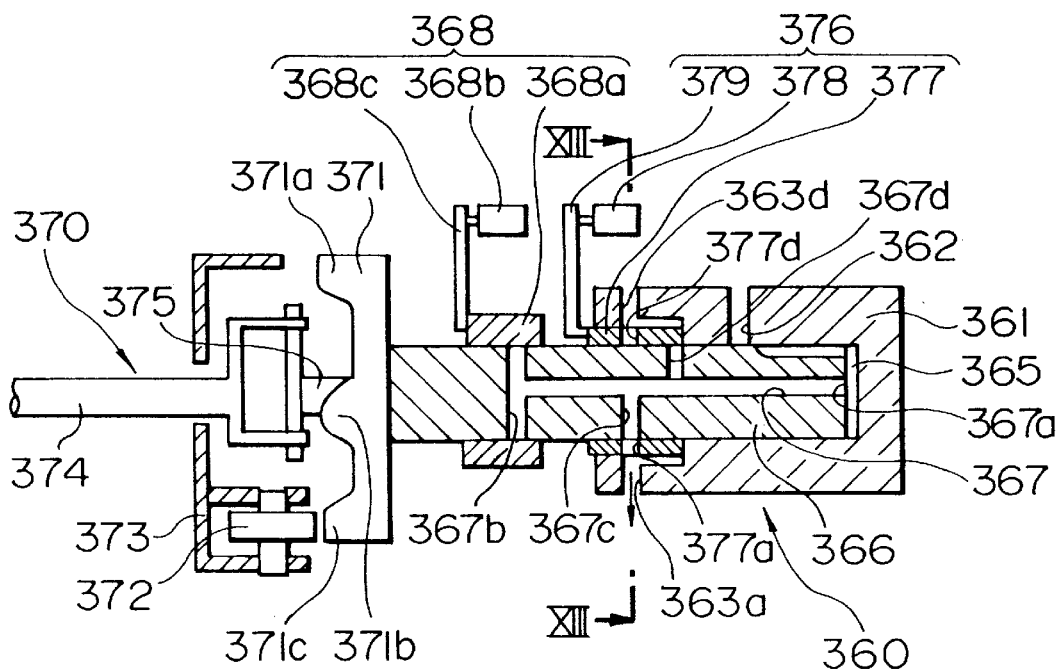
FIG. 41 is a sectional view illustrating a first embodiment of a fuel injection distributor (which feeds fuel in a #1 engine cylinder) shown in FIG. 31.
Figure 42:
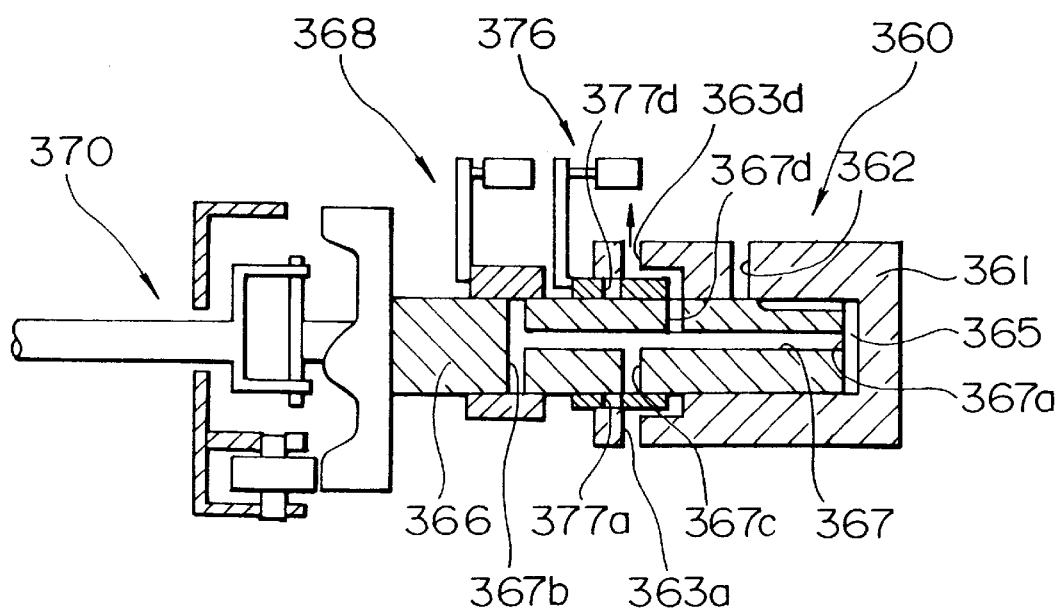
FIG. 42 is a sectional view illustrating the fuel injection distributor (which feeds fuel into a #4 engine cylinder) shown in FIG. 41.

Metal ion exchange zeolite catalyst 331a is located on the engine 310 side of the catalytic converter 331 connected to the exhaust pipe 330, and platinum and alumina group catalyst is located on the exhaust port side thereof. The metal ion exchange zeolite catalyst 331a has such characteristics that its low temperature activity is high, but its NOx selective reduction activity is low. Further, the platinum and alumina group catalyst has such that the low temperature activity is low but the NOx selective reduction activity is high. Accordingly, in an operating range where the density of hydrocarbon (HC) is high during high engine speed and high load operation so that, as previously explained with reference to FIG. 40, the density of hydrocarbon (HC) is low during high engine speed, and accordingly, the efficiency of nitrogen oxide-nitrogen conversion of catalyst tends to be decreased, the platinum alumina group catalyst 318 having a high NOx selective reduction activity mainly becomes effective if the catalytic environment temperature is high. On the contrary, in an operating range where the density of HC is high during low engine speed and low load operation so that, as mentioned above, the efficiency of nitrogen oxide-nitrogen conversion of the catalyst is high, the metal ion-exchange zeolite which is active even though the catalytic environment temperature is low is mainly effective. It is noted that the reason why the density of HC is low during high engine speed and high load, is such that the oxidative reaction is promoted since the temperature of exhaust gas is high during a process in which HC is exhausted from the cylinder chamber 312 into the exhaust pipe 330. Further, the reason why the density of HC is high during low engine speed and low load operation, oxidative reaction is not promoted since the temperature of exhaust gas is low, and accordingly, HC is directly exhausted as it is.

HC exhausted upon a start of the engine 310 is mainly adsorbed by the metal ion-exchange zeolite catalyst 331a. When the temperature of the catalytic converter 331 is raised by exhaust gas, HC adsorbed to the metal ion-exchange zeolite catalyst 331a is separated away, and is oxidized by the platinum alumina group catalyst 331b. Usual platinum alumina group catalyst is likely to produce nitrogen dioxide $N_2O$ when HC is not oxidized at a low temperature. In order to evade this problem, the platinum alumina group catalyst in this embodiment is added therein with palladium or the like in order to enhance the catalytic activity at a low temperature. Further, in order to enhance the conversion efficiency of nitrogen dioxide $N_2O$ during a start of the engine, the fuel injection timing is retarded so as to increase the temperature of exhaust gas. Alternatively, the ratio between working and compression strokes may be changed during Miller cycle, so as to raise the temperature of exhaust gas.

Referring to FIG. 36, just after a start of the engine, since the temperature of exhaust gas is low, HC and NOx are adsorbed onto the metal ion-exchange zeolite catalyst 331a. During this period, the fuel injection timing is retarded so as to increase the temperature of exhaust gas in order to restrain generation of NOx as small as possible. When the temperature of exhaust gas is higher and higher, HC and NOx adsorbed to the metal ion-exchange zeolite catalyst 331a are gradually converted into $H_2O$, $CO_2$, $N_2$. At this time, NOx in the exhaust gas by HC which is also adsorbed. When HC adsorbed to the metal ion-exchange zeolite catalyst 331 runs out, the injection timing is advanced so as to increase the density of HC in exhaust gas. Further, if the temperature becomes high, the platinum and alumina group catalyst is mainly effective.

In this embodiment, as mentioned above, control is carried out in such a way that the injection timing is retarded during partial load operation, but the injection timing is advanced during high load operation. However, during a start of the engine, control is carried out in such a way that whether the starting of the engine is made or not is recognized in accordance with a temperature detected by the cooling water thermometer 393, and if it is starting of the engine, the fuel injection timing is controlled in accordance with a temperature detected by the exhaust gas thermometer 394 incorporated to the catalytic converter 331 in order to enhance the function of the catalytic converter 331. Specifically, until the temperature detected by the cooling water thermometer 393 rises up to a predetermined temperature, the ECU 390 recognizes that it is warm-up of the engine. In this case, the ECU 390 instructs the fuel injection timing adjusting mechanism 376 in the fuel distributor 360 to retard the injection timing until the temperature detected by the exhaust gas temperature 394 rises up to a predetermined temperature. When the temperature detected by the exhaust temperature thermometer 394 exceeds the predetermined value, the ECU 390 instructs the same to advance the injection timing. When the temperature detected by the cooling water thermometer 393 exceeds the predetermined temperature, the ECU 390 recognizes that the warm-up of the engine has been completed, so as to control the injection timing in accordance with a load.

As stated above, in the present invention, the in-cylinder injection is carried out so as to prevent the fuel from sticking to the inner surface of the intake pipe 320 or the upper surface of the intake valve 315, and accordingly, a desired volume of fuel can be fed into the cylinder chamber 312 at a desired time. Further, since the fuel is prevented from sticking to the inner surface of the intake pipe 320 or the upper surface of the intake valve 315, the necessity of increasing the compression temperature for increasing the evaporation rate of fuel can be eliminated. As a result, it is possible to increase the charged air volume so as to enhance the output power of the engine and the antiknocking function thereof.

Further, in this embodiment, during partial load operation, the fuel divergent atomization angle (splay angle) is set to a value greater than 100 deg. so as to create a satisfactory mixture around the spark plug 340. Meanwhile, during high load operation, the fuel divergent atomization angle (splay angle) is set to a value smaller than 90 deg. and the fuel injection timing is advanced to promote the mixing of air and fuel. Thereby it is possible to aim at performing stable combustion over a wide engine operating range.

Further, in this embodiment, the fuel injection timing and the fuel divergent atomization angle are controlled so as to reduce the exhaust emission of hydrocarbon from the engine 310 itself and the catalytic converter 331 is efficiently operated. Thus, it is possible to enhance the efficiency of removal of detrimental substance from exhaust gas.

It is noted that explanation has been made of the embodiment in which the present invention is applied to the Miller cycle engine. However, the present invention should not be limited to this embodiment. That is, it goes without saying the present invention can be applied to any other usual engine.

Next, explanation will be made of variant forms of the fuel injection valve in this embodiment with reference to FIGS. 48 to 50.

Figure 48:
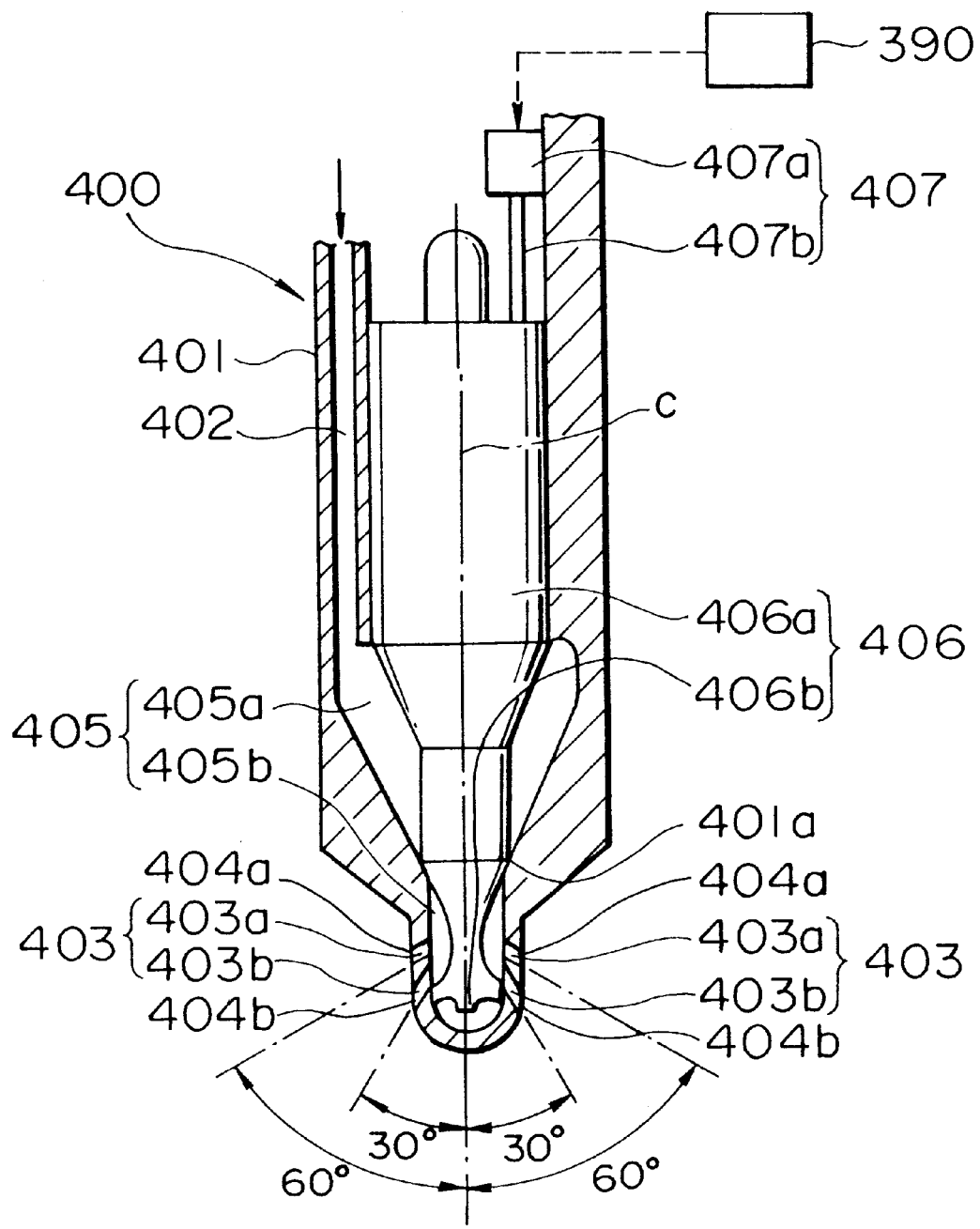
FIG. 48 is a sectional view illustrating a first variant form of the fuel injection valve (in a closed condition) shown in FIG. 31.

A fuel injection valve 400 in a variant form shown FIG. 48, comprises a valve element 406, a position adjuster 407 for adjusting the position of the valve element 406, and a valve casing 401 formed therein with fuel passages 402, 403 and a valve displacement space 405, and incorporating the valve element 406 and the adjuster 407. The fuel passages 402, 403 are formed at their one end with fuel inlet ports (which are not shown), and at their the other end with fuel jet ports 404. The valve displacement space 405 is formed intermediate of these fuel passages 402, 403, and the fuel also flows into this valve displacement space 405. A plurality of passages 403 (which will be hereinbelow denoted "space outlet port side passages") are formed between the valve displacement space 405 and the fuel jet ports 404. One group (which will be hereinbelow denoted "narrow angle atomization passages") of these space outlet port side passages) extend in a direction having an angle of 30 deg. to the injection center axis C, and the group of the remaining passages 403a (which will be hereinbelow denoted "wide angle atomization passages") extend in a direction having an angle of 60 deg. to the injection center axis C).

The valve element 406 comprises a valve end part 406b adapted to block the valve displacement space side ports of the wide angle atomization passages 403a and the valve displacement space side ports of the narrow angle atomization passages 403b, and a body 406a having a front end part formed thereto with the valve end part 406b. The valve displacement space 405 is composed of a valve end part displacement space 405b into which only the valve end part 406b of the valve element 406 enters, and a body displacement space 405a into which the body 406a of the valve element 406 is fitted. The valve casing 401 is formed therein with a valve seat 401a at the boundary between the valve end displacement space 405b and the body displacement space 405a.

Figure 49:
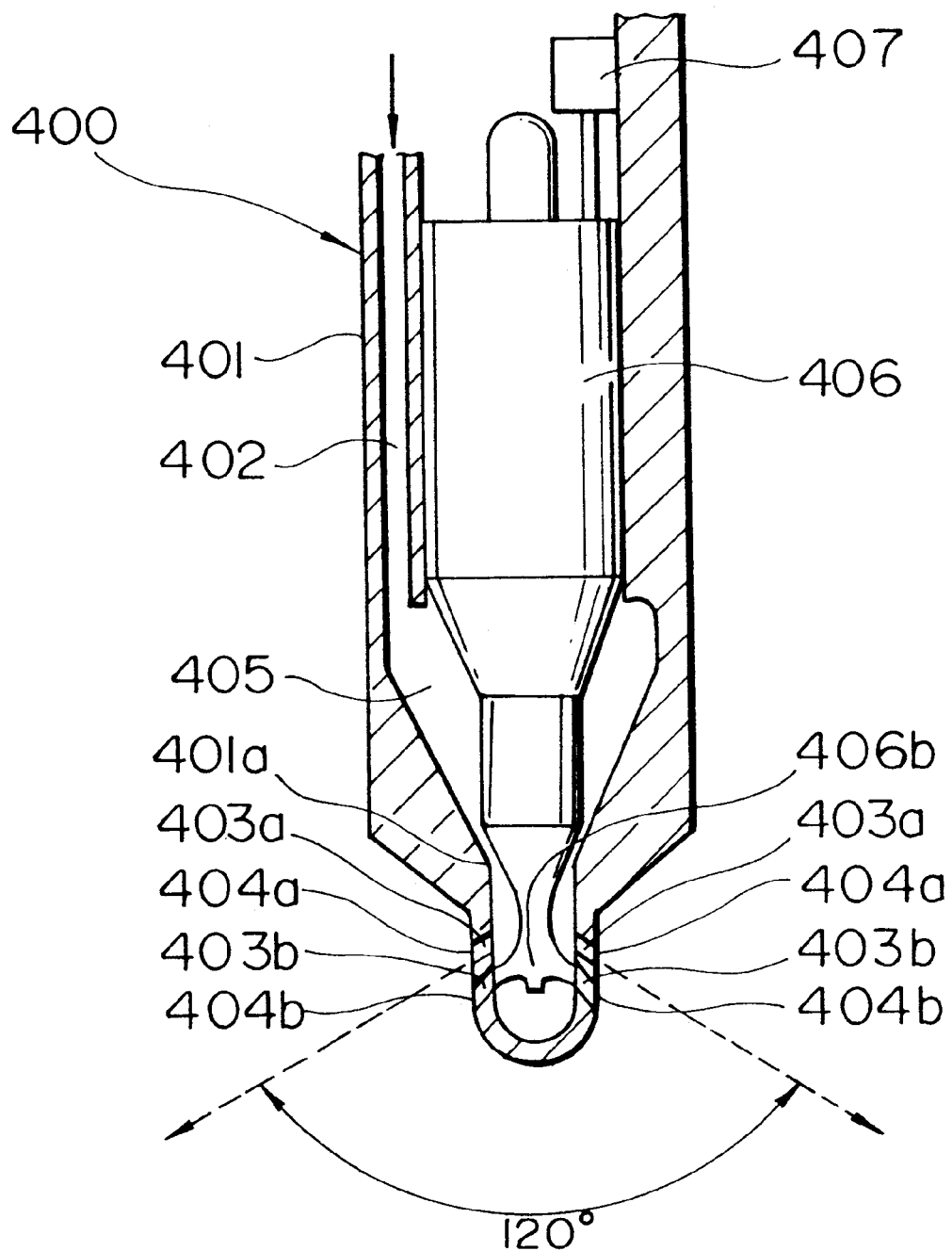
FIG. 49 is a sectional view illustrating the fuel injection valve (in a condition of wide angle atomization) shown in FIG. 31.
Figure 50:
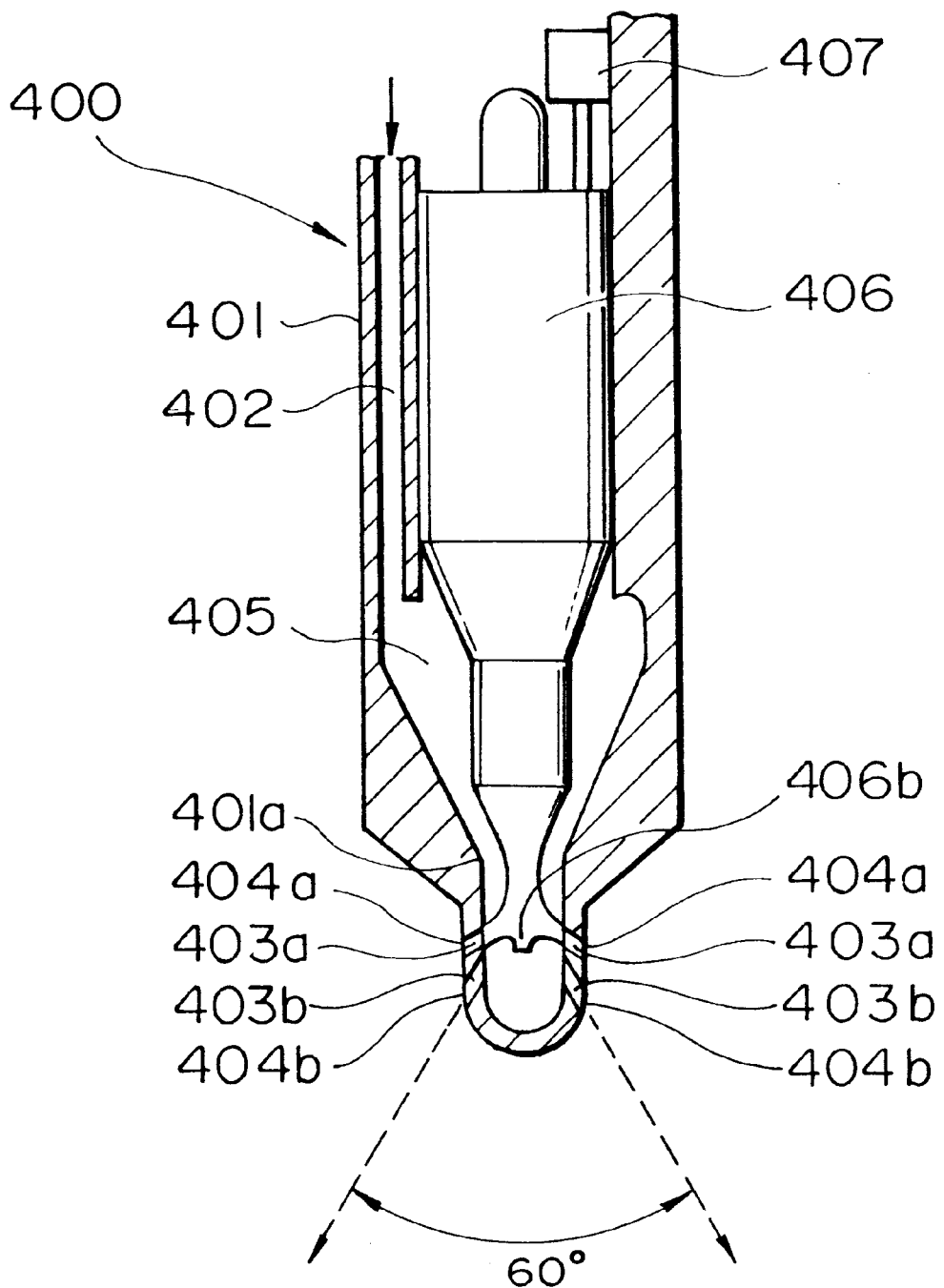
FIG. 50 is a sectional view illustrating the fuel injection valve (in a condition of narrow angle atomization) shown in FIG. 49.

The valve element 406 is located in the valve displacement space 405 so as to be movable among three positions, that is, a valve closing position where fuel does not flow into the valve end displacement space 405b from the body displacement space 405 (as shown in FIG. 48), a wide angle atomization position where the valve displacement space side ports of the wide angle atomization passages 403a are opened while the valve displacement side ports of the narrow angle atomization passages 403b are closed (as shown in FIG. 49), and a narrow angle atomization position where the valve displacement side ports of the wide angle atomization passages 403a are closed but the valve displacement side ports of the narrow angle atomization passages 403b are opened (as shown in FIG. 50).

The position adjuster 409 comprises a small size stepping motor 407a receiving a signal from the ECU 390, and a stopper 407b operated under the drive of the stepping motor 407a. In the position adjuster 407, the stopper 407b makes contact with valve element 406 so as to locate the valve element 406 at a desired position. Specifically, the position adjuster 407 locates the valve element 406 at one of the abovementioned valve closing position, and wide and narrow angle atomization positions in accordance with a signal from the ECU 490.

Referring to FIG. 48, when the valve element 406 is located at the valve closing position so as to make contact with the valve seat 401a of the valve casing 401, fuel cannot flow into the valve end displacement space 405b from the body displacement space 405a, and accordingly fuel cannot be injected from the valve 400. Further, as shown in FIG. 49, when the valve element 406 is slightly lifted up so as to be located at the wide angle atomization position where the valve end part 406b of the valve element 406 blocks the valve displacement space side ports of the narrow angle atomization passages 403b, fuel flows from the valve displacement space 405 into the wide angle atomization passages 403a and is then jetted from the fuel outlet ports 404a at the ends of the passages 403a. At this time, the fuel divergent atomization angle at this time is set to 120 deg. Further, as shown in FIG. 50, the valve element 406 is further lifted up and is located at the narrow angle atomization position where the valve end part 406b of the valve element 406 blocks only the valve displacement space side ports of the wide angle atomization passages 403a, the fuel flows from the valve displacement space 405 and through the narrow angle atomization passages 403b, and then are jetted from the fuel outlet ports 404b at their ends. At this time, the fuel divergent atomization angle is set to 60 deg.

Thus, even with this fuel injection valve 400 in this variant form, the fuel divergent atomization angle can be changed, this fuel injection valve 400 in this variant form can be used, instead of the fuel injection valve 380 in the aforementioned embodiment, with technical effects similar to those obtained by the latter fuel injection valve 380.

Figure 51:
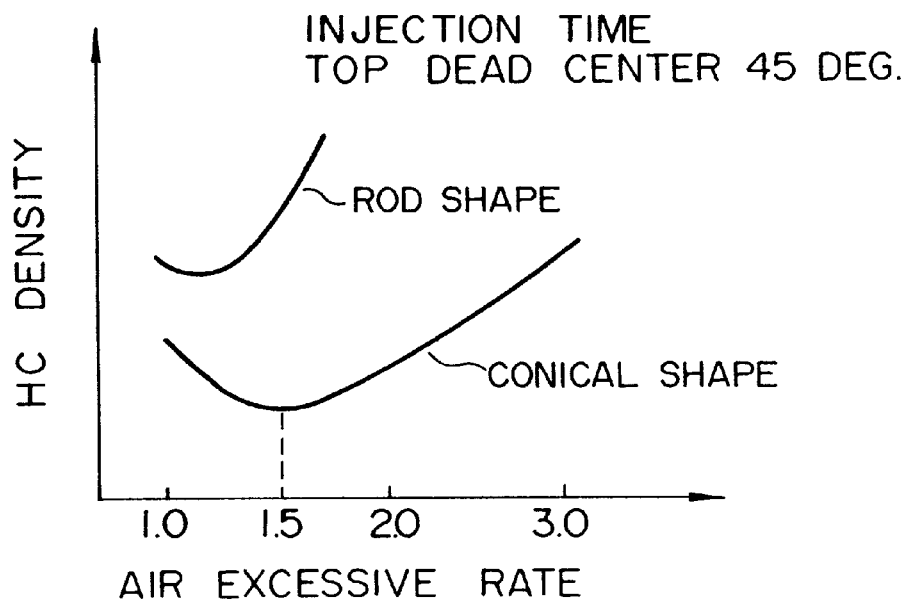
FIG. 51 is a graph for explaining relationship between excess air factor and density of hydrocarbon for different atomization conditions.

By the way, the fuel is jetted from the fuel outlet ports 404 of the fuel injection valve 400 in this variant form has a rod-like atomization shape while the fuel jetted from the single fuel outlet port 304 of the fuel injection valve 320 in the aforementioned embodiment has a conical atomization shape. As shown in FIG. 51, the rod-like atomization shape gives a density of hydrocarbon which is generally higher than that given by the conical shape atomization shape even though the air-excessive rate is changed variously. That is, the rod-like atomization shape is inferior in fuel distribution, and creates a locally rich mixture. Accordingly, it is preferable to use such fuel injection valve that the fuel is injected from a single fuel outlet port in a conical atomization shape.

Figure 52:
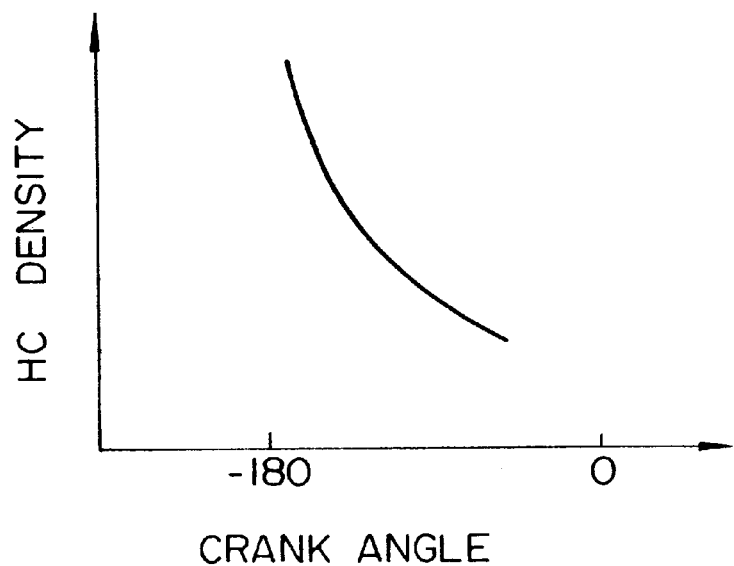
FIG. 52 is a graph for explaining relationship between fuel injection timing and density of hydrocarbon in a rod-like atomization condition.

Referring to FIG. 52 which shows the relationship between the injection timing of the fuel injection valve which injects fuel in a rod-like atomization shape, and the density of hydrocarbon. If the injection timing is advanced, the quantity of fuel which reaches the wall surface of the cylinder and forms a film before the ignition, increases, and accordingly the density of hydrocarbon becomes high. As mentioned above, since the density of hydrocarbon relates to the conversion efficiency of the catalytic converter, it is preferable to control the density of hydrocarbon in consideration with this conversion efficiency even though the fuel injection valve 400 having a rod-like atomization shape as is in this variant form is used.

Next, explanation will be made of a second variant form of the fuel injection valve with reference to FIG. 53.

Figure 53:
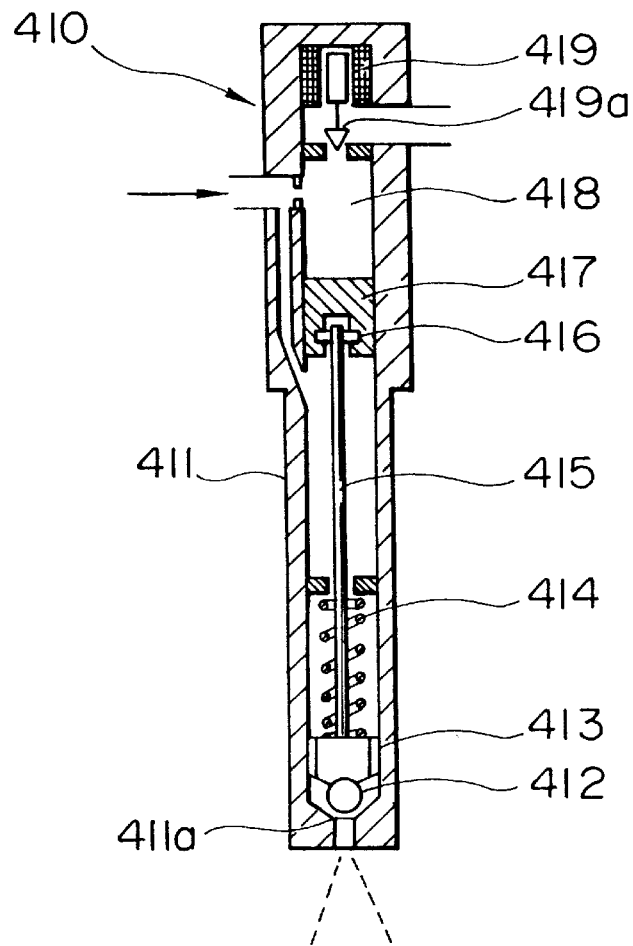
FIG. 53 is a sectional view illustrating a second variant form the fuel injection valve shown in FIG. 31.

In this variant form, the fuel injection valve 410 has a spherical valve element 412 is used as shown in FIG. 53. This spherical shape valve element 412, is flexibly connected to a piston 417 through the intermediary a pin 416 by a flexible thin connecting rod 415. Accordingly, even though an error such as an eccentricity caused by machining, is present at a valve seat 411a or the like of a valve casing 411, this error can be absorbed by this flexible connecting rod 415. When a valve element 419a of a solenoid valve 419 is lifted up, the pressure of the pressure chamber 418 is lifted up, and the pressure in a pressure chamber 418 is lowered. Accordingly, a piston 419 is pushed up by the force of a spring 414, causing the spherical valve element 412 to ascend, and the space between the valve seat 411a and the spherical valve element 412 is obtained so that the fuel is injected. The spherical valve element 412, a guide 413, the connecting rod 415 and the piston 417 are movable, and are all small-sized, lightweight and high responsive so that two times of injection per one cycle can be made. When the valve element 419a of the solenoid valve 419 is closed, the pressure of the pressure chamber 418 is increased so that the piston 417 is depressed, and as a result, the spherical body 412 is closed.

Figure 54:
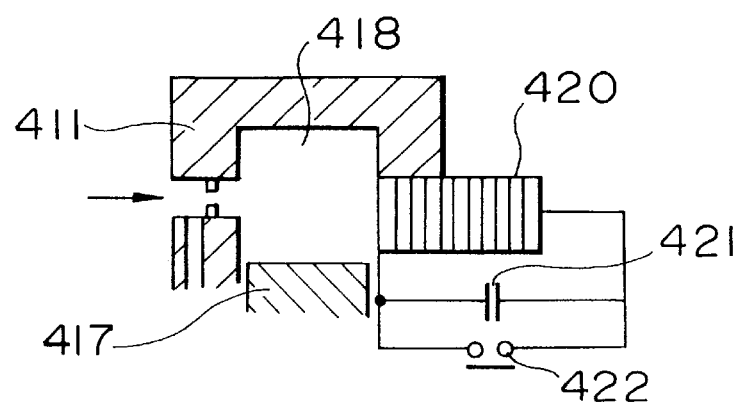
FIG. 54 is a sectional view illustrating essential part of the second variant form of the fuel injection valve shown in FIG. 53.

In this arrangement, although the solenoid valve 419 is used for adjusting the pressure in the pressure chamber 418, a laminated type piezoelectric element can be used, instead of the solenoid valve 418. As shown in FIG. 54, the laminated type piezoelectric element 420 is provided in a part of the wall surface forming the pressure chamber 418. Since the fuel flows into the pressure chamber 418, the pressure in this chamber 418 is high. Accordingly, the piston 417 is depressed, and accordingly, the spherical valve element 412 is pressed against the seat 411a of the casing 411 while the pressure element 420 is pressed. Thus, when the piezoelectric element 420 is pressed, a capacitor 421 is charged. At an end of a compression stroke, when a switch 422 is closed, the charged capacitor 421 is discharged so that the piezoelectric element 420 contracts, and accordingly, the pressure in the pressure chamber 112 is lowered. As a result, the piston 417 is slightly raised so as to slightly lift up the spherical valve element 112, and accordingly, the fuel is injected.

Next, explanation will be made of a third variant form of the fuel injection valve with reference to FIGS. 55 to 56.

Figure 55:
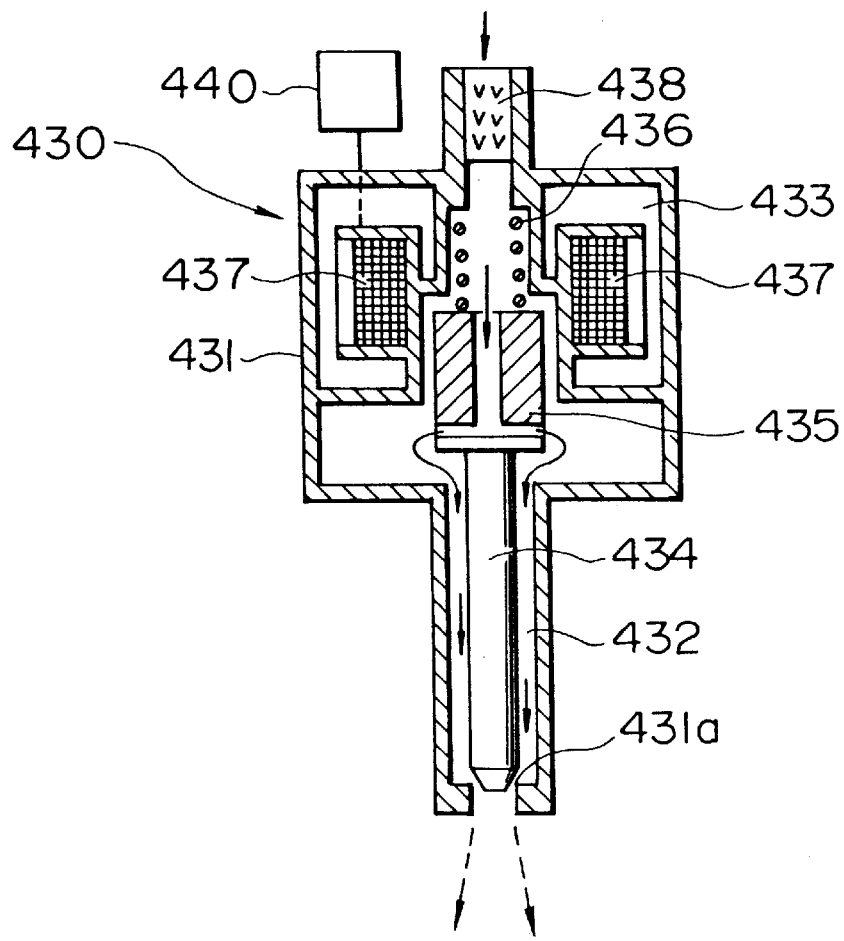
FIG. 55 is a sectional view illustrating a third variant form of the fuel injection valve show in FIG. 51.

As shown in FIG. 55, a fuel induction valve 430 in this variant form comprises a valve casing 431 formed therein with a valve displacement space 432 and a solenoid storage part 433, a valve element 131 adapted to move in the valve displacement space 432, a spring 436 urging the valve element 430 in a valve closing direction, an armature 435 fixed to the end part of the valve element 434, a solenoid 437 for moving the valve element 434 together with the armature 435, a solenoid drive circuit 440 for driving the solenoid 437, and a fuel filter 438 for removing foreign matter in fuel flowing into the valve casing 431. The solenoid 437 is energized and deenergized so as to open and close the valve in order to move the valve element 434. Specifically, when the solenoid 437 is energized, the valve element 434 is opened, overcoming the force of the spring. Meanwhile when the solenoid 437 is deenergized, the valve 434 is closed by the force of the spring.

Figure 56:
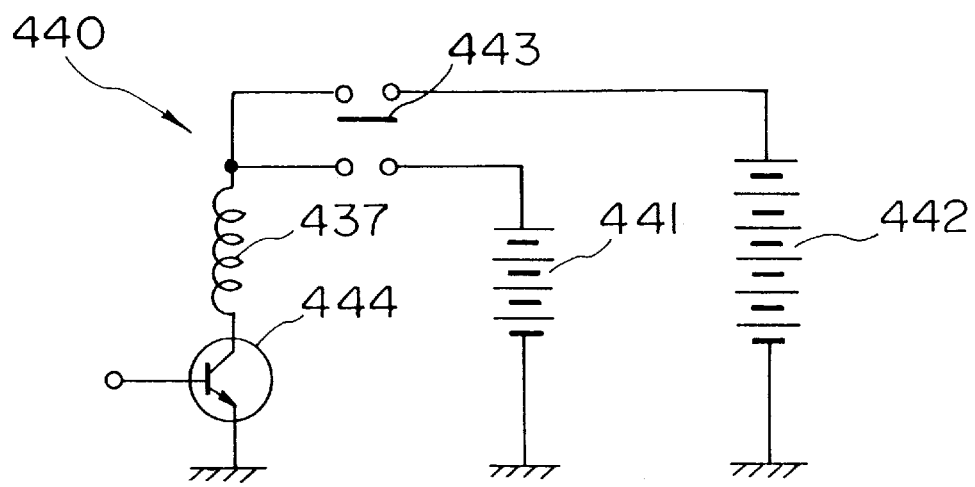
FIG. 56 is a circuit diagram illustrating a solenoid drive circuit in the fuel injection valve FIG. 55.

As shown in FIG. 56, the solenoid drive circuit 440 comprises a lower voltage power source 441 and a high voltage power source 442, a change-over switch 443 for applying a voltage from either one of the high and low voltage power source to the solenoid 437 and a transistor 444 for controlling the current value running through the solenoid 437. When the valve element 434 is lifted (valve opening operation), the switch 443 is operated so as to a voltage from the high voltage power source 442 is applied to the solenoid 437. After the valve element 434 is completely lifted, if this valve lifting condition is maintained, the switch 443 is operated so as to apply a voltage from the low voltage power source 441 to the solenoid 437. Thus, since the high voltage power source 442 is used for operating the valve element 434, the responsiveness can be enhanced so that two times of fuel injection can be made during every cycle. Further, if the valve element 434 is held at a specific position, the low voltage power source 441 is used, and the power consumption can be decreased while overheating of the solenoid 437 can be prevented.

Although either one of the second and third variant forms of the fuel injection valves cannot change the atomization angle, the flexible rod 415 which is essential in these variant forms may be used for the fuel injection valves 380, 400 in the first and second embodiments which can change the atomization angle. Further, the solenoid 437 may be used for displacing the valve element 434 so that the high voltage power source 442 and the low voltage 441 are changed over by energizing the solenoid 437.

Figure 57:
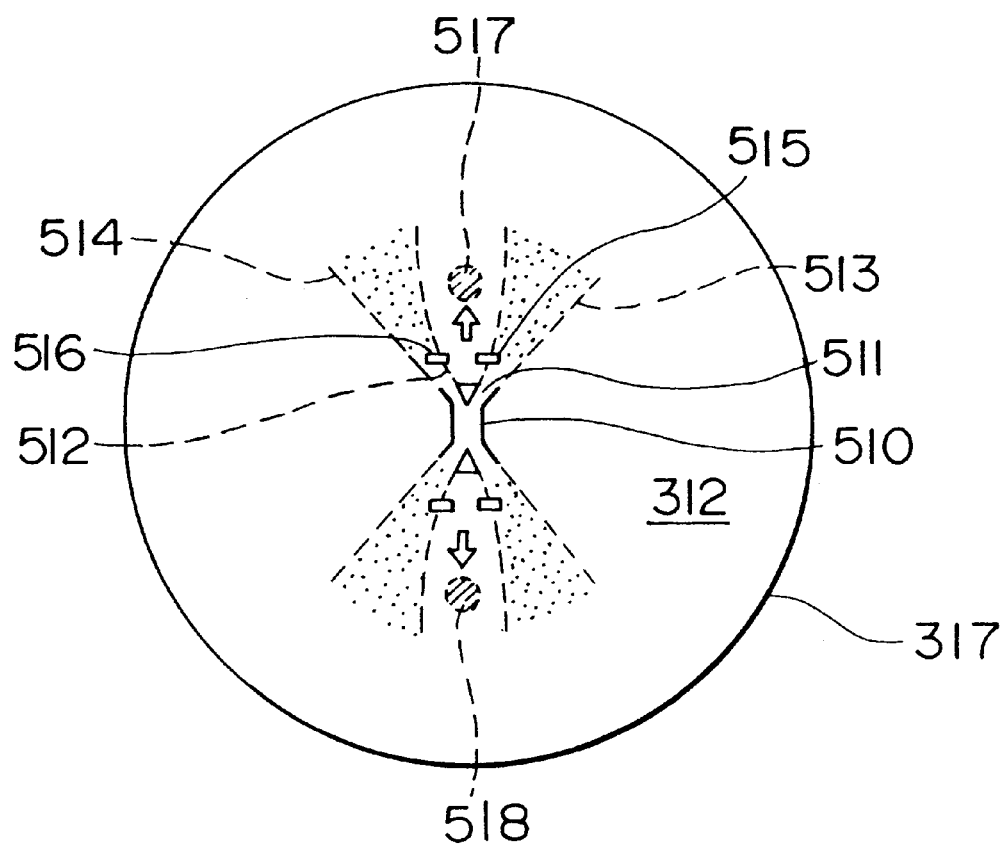
FIG. 57 is a view for explaining positional relationship between a fuel injection valve and a spark plug.

Referring to FIG. 57 which shows the cylinder head viewed from the cylinder chamber, the injection nozzle 510 is formed therein with two jet holes 511, 512 which are adjacent to each other. Electrodes 513, 514 of the spark plug are located in an area where the jet holes 511, 512 interfere with each other. Flame kernels 517, 518 given by electric discharge produced between the electrodes 515, 516 of the spark plug are moved in the direction of the arrow by the atomization 513 and the atomization 514. The velocity of the flow in this area is lower than those at the centers of the atomization 513, 514, and accordingly, the flame kernels are not substantially cooled by the atomization 513, 514. When a jet nozzle 517 is closed at a certain time, the flame kernels 517, 518 are stopped at the points shown in the figure, and then flame propagation is started. In this case, as shown FIG. 58, during an intake stroke, main fuel is injected into the cylinder 512 prior to the formation of the flame kernels so as to create a uniform mixture, and then, ignition fuel is injected at the end of a compression stoke so as to ensure the ignition. Accordingly, it is necessary to inject fuel two times per cycle.

Figure 59:
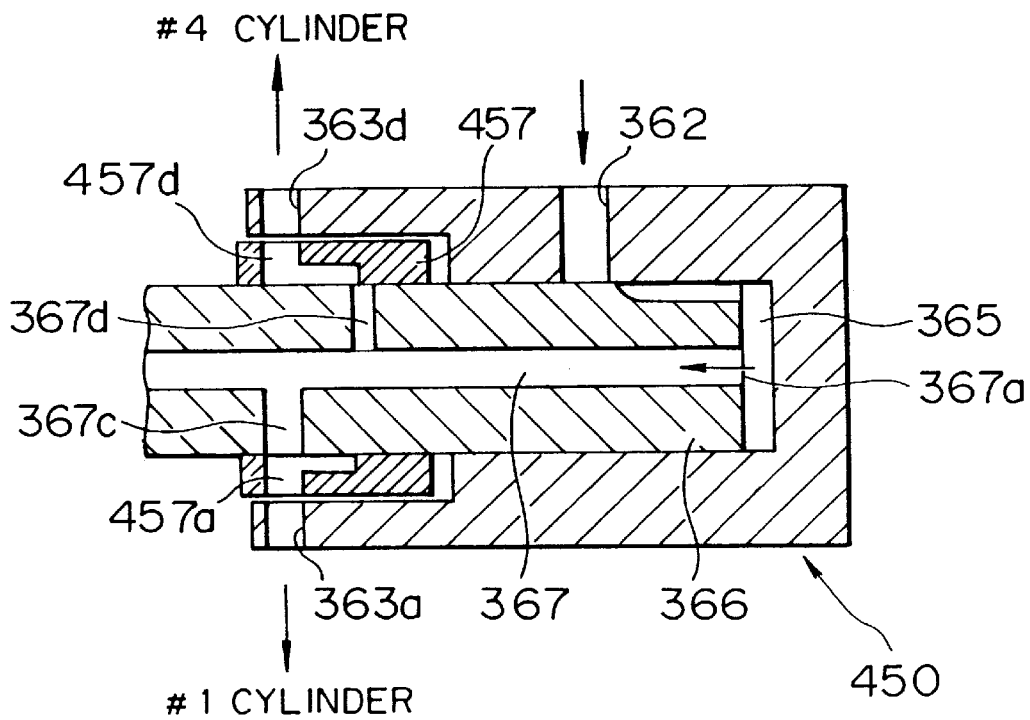
FIG. 59 is a sectional view for illustrating a second modified form of the distributor shown in FIG. 31.

In order to inject fuel two times per cycle, it is required to modify the distributor 360 stated hereinabove, as shown in FIG. 59. It is noted in the distributor shown in this figure that like reference numerals are used to denote like parts to those in the distributor 360 so as to avoid redundancy in explanation.

The distributor 550 in this modified form is the one in which the injection timing adjusting ring 357 in the above-mentioned distributor 360 is modified. In this modified form, the injection timing adjusting ring 357 is formed therein with communication holes 357a, 357b . . . so that when a casing fuel outlet port 363a which is one of two casing fuel outlet ports 363a, 363d symmetrical with each other about the center axis of a plunger is communicated with a plunger first fuel outlet port 367c, the other casing fuel outlet port 363d is communicated with a plunger second fuel outlet port 367d. Accordingly, when fuel flows from one of two casing fuel outlet ports which are located at positions symmetric with each other about the center axis of the plunger, fuel flows also from the other thereof. Specifically, if the fuel flows out from a #1 engine cylinder casing fuel outlet port 363a, fuel flows also from a #4 engine cylinder casing fuel outlet port 363d.

Figure 58:
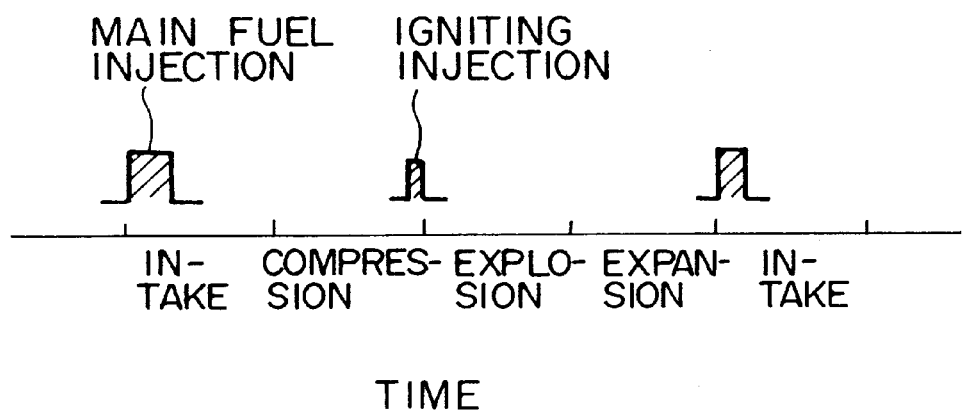
FIG. 58 is a timing chart for explaining fuel injection timing.

By the way, in the case of a four cylinder engine, when a #1 engine cylinder is shifted from an exhaust stroke into an intake stroke, a #4 engine cylinder is shifted from a compression stroke into a working stroke, as shown in FIG. 44. Meanwhile, when the #1 engine cylinder is shifted from a compression stroke into a working stroke, the #4 engine cylinder is shifted into an exhaust stroke into an intake stroke. Accordingly, as shown in FIG. 58, in such a case that the main fuel injection and the ignition fuel injection are carried out, when the main fuel injection is carried out in the #1 engine cylinder, the ignition fuel injection is carried out in the #4 engine cylinder. Meanwhile, when the main fuel injection is carried out in the #4 engine cylinder, the ignition fuel injection is carried out in #1 engine cylinder.

Accordingly, in this modified form, fuel flows from the #1 engine cylinder casing fuel outlet port 363a while fuel flows also from the #4 engine cylinder fuel outlet port 363d.

Incidentally, when main fuel (in a large fuel volume) is fed from the casing fuel outlet port 436s as one of both outlet ports, it is required to feed ignition fuel (in a small fuel volume) from the other casing fuel outlet port 363d. Accordingly, the ring 457 is formed therein with the communication holes 457a, 457d, . . . so that even in a condition in which the one casing fuel outlet port 363a and the plunger first fuel outlet port 363a are completely communicated with each other, the other casing fuel outlet port 363d is in half communicated with the plunger second fuel outlet port 367d.

It is noted that in order to carry out the main fuel injection in the #4 engine cylinder, and simultaneously to carry out the ignition fuel injection in the #1 engine cylinder, the fuel injection timing adjusting ring 457 may be slightly moved rightward.

If the fuel flows from the casing fuel outlet port 363d which is one of two casing fuel outlet ports 363a, 363d arranged symmetric with each other about the center axis of the plunger, simultaneously with flowing of fuel from the other casing fuel outlet port 363a, and if the fuel injection valves have different flow characteristics, either the main fuel injection volume or the ignition fuel injection volume cannot be fed in their respective desired values due to their different flow characteristics. That is, for example, if one of the fuel injection valve has a large pressure loss while the other one of them has a small pressure loss, when the fuel is fed, from one and the same fuel supply source, simultaneously into the fuel injection valves, fuel having a volume less than the desired value flow from one of the fuel injection valves meanwhile fuel having a volume larger than the desired value flows out from the other one of them. Accordingly, a second modified form of the distributor which can feed fuel in desired volumes into the fuel injection valves even though these fuel injection valves have different flow characteristics, will be hereinbelow explained with reference to FIG. 60.

Figure 60:
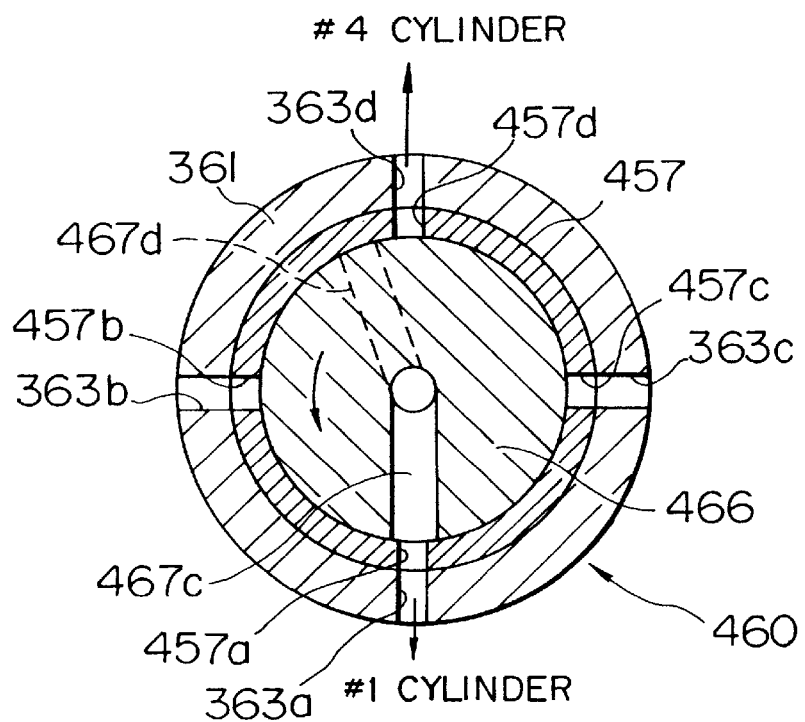
FIG. 60 is a sectional view for illustrating a third modified form of the distributor shown in FIG. 31.

In this distributor 460 shown in FIG. 60, a plunger second fuel outlet port 467a is extended in a direction having an angle which is not 180 deg. to the plunger first fuel outlet port 467c but is slightly smaller than 180 deg. around the plunger center axis as a center. It is noted that the distributor in this second modified form is substantially the same as the distributor in the first modified form, excepting the above-mentioned arrangement. With these plunger fuel outlet ports 467c, 467d, when fuel is fed into the #4 engine cylinder, no fuel is fed into the #1 engine cylinder. However, slightly later, the fuel is fed into the #1 engine cylinder. Accordingly, fuel is not fed simultaneously into the fuel injection valves from the distributor 460, and therefore, fuel in a substantially desired volume, can be fed into each of the fuel injection valves even having different flow characteristics.

Figure 61:
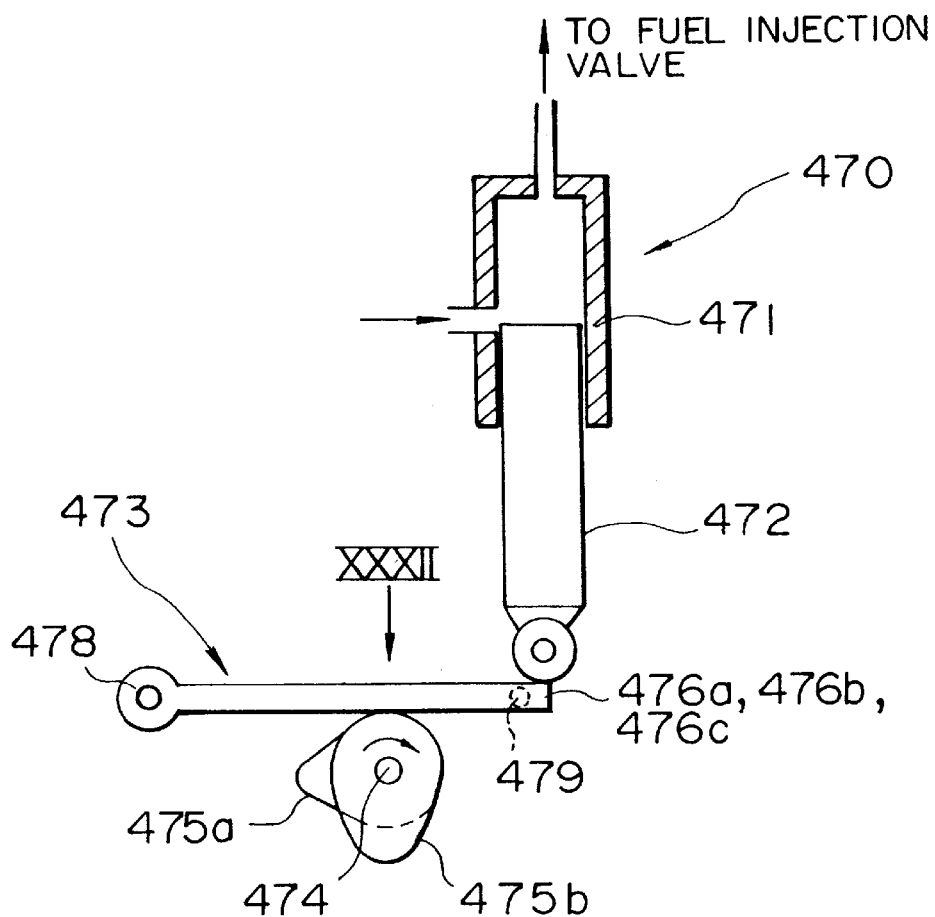
FIG. 61 is a schematic view for illustrating an embodiment of a fuel pump shown in FIG. 31.
Figure 62:
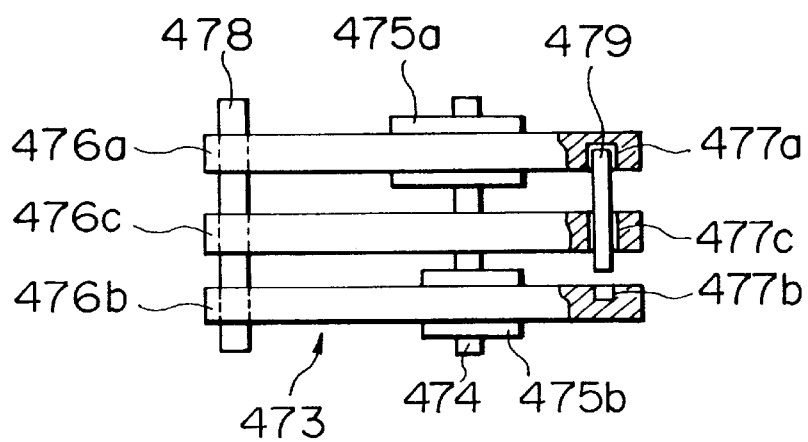
FIG. 62 is a detailed view showing a part of the fuel pump as viewed in the direction of the arrow XXXII in FIG. 61.

Next, explanation will be made of one embodiment of the fuel pump with reference to FIGS. 61 to 62.

As mentioned above, it has been explained that fuel is fed into each of the fuel injection valves for engine cylinders from a single fuel pump by means of the fuel distributor. However, in this embodiment, fuel is fed into the fuel injection valves from respective fuel pumps, that is. the so-called in-line pump will be explained.

The fuel pump 470 in this embodiment has a pump casing 471, a piston 473 adapted to reciprocate in the pump casing 471, and a piston drive mechanism 473. This piston drive mechanism 473 comprises a cam shaft 474 which is coupled to a crankshaft through the intermediary of a timing belt or the like, an advance cam 475a and a retardation cam 475b which are fixed to the cam shaft 474 so as to be rotated in association with the rotation of the cam shaft 474, and an advance cam follower rod 476a arranged so as to make contact with the outer peripheral surface of the advance cam 457a, a retardation cam follower rod 476b arranged so as to make contract with the outer surface of the retardation cam 475b, a swingable rod 476c making contact with an end part of the piston 472, a support pin 478 for swingably supporting the advance cam follower rod 476a, the retardation cam follower rod 476b and the swingable rod 476c, a timing change-over pin 479 for swinging the swingable rod 476c in response to one of the two cam follower rods 476a, 476b, and a solenoid (which is not shown) for moving the timing change-over pint 479. The advance cam follower rod 467a, the retardation cam follower rod 476b and the swingable rod 467c are arranged in parallel with one another, and are supported at their one end part by the support pin 478. The other end part of the swingable rod 476c is formed therein with a timing change-over pin through-hole 477c through which the timing change-over pin 479 pierces, the other end part of the advance cam follower rod 476a and the other end part of the retardation cam follower rod 476b are formed respectively therein change-over pin fitting parts 477a, 477b in which opposite end parts of the timing change-over pin 479 are fitted. The timing change-over pin 479 is always inserted in the timing change-over pin through-hole of the swingable rod 476c, but is fitted, at its either one of the end parts, in either one of the fitting part 477a of the advance cam follower rod 467a and the retardation cam follower rod 467b in accordance with its own position.

Explanation will be hereinbelow made of the operation of the fuel pump 470.

When the cam shaft 474 is rotated in association with the rotation of the crankshaft, the advance cam 475a and the retardation cam 475b fixed to the cam shaft 474 are rotated. In association with the rotation of these cams 475a, 475b, the cam follower rods 476a, 476b making contact with the outer peripheral surfaces of these cams 475a, 475b are swung around the support pin 478 as a center in accordance with shapes of the cams with which they make contact. If the timing change-over pin 479 is fitted in the fitting part 477a of the advance cam follower rod 476a at this time, the swingable rod 467c is also swung in association with the swinging of the advance cam follower rod 476c. Alternatively, if the timing change-over pin 479 is fitted in the fitting part 477b of the retardation cam follower rod 476b at this time, the swingable rod 467c is swung in association with the swinging of the retardation cam follower rod 476b. Accordingly, the piston 472 is reciprocated in association with the swinging of the swingable rod 476c.

Figure 63:
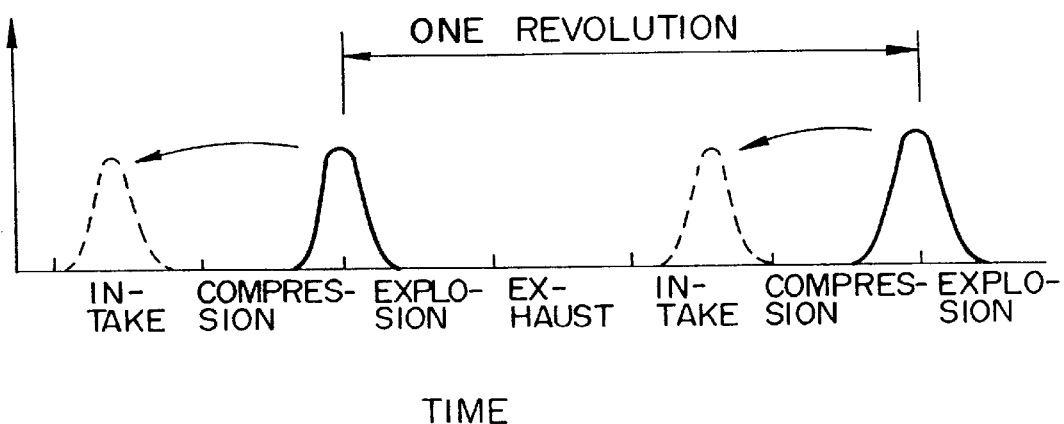
FIG. 63 is a timing chart for illustrating fuel injection timing in the case of using the fuel pump as shown in FIG. 62.

As mentioned above, when the solenoid is energized in response to the ECU 90 so as to move the timing change-over pin 479, the piston can be actuated, following the actuation of one of the cams 475a, 475b, and accordingly, the fuel injection timing can be changed as shown in FIG. 63.

The fuel injection timing and the fuel divergent atomization angle are uniformly related to the density of hydrocarbon. Further, the conversion efficiency of the catalyst and the density of hydrocarbon in exhaust gas are also uniformly related to each other. Accordingly, if these relationships are previously examined, and if the fuel injection timing and the fuel divergent atomization angle are controlled with the use of the fuel injection valves according to the present invention, detrimental substances in exhaust gas can be efficiently removed.

Further, during partial load operation, the fuel divergent atomization angle is widened so as to direct fuel into the electrodes of the spark plug from the fuel injection valve so as to create a satisfactory mixture around the electrodes of the spark plug. Meanwhile, during high load operation, the fuel divergent atomization angle is narrowed while the fuel injection timing is advanced so as to promote the mixing of air and fuel. Thus, it is possible to aim at carrying out stable combustion over a wide range.

What is claimed is:

1. A method of controlling an internal combustion engine, comprising the step of controlling a volume of fuel injected from a fuel injection device incorporating an injection port in a combustion chamber of the internal combustion engine, fuel injection timing, and opening and closing timing of an intake valve for controlling a volume of air to be burnt within said combustion chamber so that said intake valve is opened at a time of initiating suction stroke, and is closed at a time of initiating a compression stroke, wherein said intake valve is opened substantially at a middle of the suction stroke and is closed substantially at a middle of the compression stroke when an engine load is lower than a predetermined value.

* * * * *